United States Patent
Ashrafi et al.

(10) Patent No.: US 10,707,945 B2
(45) Date of Patent: **\*Jul. 7, 2020**

(54) SYSTEMS AND METHODS FOR FOCUSING BEAMS WITH MODE DIVISION MULTIPLEXING

(71) Applicant: NxGen Partners IP, LLC, Dallas, TX (US)

(72) Inventors: Solyman Ashrafi, Plano, TX (US); Roger D. Linquist, Dallas, TX (US); Nima Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,148

(22) Filed: Jan. 28, 2019

(65) Prior Publication Data

US 2019/0165849 A1 May 30, 2019

Related U.S. Application Data

(63) Continuation of application No. 15/230,823, filed on Aug. 8, 2016, now Pat. No. 10,193,611, which is a continuation of application No. 14/731,191, filed on Jun. 4, 2015, now Pat. No. 9,413,448.

(Continued)

(51) Int. Cl.
*H04B 7/06* (2006.01)
*H04B 10/516* (2013.01)
(Continued)

(52) U.S. Cl.
CPC ......... *H04B 7/0697* (2013.01); *H04B 7/0617* (2013.01); *H04B 7/0671* (2013.01);
(Continued)

(58) Field of Classification Search
None
See application file for complete search history.

(56) References Cited

U.S. PATENT DOCUMENTS

| | | |
|---|---|---|
| 3,459,466 A | 8/1969 | Giordmaine |
| 3,614,722 A | 10/1971 | Jones |

(Continued)

OTHER PUBLICATIONS

Solyman Ashrafi, Channeling Radiation of Electrons in Crystal Lattices, Essays on Classical and Quantum Dynamics, Gordon and Breach Science Publishers, 1991.

(Continued)

*Primary Examiner* — Li Liu

(57) ABSTRACT

A system for focusing an orbital angular momentum (OAM) multiplexed beam comprising OAM signal processing circuitry for generating an OAM multiplexed signal. The OAM multiplexed signal includes a plurality of data streams each having a unique orbital angular momentum applied thereto and multiplexed together within the OAM multiplexed signal. Each unique orbital angular momentum has a beam helicity value greater than l=2. An antenna array control circuit controls transmission of the multiplexed OAM signal from each of a plurality of antennas in an antenna array toward a focus point located below the ground as a transmission beam to cause the transmitted OAM multiplexed signals to converge at the focus point below the ground at substantially a same time to overcome a divergence of the transmitted plurality of OAM multiplexed signals caused by the beam helicity value of greater than l=2 for each of the unique orbital angular momentum.

14 Claims, 59 Drawing Sheets

Related U.S. Application Data

(60) Provisional application No. 62/035,224, filed on Aug. 8, 2014.

(51) Int. Cl.

| | |
|---|---|
| *H04W 16/28* | (2009.01) |
| *H04B 10/2575* | (2013.01) |
| *H04B 10/2581* | (2013.01) |
| *H04B 10/112* | (2013.01) |
| *H04B 10/2507* | (2013.01) |
| *H04J 14/04* | (2006.01) |
| *H04B 10/508* | (2013.01) |
| *H04L 27/20* | (2006.01) |
| *H04B 7/0413* | (2017.01) |

(52) U.S. Cl.
CPC ....... *H04B 10/112* (2013.01); *H04B 10/2507* (2013.01); *H04B 10/2581* (2013.01); *H04B 10/25752* (2013.01); *H04B 10/508* (2013.01); *H04B 10/516* (2013.01); *H04J 14/04* (2013.01); *H04L 27/2017* (2013.01); *H04W 16/28* (2013.01); *H04B 7/0413* (2013.01)

(56) References Cited

U.S. PATENT DOCUMENTS

| | | | |
|---|---|---|---|
| 4,379,409 A | 4/1983 | Primbsch et al. | |
| 4,503,336 A | 3/1985 | Hutchin et al. | |
| 4,736,463 A | 4/1988 | Chavez | |
| 4,862,115 A | 8/1989 | Lee et al. | |
| 5,013,151 A * | 5/1991 | Hughes | F41H 13/0062 356/139.08 |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,469,176 A * | 11/1995 | Sandler | G01V 3/12 342/375 |
| 5,543,805 A | 8/1996 | Thaniyavarn | |
| 5,555,530 A | 9/1996 | Meehan | |
| 6,337,659 B1 * | 1/2002 | Kim | H01Q 1/246 342/373 |
| 6,992,829 B1 | 1/2006 | Jennings et al. | |
| 7,577,165 B1 | 8/2009 | Barrett | |
| 7,729,572 B1 | 6/2010 | Pepper et al. | |
| 7,792,431 B2 | 9/2010 | Jennings et al. | |
| 8,432,884 B1 * | 4/2013 | Ashrafi | H04L 5/04 370/343 |
| 8,503,546 B1 | 8/2013 | Ashrafi | |
| 8,559,823 B2 | 10/2013 | Izadpanah et al. | |
| 8,811,366 B2 | 8/2014 | Ashrafi | |
| 9,077,577 B1 | 7/2015 | Ashrafi | |
| 9,413,448 B2 * | 8/2016 | Ashrafi | H04B 7/0697 |
| 10,193,611 B2 * | 1/2019 | Ashrafi | H04B 7/0697 |
| 2004/0047372 A1 * | 3/2004 | Boasson | H04J 1/12 370/535 |
| 2005/0254826 A1 | 11/2005 | Jennings et al. | |
| 2005/0259914 A1 | 11/2005 | Padgett et al. | |
| 2010/0013696 A1 | 1/2010 | Schmitt et al. | |
| 2012/0207470 A1 | 8/2012 | Djordevic et al. | |
| 2013/0027774 A1 | 1/2013 | Bovino et al. | |
| 2013/0235744 A1 | 9/2013 | Chen et al. | |
| 2014/0355624 A1 | 12/2014 | Li et al. | |
| 2015/0098697 A1 | 4/2015 | Marom et al. | |

OTHER PUBLICATIONS

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM

(56) References Cited

OTHER PUBLICATIONS

Channels using Bessel Beams Containing Orbital Angular Momentum, Third International Conference on Optical Angular Momentum (ICOAM), Aug. 4-7, 2015, New York USA.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al, Patch Antenna Array for the Generation of Millimeter-wave Hermite-Gaussian Beams, IEEE Antennas and Wireless Propagation Letters; 2016.

Yongxiong Ren et al, Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

(56) References Cited

OTHER PUBLICATIONS

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

\* cited by examiner

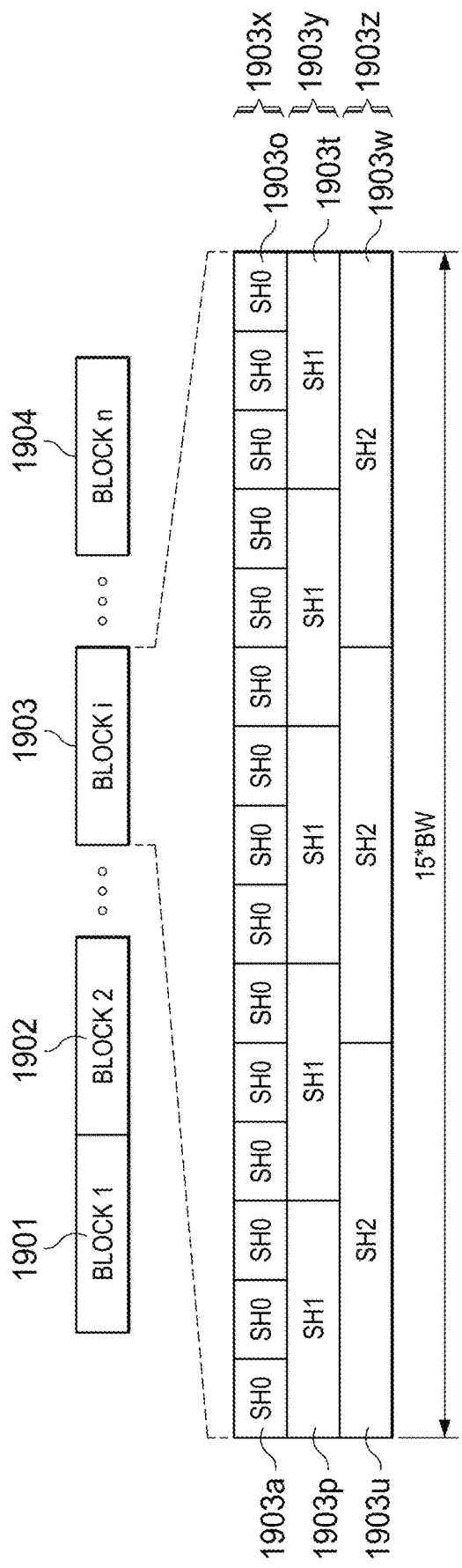
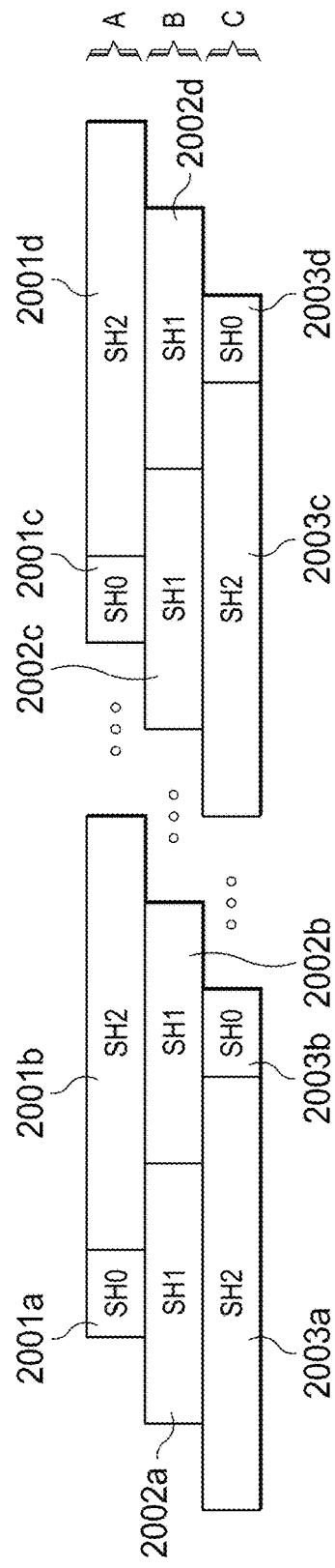
FIG. 19
FIG. 20

SYSTEMS AND METHODS FOR FOCUSING BEAMS WITH MODE DIVISION MULTIPLEXING

CROSS-REFERENCE TO RELATED APPLICATIONS

This application is a continuation of U.S. patent application Ser. No. 15/230,823, filed Aug. 8, 2016, entitled SYSTEMS AND METHODS FOR FOCUSING BEAMS WITH MODE DIVISION MULTIPLEXING, which will issue as U.S. Pat. No. 10,193,611 on Jan. 29, 2019. U.S. patent application Ser. No. 15/230,823 is a continuation of U.S. patent application Ser. No. 14/731,191, filed Jun. 4, 2015, entitled SYSTEMS AND METHODS FOR FOCUSING BEAMS WITH MODE DIVISION MULTIPLEXING, now U.S. Pat. No. 9,413,448, issued Aug. 9, 2016, which claims benefit of U.S. Provisional Application No. 62/035,224, filed Aug. 8, 2014, entitled FOCUSING APPROACH FOR OAM-BASED FREE-SPACE AND RF, the specification of which is incorporated by reference herein in its entirety.

TECHNICAL FIELD

The following relates to orbital angular momentum based communication, and more particularly, to more tightly focusing a beam that has been processed using orbital angular momentum signals.

BRIEF DESCRIPTION OF THE DRAWINGS

For a more complete understanding, reference is now made to the following description taken in conjunction with the accompanying Drawings in which:

FIG. 19 illustrates a spectral alignment of multiple level overlay signals for differing bandwidths of signals;

FIG. 20 illustrates an alternative spectral alignment of multiple level overlay signals;

DETAILED DESCRIPTION

Figure 1:
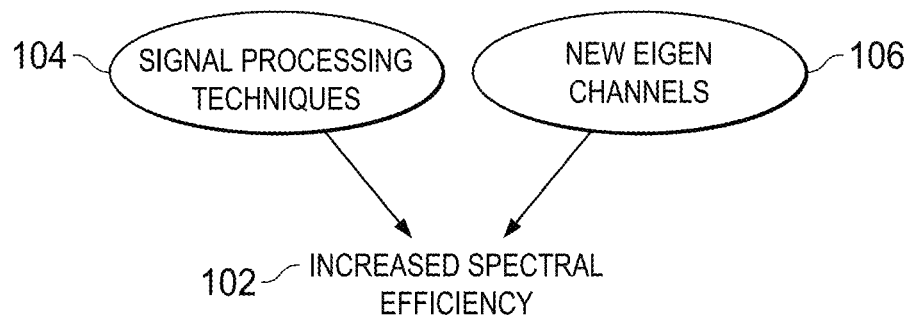
FIG. 1 illustrates various techniques for increasing spectral efficiency within a transmitted signal.

Referring now to the drawings, wherein like reference numbers are used herein to designate like elements throughout, the various views and embodiments of system and method for communication using orbital angular momentum with modulation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, wherein there is illustrated two manners for increasing spectral efficiency of a spectrum based system. In general, there are at least two different ways to increase spectral efficiency 102 of a spectrum based system. The increase may be brought about by signal processing techniques 104 in the modulation scheme or using multiple access technique. Additionally, the spectral efficiency can be increased by creating new Eigen channels 106 within the electromagnetic propagation. These two techniques are completely independent of one another and innovations from one class can be added to innovations from the second class. The benefits of combination are multiplicative not additive. Therefore, the combination of these two techniques creates a further innovation.

Spectral efficiency 102 is a key driver of the efficiency of a spectrum based system. The spectral efficiency 102 is defined in units of bit/sec/hz and the higher the spectral efficiency, the better the more efficient the system and the more valuable the system. This is because spectral efficiency 102 can translate to a greater number of users, higher throughput, higher quality or some of each within a communications system and all can be traded against each other.

Regarding techniques using signal processing techniques or multiple access techniques. These techniques in spectrum based communications systems include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 106, the innovations include diversity techniques including space and polarization diversity as well as multiple input/multiple output (MIMO) where uncorrelated radio paths create independent Eigen channels and propagation of electromagnetic waves.

Figure 2:
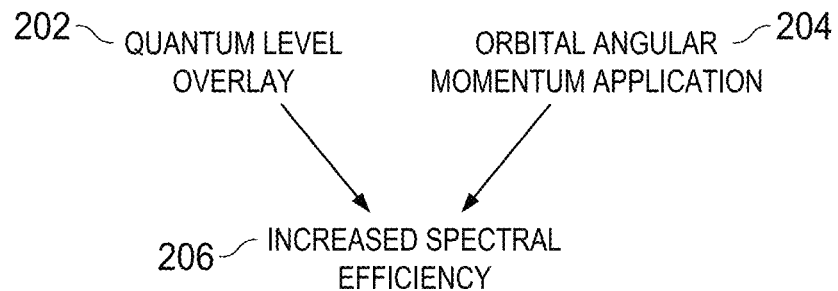
FIG. 2 illustrates a particular technique for increasing spectral efficiency within a transmitted signal.

Referring now to FIG. 2, the present spectrum based system configuration introduces two techniques, one from the signal processing techniques 104 category and one from the creation of new eigen channels 106 category that are entirely independent from each other. Their combination provides a unique manner to increase the spectral efficiency of an end to end spectrum based system from twisted pair and cable to fiber optics, to free space optics, to RF used in cellular, backhaul and satellite. The first technique involves the use of a new signal processing technique using new orthogonal signals to increase the spectral efficiency of QAM modulation by the introduction of non-sinusoidal functions. This improvement is referred to as quantum level overlay (QLO) 202. The second technique involves the application of new electromagnetic wavefronts using a property of electromagnetic waves or photon, called orbital angular momentum (QAM) 104 to similarly increase spectrum efficiency. These electromagnetic wavefronts can access the entire electromagnetic spectrum for radio frequencies through visible light and beyond. Application of each of these techniques 202 and uniquely increases by orders of magnitude spectral efficiency 206 within spectrum based systems. In one embodiment, the spectrum based system includes spectrum based communications systems, but there are other embodiments such as radar that are not communications systems.

With respect to the quantum level overlay technique 202, new eigen functions are introduced that, when overlapped (on top of one another within a symbol), significantly increase the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 204, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a link. OAM beams are interesting in systems due to their potential ability to multiplex multiple independent data carrying channels into a single frequency.

With respect to the combination of quantum level overlay techniques 202 and orbital angular momentum application 204, the combination is unique as the OAM multiplexing technique is separate from, but compatible with, other electromagnetic techniques such as wave length and polarization division multiplexing. Use of these two techniques together into existing electromagnetic systems further increases system performance. The application of these techniques together in a system can be used in any spectrum based system and in one embodiment, a communications system, can materially increase the spectrum efficiency of said system over twisted pair and cable to fiber optics, to free space optics, to RF used in cellular/backhaul and satellites.

Each of these techniques can be applied independent of one another, but the combination provides a unique opportunity to not only increase spectral efficiency, but to increase spectral efficiency without sacrificing distance or signal to noise ratios.

The Shannon Capacity Equation, can be used to determine if spectral efficiency is increased in a system. Increased spectral efficiency can be mathematically translated to more bandwidth. Since bandwidth has a value, one can easily convert spectral efficiency gains to financial gains for the business impact of using higher spectral efficiency. Also, increased spectral efficiency allows sophisticated forward error correction (FEC) techniques to be used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Spectrum based system operators and their vendors are interested in increasing spectral efficiency. However, the issue with respect to this increase is the corresponding cost of increasing spectral efficiency. Each technique at different layers of the system have a different price tag associated therewith. Techniques that are implemented at a physical layer have the most impact as all other techniques can be superimposed on top of the lower layer techniques and thus increase the spectral efficiency further. The price tag for some of the techniques can be drastic when one considers other associated costs. For example, one method of increasing spectral efficiency, the multiple input multiple output (MIMO) technique, uses additional antennas to create additional paths where each RF path can be treated as an independent channel and thus increase the aggregate spectral efficiency. In the MIMO scenario, in addition to the costs of additional antennas and processing, the operator has other associated soft costs dealing with MIMO such as antenna installation, coils, additional lease costs, costs to increase the structural integrity of the antenna structure, etc. These techniques not only have tremendous cost, but they have huge timing issues as these activities take time and the achieving of higher spectral efficiency comes with significant delays which can also be translated to financial losses.

The quantum level overlay technique (QLO) 202 has an advantage that the independent channels are created within the symbols without needing new antennas and also can be used in existing modulation systems. This will have a tremendous cost and time benefit compared to other techniques. Also, the quantum layer overlay technique 202 is a physical layer technique, which means that the other techniques at higher layers of the protocol can receive the benefit of the QLO techniques 202 and thus increase the spectral efficiency even further. QLO technique 202 uses standard QAM modulation used in OFDM based multiple access technologies such as WIMAX or LTE. QLO technique 202 basically enhances the QAM modulation at the transceiver by injecting new signals to the I & Q components of the baseband and overlaying them before QAM modulation as will be more fully described herein below. At the receiver, the reverse procedure is used to separate the overlaid signals and the net effect is a pulse shaping that allows better localization of the spectrum compared to standard QAM or even the root raised cosine. The impact of this technique is a significantly higher spectral efficiency.

Figure 3:
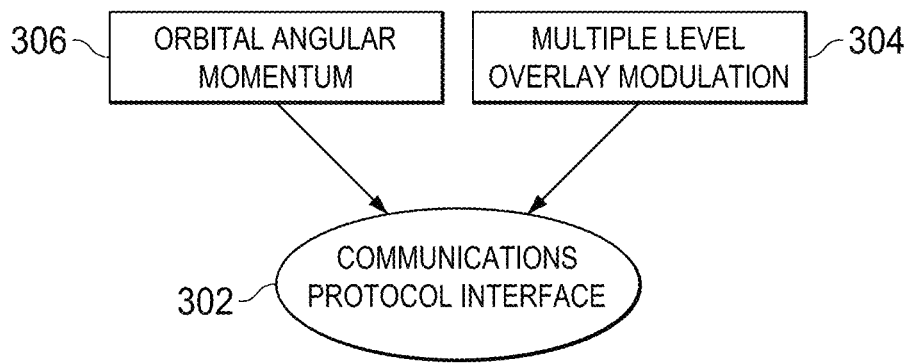
FIG. 3 illustrates a general overview of the manner for providing communication bandwidth between various communication protocol interfaces.

Referring now more particularly to FIG. 3, there is illustrated a general overview of the manner for providing improved spectral efficiency within various communication protocol interfaces 302, using a combination of multiple level overlay modulation 304 and the application of orbital angular momentum 306 to increase the number of communications channels.

The various communication protocol interfaces 302 may be comprised of a variety of system links using the electromagnetic spectrum, such as RF, cable or twisted pair, or optical making use of light wavelengths such as fiber-optic communications or free-space optics. Various types of RF communications may include a combination of RF microwave, RF satellite communication, nomadic and mobile wireless systems, as well as multiplexing between RF and free-space optics in real time.

By combining a multiple layer overlay modulation technique 304 with orbital angular momentum (OAM) technique 306, a higher throughput over various types of system 302 may be achieved. The use of multiple level overlay modulation alone without OAM increases the spectral efficiency of systems 302, whether wired, optical, or wireless. However, together with OAM, the increase in spectral efficiency is even more significant.

Multiple overlay modulation techniques 304 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 304. Within the multiple level overlay modulation technique 304, signals may be differentiated in two-dimensional space rather than along a single axis. Thus, the information-carrying capacity and/or spectral efficiency of a system may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity and/or spectral efficiency, within a fixed bandwidth. Given the frequency bandwidth delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \frac{1}{2}(2n+1) \quad (1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 306 provides a twist to wave fronts of the electromagnetic fields carrying the data stream that may enable the transmission of multiple data streams on the same frequency, wavelength, or other signal-supporting mechanism. This will increase the bandwidth over a system by allowing a single frequency or wavelength to support multiple eigen channels, each of the individual channels having a different orthogonal and independent orbital angular momentum associated therewith.

Figure 4:
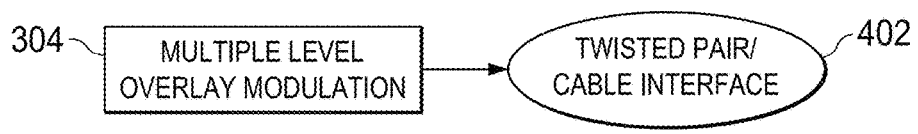
FIG. 4 illustrates the manner for utilizing multiple level overlay modulation with twisted pair/cable interfaces.

In one embodiment, referring now to FIG. 4, there is illustrated a further communication implementation technique using the above described techniques as twisted pairs or cables carry electrons (not photons). Rather than using each of the multiple level overlay modulation 304 and orbital angular momentum techniques 306, only the multiple level overlay modulation 304 can be used in conjunction with a single wireline interface and, more particularly, a twisted pair communication link or a cable communication link 402. The operation of the multiple level overlay modulation 404, is similar to that discussed previously with respect to FIG. 3, but is used by itself without the use of orbital angular momentum techniques 306, and is used with either a twisted pair communication link or cable interface communication link 402.

Figure 5:
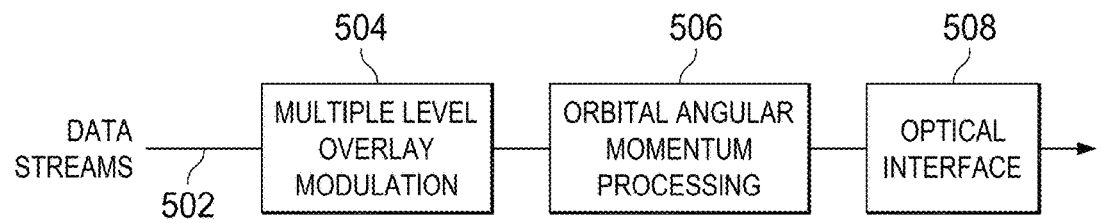
FIG. 5 illustrates a general block diagram for processing a plurality of data streams within an optical communication system.

Referring now to FIG. 5, there is illustrated a general block diagram for processing a plurality of data streams 502 for transmission in an optical communication system. The multiple data streams 502 are provided to the multi-layer overlay modulation circuitry 504 wherein the signals are modulated using the multi-layer overlay modulation technique. The modulated signals are provided to orbital angular momentum processing circuitry 506 which applies a twist to each of the wave fronts being transmitted on the wavelengths of the optical communication channel. The twisted waves are transmitted through the optical interface 508 over an optical communications link such as an optical fiber or free space optics communication system. FIG. 5 may also illustrate an RF mechanism wherein the interface 508 would comprise and RF interface rather than an optical interface.

Figure 6:
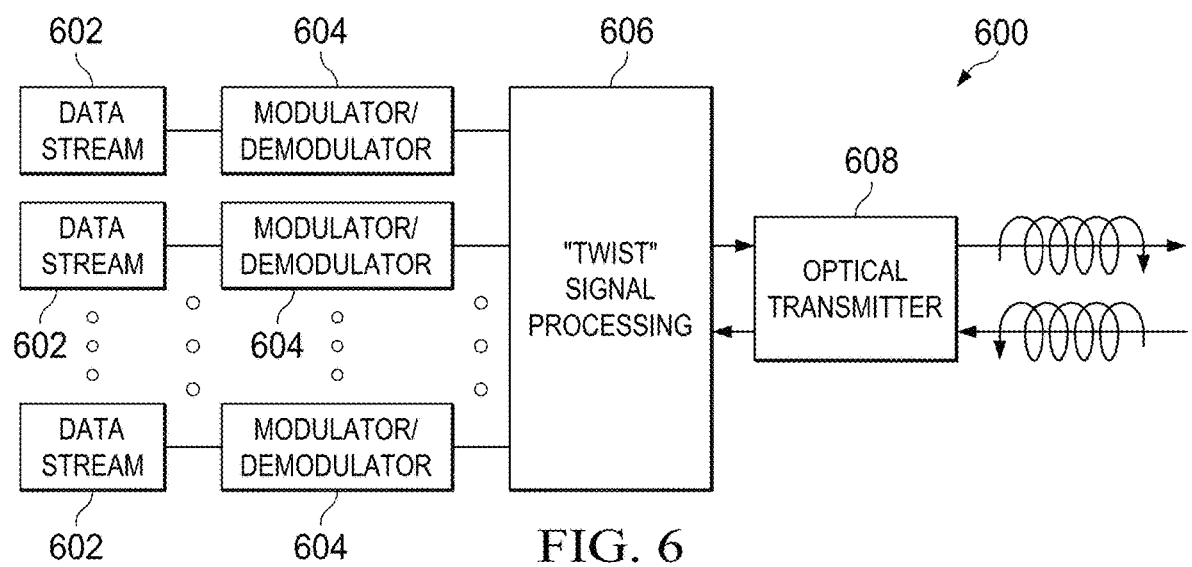
FIG. 6 is a functional block diagram of a system for generating orbital angular momentum within a communication system.

Referring now more particularly to FIG. 6, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. Multiple data streams 602 are provided to the transmission processing circuitry 600. Each of the data streams 602 comprises, for example, an end to end connection carrying a voice call or a packet connection transmitting non-circuit switch packed data over a data connection. The multiple data streams 602 are processed by modulator/demodulator circuitry 604. The modulator/demodulator circuitry 604 modulates the received data stream 602 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 606. Each of the modulated data streams from the modulator/demodulator 604 are provided a different orbital angular momentum by the orbital angular momentum electromagnetic block 606 such that each of the modulated data streams have a unique and different orbital angular momentum associated therewith. Each of the modulated signals having an associated orbital angular momentum are provided to an optical transmitter 608 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 606. The optical transmitter 608 transmitting signals at a single wavelength could transmit B groups of information. The optical transmitter 608 and OAM electromagnetic block 606 may transmit l×B groups of information according to the configuration described herein.

In a receiving mode, the optical transmitter 608 will have a wavelength including multiple signals transmitted therein having different orbital angular momentum signals embedded therein. The optical transmitter 608 forwards these signals to the OAM signal processing block 606, which separates each of the signals having different orbital angular momentum and provides the separated signals to the demodulator circuitry 604. The demodulation process extracts the data streams 602 from the modulated signals and provides it at the receiving end using the multiple layer overlay demodulation technique.

Figure 7:
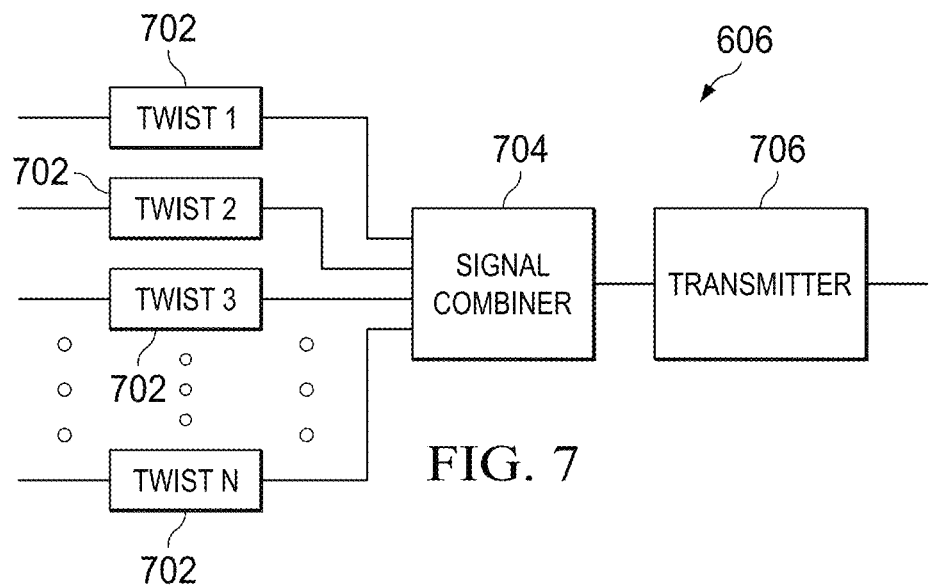
FIG. 7 is a functional block diagram of the orbital angular momentum signal processing block of FIG. 6.

Referring now to FIG. 7, there is provided a more detailed functional description of the OAM signal processing block 606. Each of the input data streams are provided to OAM circuitry 702. Each of the OAM circuitry 702 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 702 are unique to the data stream that is provided thereto. An infinite number of orbital angular momentums may be applied to different input data streams using many different currents. Each of the separately generated data streams are provided to a signal combiner 704, which combines the signals onto a wavelength for transmission from the transmitter 706.

Figure 8:
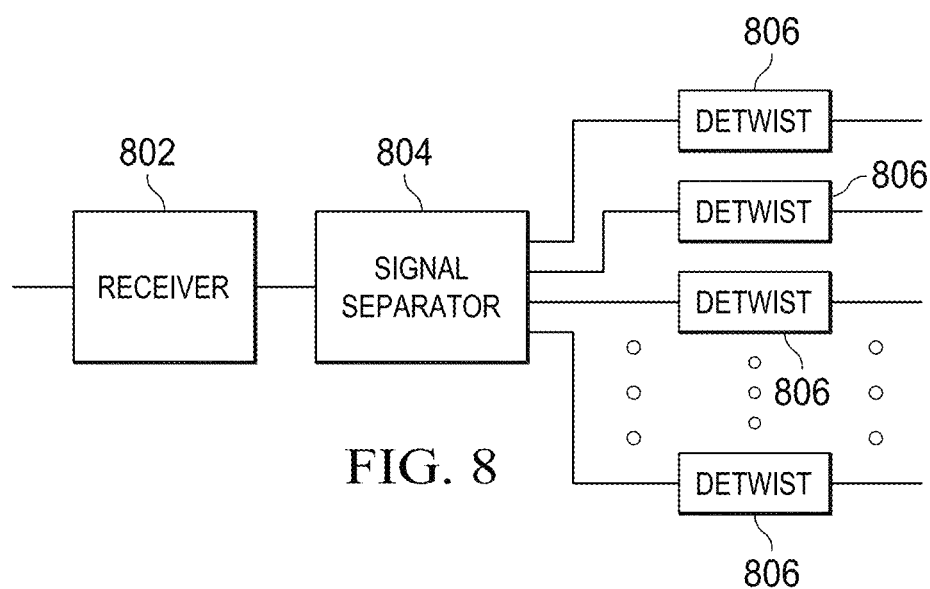
FIG. 8 is a functional block diagram illustrating the manner for removing orbital angular momentum from a received signal including a plurality of data streams.

Referring now to FIG. 8, there is illustrated an embodiment in which the OAM processing circuitry 606 may separate a received signal into multiple data streams. The receiver 802 receives the combined OAM signals on a single wavelength and provides this information to a signal separator 804. The signal separator 804 separates each of the signals having different orbital angular momentums from the received wavelength and provides the separated signals to OAM de-twisting circuitry 806. The OAM de-twisting circuitry 806 removes the associated OAM twist from each of the associated signals and provides the received modulated data stream for further processing. The signal separator 804 separates each of the received signals that have had the orbital angular momentum removed therefrom into individual received signals. The individually received signals are provided to the receiver 802 for demodulation using, for example, multiple level overlay demodulation as will be more fully described herein below.

Figure 9:
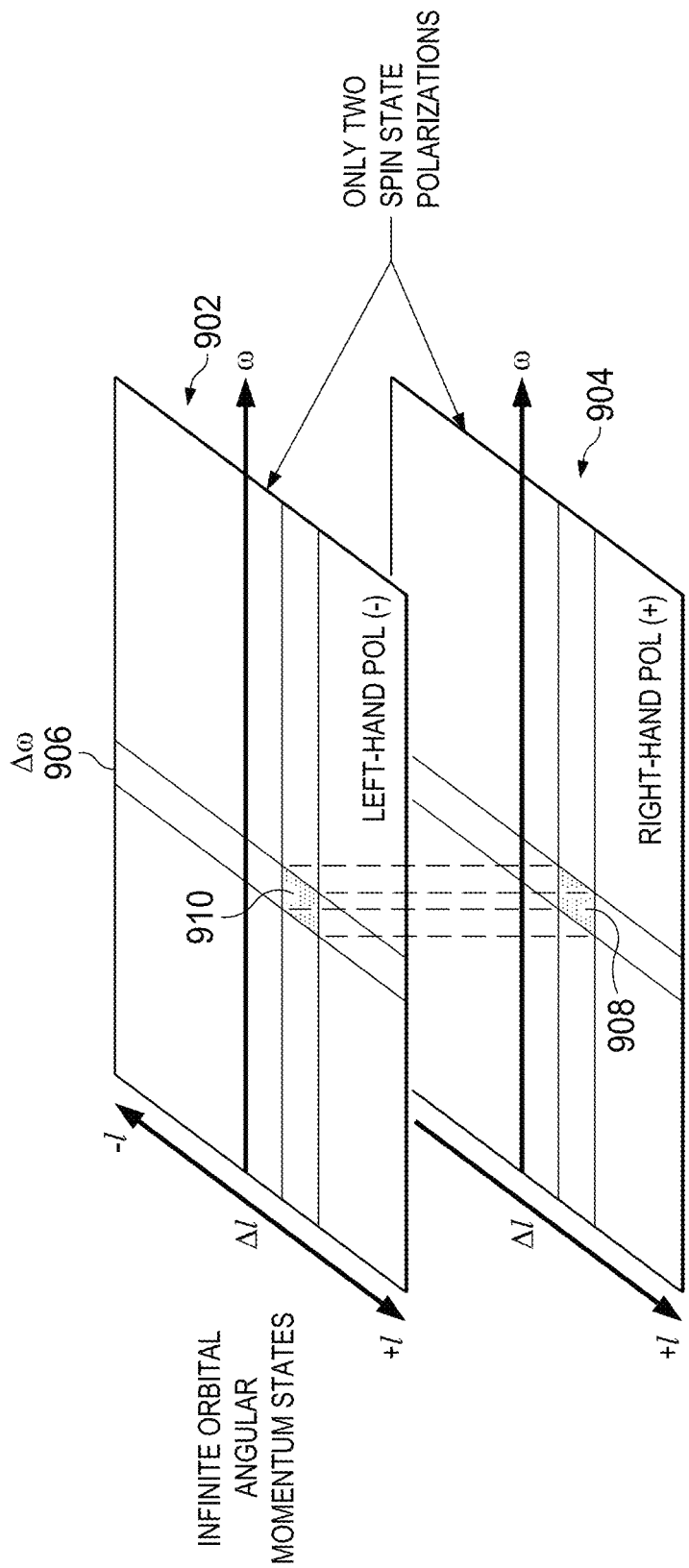
FIG. 9 illustrates a single wavelength having two quanti-spin polarizations providing an infinite number of signals having various orbital angular momentums associated therewith.

FIG. 9 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 902 represents the potentially available signals for a left handed signal polarization, while the bottom grid 904 is for potentially available signals having right handed polarization.

By applying different orbital angular momentum states to a signal at a particular frequency or wavelength, a potentially infinite number of states may be provided at the frequency or wavelength. Thus, the state at the frequency $\Delta\omega$ or wavelength 906 in both the left handed polarization plane 902 and the right handed polarization plane 904 can provide an infinite number of signals at different orbital angular momentum states $\Delta l$. Blocks 908 and 910 represent a particular signal having an orbital angular momentum $\Delta l$ at a frequency $\Delta\omega$ or wavelength in both the right handed polarization plane 904 and left handed polarization plane 910, respectively. By changing to a different orbital angular momentum within the same frequency $\Delta\omega$ or wavelength 906, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 9, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 10A:
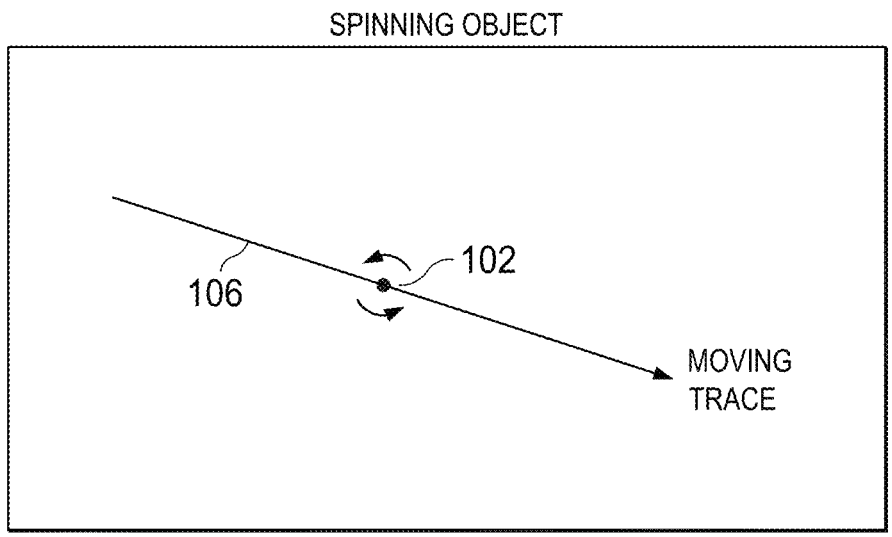
FIG. 10A illustrates an object with only a spin angular momentum.
Figure 10B:
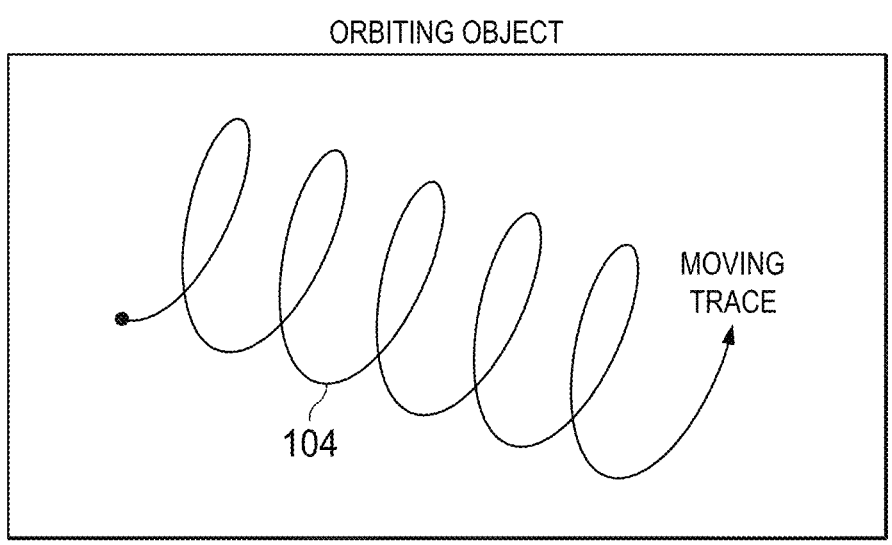
FIG. 10B illustrates an object with an orbital angular momentum.
Figure 10C:
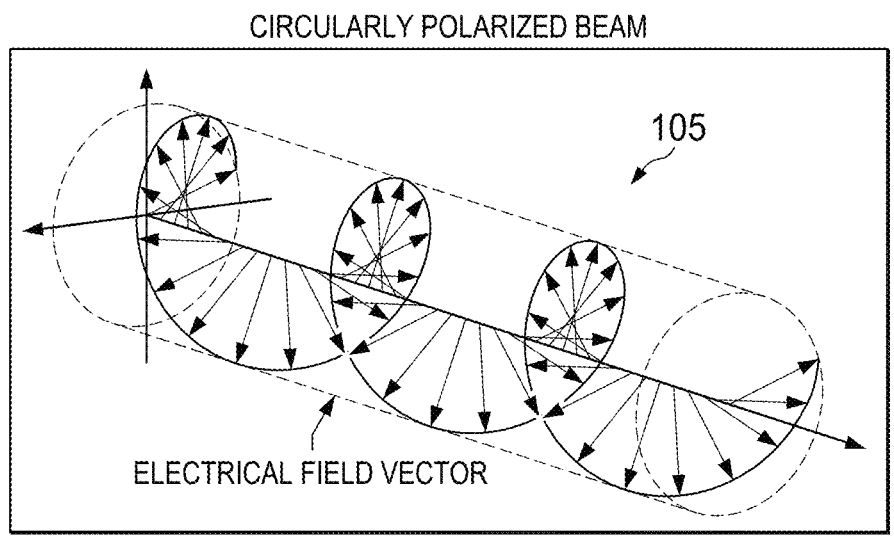
FIG. 10C illustrates a circularly polarized beam carrying spin angular momentum.
Figure 10D:
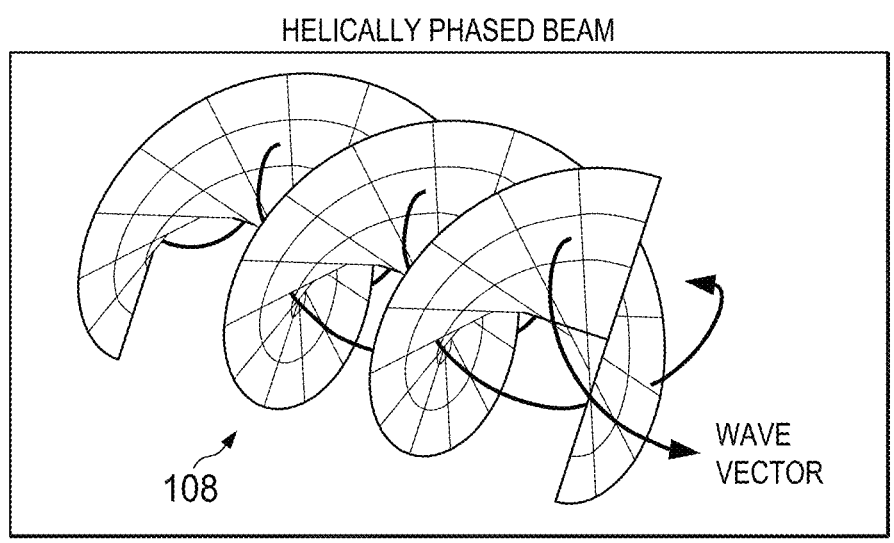
FIG. 10D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 1002), or orbiting around an axis 1006 (i.e., OAM 1004), as shown in FIGS. 10A and 10B, respectively. A light beam may also have rotational motion as it propagates. In paraxial approximation, a light beam carries SAM 1002 if the electrical field rotates along the beam axis 1006 (i.e., circularly polarized light 1005), and carries OAM 1004 if the wave vector spirals around the beam axis 1006, leading to a helical phase front 1008, as shown in FIGS. 10C and 10D. In its analytical expression, this helical phase front 1008 is usually related to a phase term of $\exp(il\theta)$ in the transverse plane, where $\theta$ refers to the angular coordinate, and l is an integer indicating the number of intertwined helices (i.e., the number of $2\pi$ phase shifts along the circle around the beam axis). l could be a positive, negative integer or zero, corresponding to clockwise, counterclockwise phase helices or a Gaussian beam with no helix, respectively.

Two important concepts relating to OAM include:
1) OAM and polarization: As mentioned above, an OAM beam is manifested as a beam with a helical phase front and therefore a twisting wavevector, while polarization states can only be connected to SAM 1002. A light beam carries SAM 1002 of $\pm h/2\pi$ (h is Plank's constant) per photon if it is left or right circularly polarized, and carries no SAM 1002 if it is linearly polarized. Although the SAM 1002 and OAM 1004 of light can be coupled to each other under certain scenarios, they can be clearly distinguished for a paraxial light beam. Therefore, with the paraxial assumption, OAM 1004 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which l has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0} \quad (2)$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

The conserved quantities and the electromagnetic field can be represented according to the conservation of system energy and the conservation of system linear momentum. Time symmetry, i.e. the conservation of system energy can be represented using Poynting's theorem according to the equations:

Hamiltonian (total energy)

$$H = \sum_i m_i \gamma_i c^2 + \frac{\varepsilon_0}{2} \int d^3x(|E|^2 + c^2|B|^2)$$

conservation of energy $$\frac{dU^{mech}}{dt} + \frac{dU^{em}}{dt} + \oint_{S'} d^2x' \hat{n}' \cdot S = 0$$

The space symmetry, i.e., the conservation of system linear momentum representing the electromagnetic Doppler shift can be represented by the equations:

linear momentum $$p = \sum_i m_i \gamma_i v_i + \varepsilon_0 \int d^3x(E \times B)$$

conservation of linear momentum $$\frac{dp^{mech}}{dt} + \frac{dp^{em}}{dt} + \oint_{S'} d^2x' \hat{n}' \cdot T = 0$$

The conservation of system center of energy is represented by the equation:

$$R = \frac{1}{H} \sum_i (x_i - x_0) m_i \gamma_i c^2 + \frac{\varepsilon_0}{2H} \int d^3x(x - x_0)(|E|^2 + c^2|B|^2) \quad (3)$$

Similarly, the conservation of system angular momentum, which gives rise to the azimuthal Doppler shift is represented by the equation:

conservation of angular momentum $$\frac{dJ^{mech}}{dt} + \frac{dJ^{em}}{dt} + \oint_{S'} d^2x' \hat{n}' \cdot M = 0$$

For radiation beams in free space, the EM field angular momentum $J^{em}$ can be separated into two parts:

$$J^{em} = \varepsilon_0 \int_{V'} d^3x'(E \times A) + \varepsilon_0 \int_{V'} d^3x' E_i[(x' - x_0) \times \nabla]A_i \quad (4)$$

For each singular Fourier mode in real valued representation:

$$J^{em} = -i\frac{\varepsilon_0}{2\omega} \int_{V'} d^3x'(E^* \times E) - i\frac{\varepsilon_0}{2\omega} \int_{V'} d^3x' E_i[(x' - x_0) \times \nabla]E_i \quad (5)$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

continuity equation $$\frac{\partial U}{\partial t} + \nabla \cdot S = 0,$$

where S is the Poynting vector $$S = \tfrac{1}{4}(E \times H^* + E^* \times H), \quad (6)$$

and $U$ is the energy density $$U = \tfrac{1}{4}(\varepsilon |E|^2 + \mu_0 |H|^2), \quad (7)$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right) \quad (8)$$

Figure 11A:
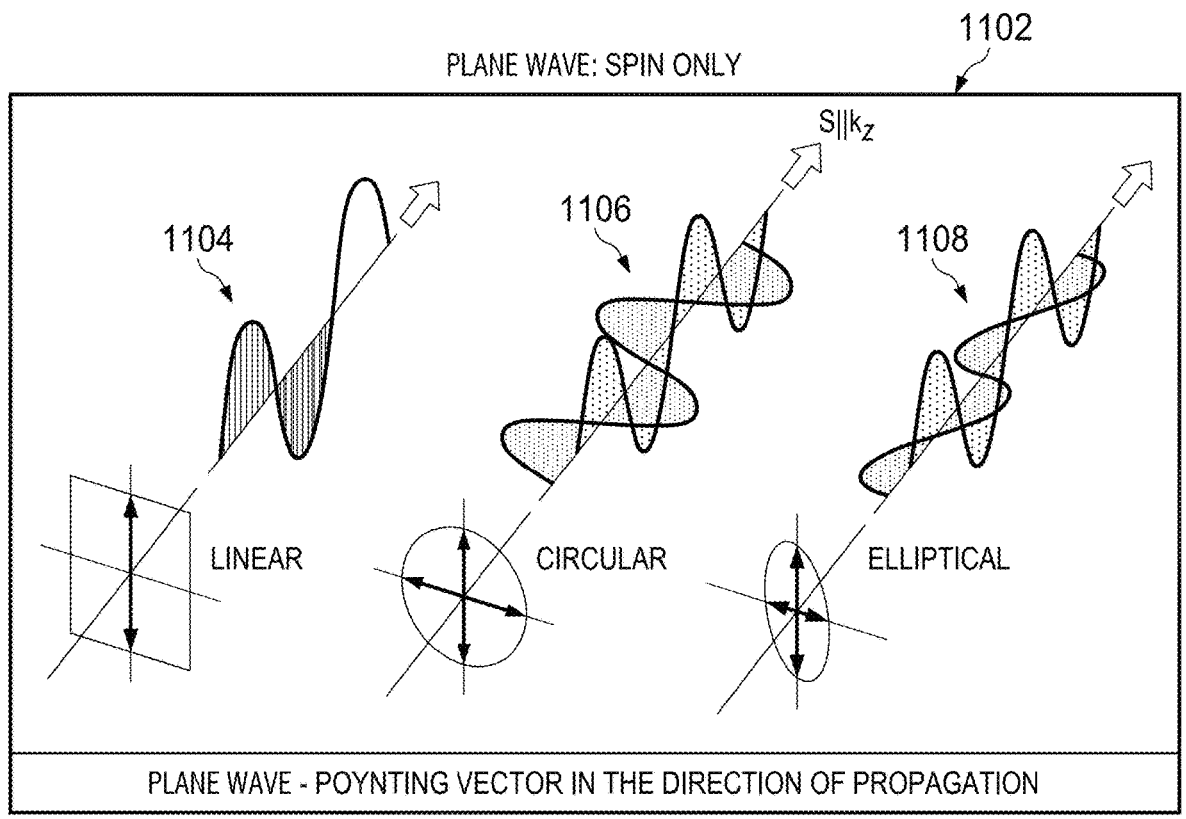
FIG. 11A illustrates a plane wave having only variations in the spin angular momentum.
Figure 11B:
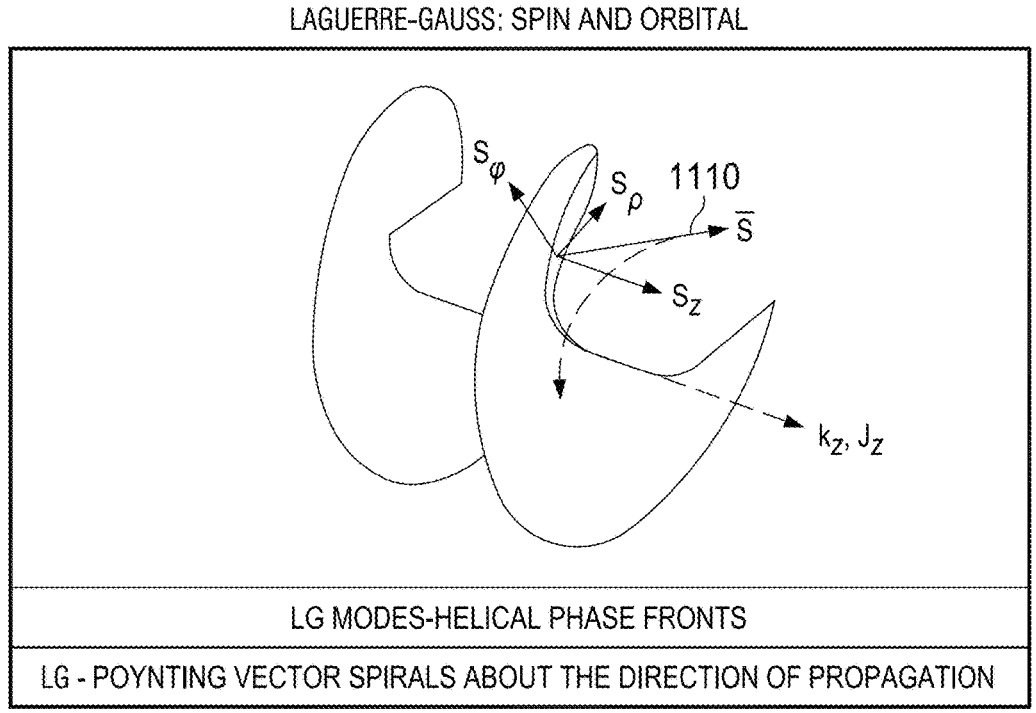
FIG. 11B illustrates a signal having both spin and orbital angular momentum applied thereto.

Referring now to FIGS. 11A and 11B, there is illustrated the manner in which a signal and its associated Poynting vector in a plane wave situation. In the plane wave situation illustrated generally at 1102, the transmitted signal may take one of three configurations. When the electric field vectors are in the same direction, a linear signal is provided, as illustrated generally at 1104. Within a circular polarization 1106, the electric field vectors rotate with the same magnitude. Within the elliptical polarization 1108, the electric field vectors rotate but have differing magnitudes. The Poynting vector remains in a constant direction for the signal configuration to FIG. 11A and always perpendicular to the electric and magnetic fields. Referring now to FIG. 11B, when a unique orbital angular momentum is applied to a signal as described here and above, the Poynting vector S 1110 will spiral about the direction of propagation of the signal. This spiral may be varied in order to enable signals to be transmitted on the same frequency as described herein.

Figure 12A:
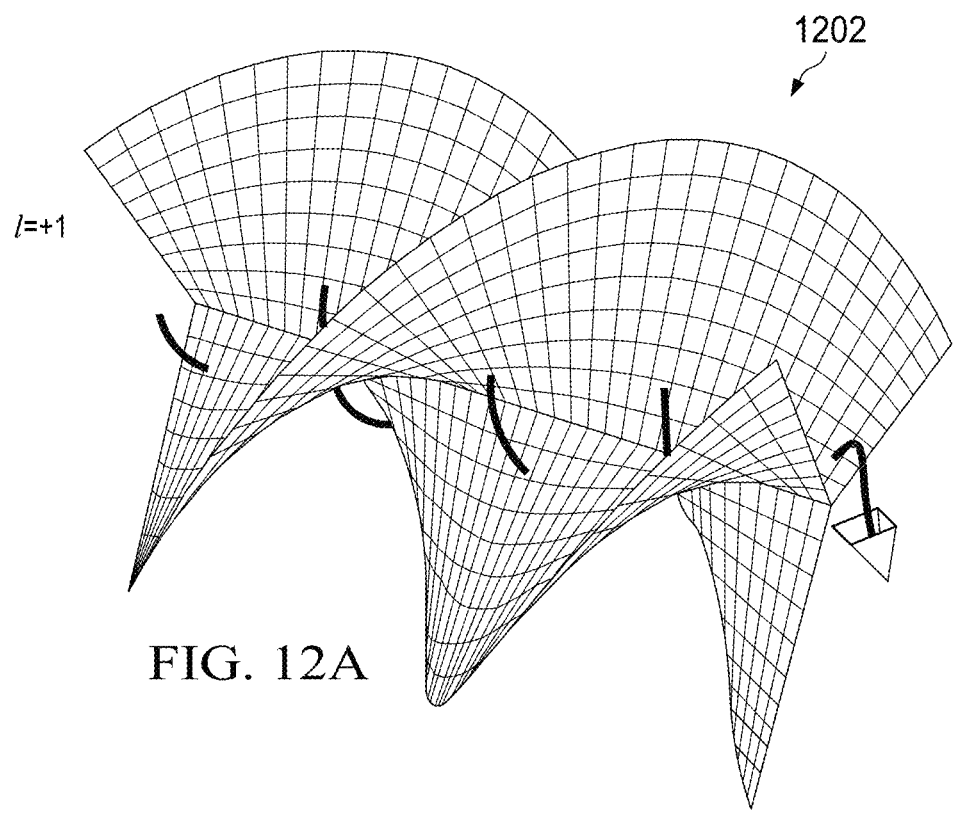
FIGS. 12A-12C illustrate various signals having different orbital angular momentum applied thereto.
Figure 12B:
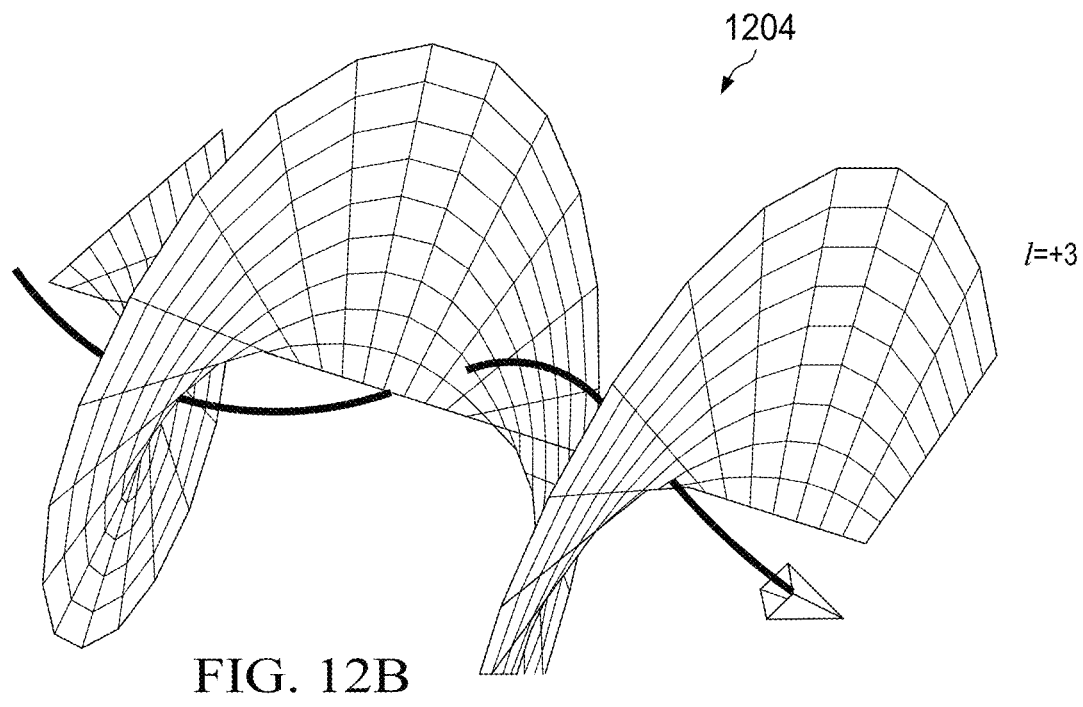
Figure 12C:
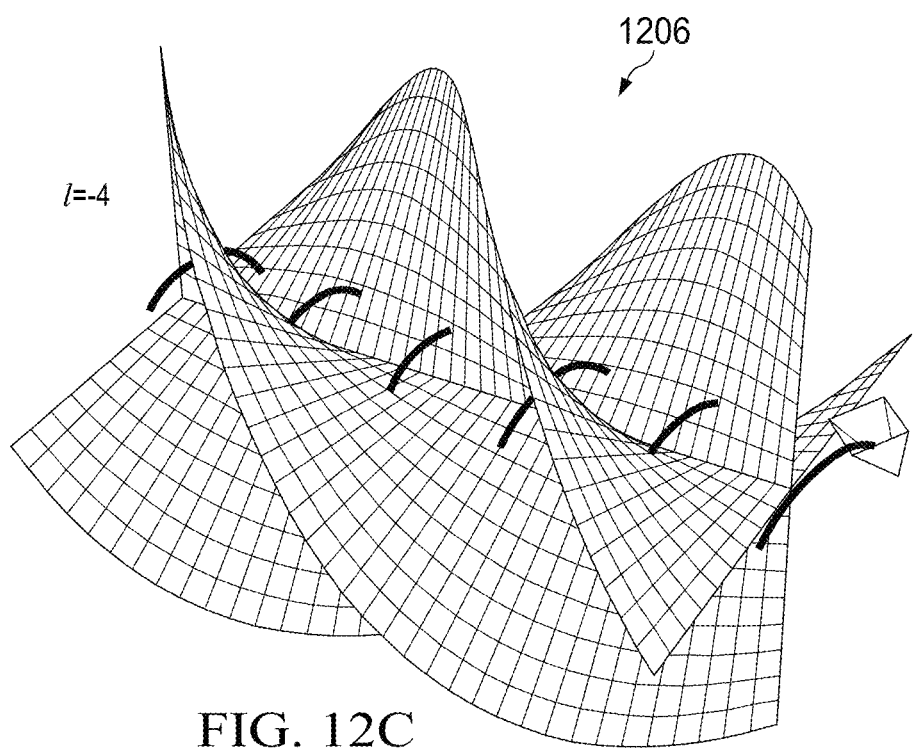

FIGS. 12A-12C illustrate the differences in signals having different helicity (i.e., orbital angular momentums). Each of the spiraling Poynting vectors associated with the signals 1102, 1104, and 1106 provide a different shaped signal. Signal 1202 has an orbital angular momentum of +1, signal 1204 has an orbital angular momentum of +3, and signal 1206 has an orbital angular momentum of −4. Each signal has a distinct angular momentum and associated Poynting vector enabling the signal to be distinguished from other signals within a same frequency. This allows differing type of information to be combined on the same frequency, since these signals are separately detectable and do not interfere with each other (Eigen channels).

Figure 12D:
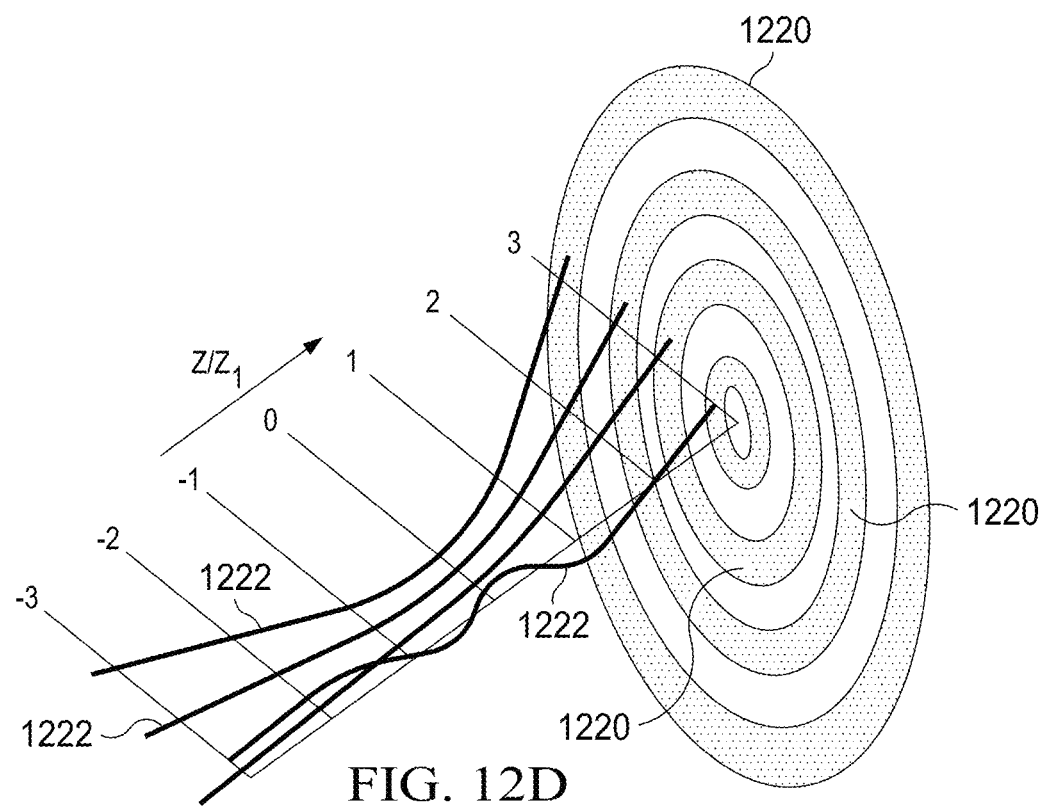
FIG. 12D illustrates a propagation of Poynting vectors for various Eigen modes.
Figure 12E:
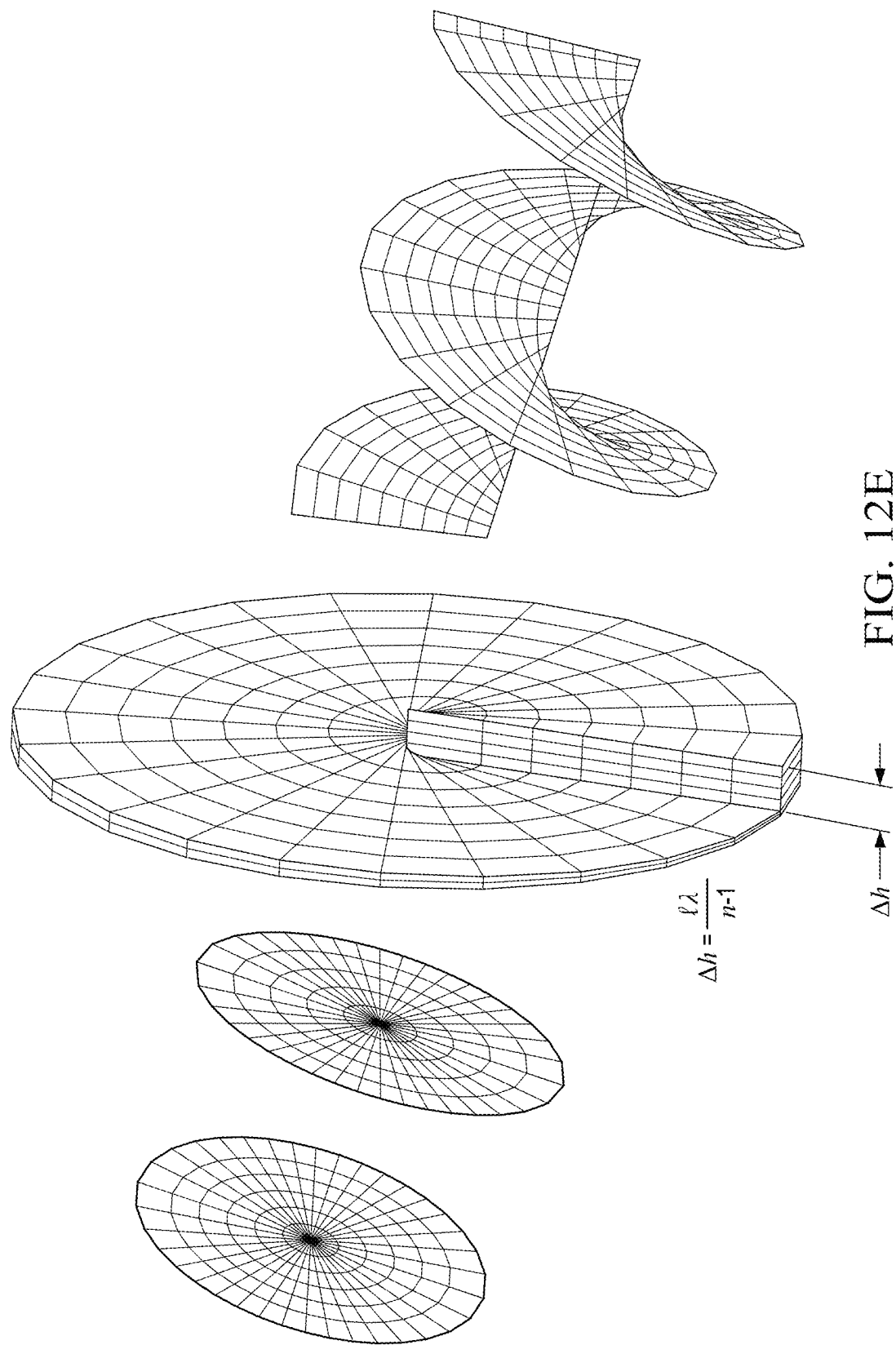
FIG. 12E illustrates a spiral phase plate.

FIG. 12D illustrates the propagation of Poynting vectors for various Eigen modes. Each of the rings 1220 represents a different Eigen mode or twist representing a different orbital angular momentum within the same frequency. Each of these rings 1220 represents a different orthogonal channel. Each of the Eigen modes has a Poynting vector 1222 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. The helicity index may be positive or negative. In RF, different topological charges can be created and muxed together and de-muxed to separate the topological charges.

The topological charges l s can be created using Spiral Phase Plates (SPPs) as shown in FIG. 11E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

These embodiments can create cross talk and multipath interference. However, cross talk and multipath interference can be corrected using RF Multiple-Input-Multiple-Output (MIMO). In one embodiment, most of the channel impairments can be detected using a control or pilot channel and be corrected using algorithmic techniques (closed loop control system). However, other techniques can be used to eliminate these channel impairments.

As described previously with respect to FIG. 5, each of the multiple data streams applied within the processing circuitry has a multiple layer overlay modulation scheme applied thereto.

Figure 13:
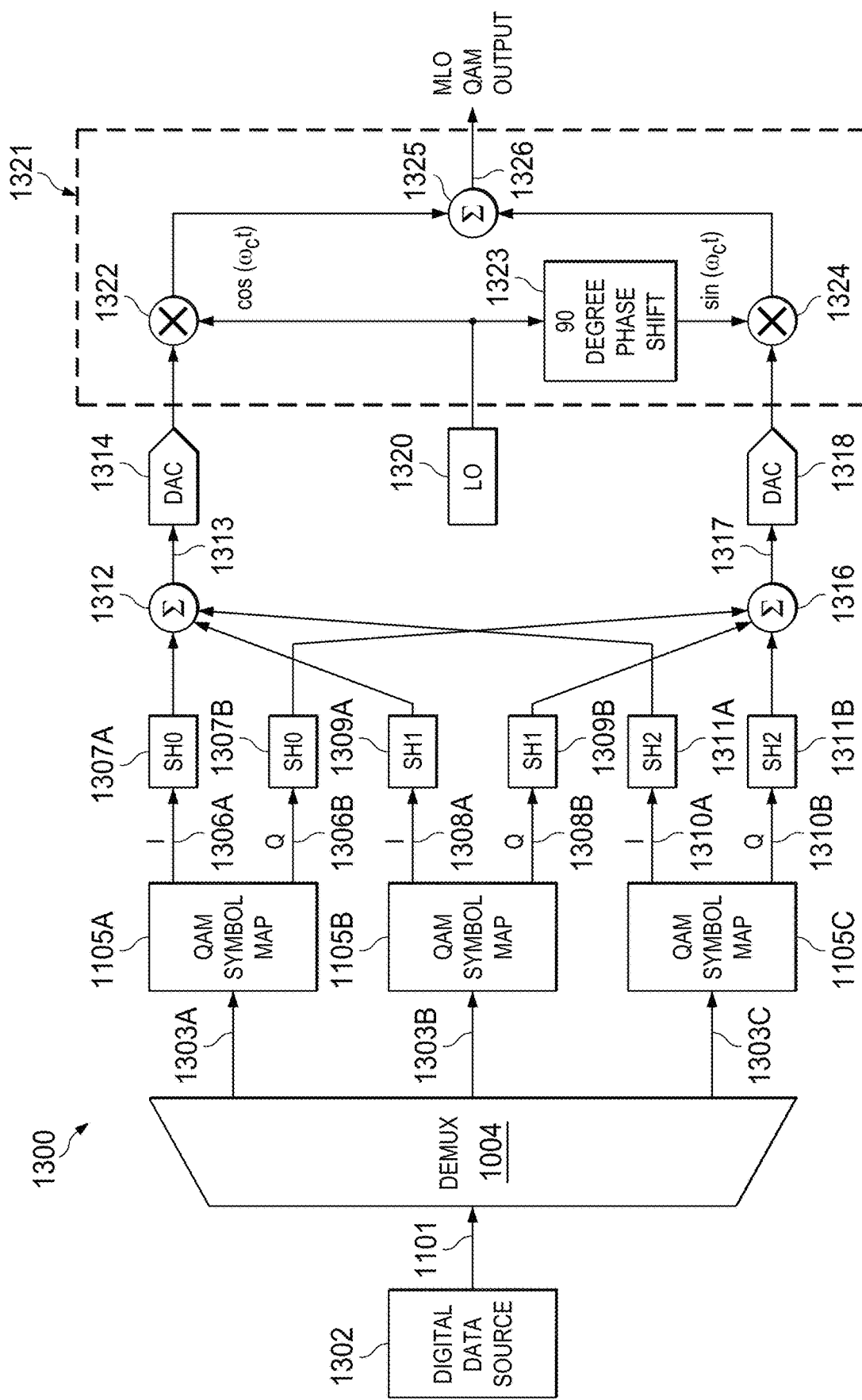
FIG. 13 illustrates a multiple level overlay modulation system.

Referring now to FIG. 13, the reference number 1300 generally indicates an embodiment of a quantum level overlay (QLO) modulation system, although it should be understood that the term QLO and the illustrated system 1300 are examples of embodiments. The QLO system may comprise one such as that disclosed in U.S. Pat. No. 8,503,546 entitled Multiple Layer Overlay Modulation which is incorporated herein by reference. In one example, the modulation system 1300 would be implemented within the multiple level overlay modulation box 504 of FIG. 5. System 1300 takes as input an input data stream 1301 from a digital source 1302, which is separated into three parallel, separate data streams, 1303A-1303C, of logical 1s and 0s by input stage demultiplexer (DEMUX) 1004. Data stream 1301 may represent a data file to be transferred, or an audio or video data stream. It should be understood that a greater or lesser number of separated data streams may be used. In some of the embodiments, each of the separated data streams 1303A-1303C has a data rate of 1/N of the original rate, where N is the number of parallel data streams. In the embodiment illustrated in FIG. 13, N is 3.

Each of the separated data streams 1303A-1303C is mapped to a quadrature amplitude modulation (QAM) symbol in an M-QAM constellation, for example, 16 QAM or 64 QAM, by one of the QAM symbol mappers 1305A-C. The QAM symbol mappers 1305A-C are coupled to respective outputs of DEMUX 1304, and produced parallel in phase (I) 1306A, 1308A, and 1310A and quadrature phase (Q) 1306B, 1308B, and 1210B data streams at discrete levels. For example, in 64 QAM, each I and Q channel uses 8 discrete levels to transmit 3 bits per symbol. Each of the three I and Q pairs, 1306A-1306B, 1308A-1308B, and 1310A-1310B, is used to weight the output of the corresponding pair of function generators 1307A-1307B, 1309A-1309B, and 1311A-1311B, which in some embodiments generate signals such as the modified Hermite polynomials described above and weights them based on the amplitude value of the input symbols. This provides 2N weighted or modulated signals, each carrying a portion of the data originally from income data stream 1301, and is in place of modulating each symbol in the I and Q pairs, 1306A-1306B, 1308A-1308B, and 1310A-1310B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

The weighted signals are not subcarriers, but rather are sublayers of a modulated carrier, and are combined, superimposed in both frequency and time, using summers 1312 and 1316, without mutual interference in each of the I and Q dimensions, due to the signal orthogonality. Summers 1312 and 1316 act as signal combiners to produce composite signals 1313 and 1317. The weighted orthogonal signals are used for both I and Q channels, which have been processed equivalently by system 1300, and are summed before the QAM signal is transmitted. Therefore, although new orthogonal functions are used, some embodiments additionally use QAM for transmission. Because of the tapering of the signals in the time domain, as will be shown in FIGS. 16A through 16K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1313 and 1317 are converted to analogue signals 1315 and 1319 using digital to analogue converters 1314 and 1318, and are then used to modulate a carrier signal at the frequency of local oscillator (LO) 1320, using modulator 1321. Modulator 1321 comprises mixers 1322 and 1324 coupled to DACs 1314 and 1318, respectively. Ninety degree phase shifter 1323 converts the signals from LO 1320 into a Q component of the carrier signal. The output of mixers 1322 and 1324 are summed in summer 1325 to produce output signals 1326.

QLO can be used in a variety of systems using different transport mediums, such as wire, optical, and wireless, and may be used in conjunction with QAM. This is because QLO uses spectral overlay of various signals, rather than spectral overlap. Spectral efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. However, as the accuracy and jitter limits of oscillators are improving additional orthogonal systems will be possible. QLQ can be used with any multiple access system to increase its spectral efficiency. For example, QLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. QLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to any physical median, such as, twisted pair, cable, fiber optic, satellite, broadcast, free-space optics, and all types of wireless access. The method and system are compatible with many current and future multiple access systems, including EV-DO, UMB, WIMAX, WCDMA (with or without), multimedia broadcast multicast service (MBMS)/ multiple input multiple output (MIMO), HSPA evolution, and LTE.

Figure 14:
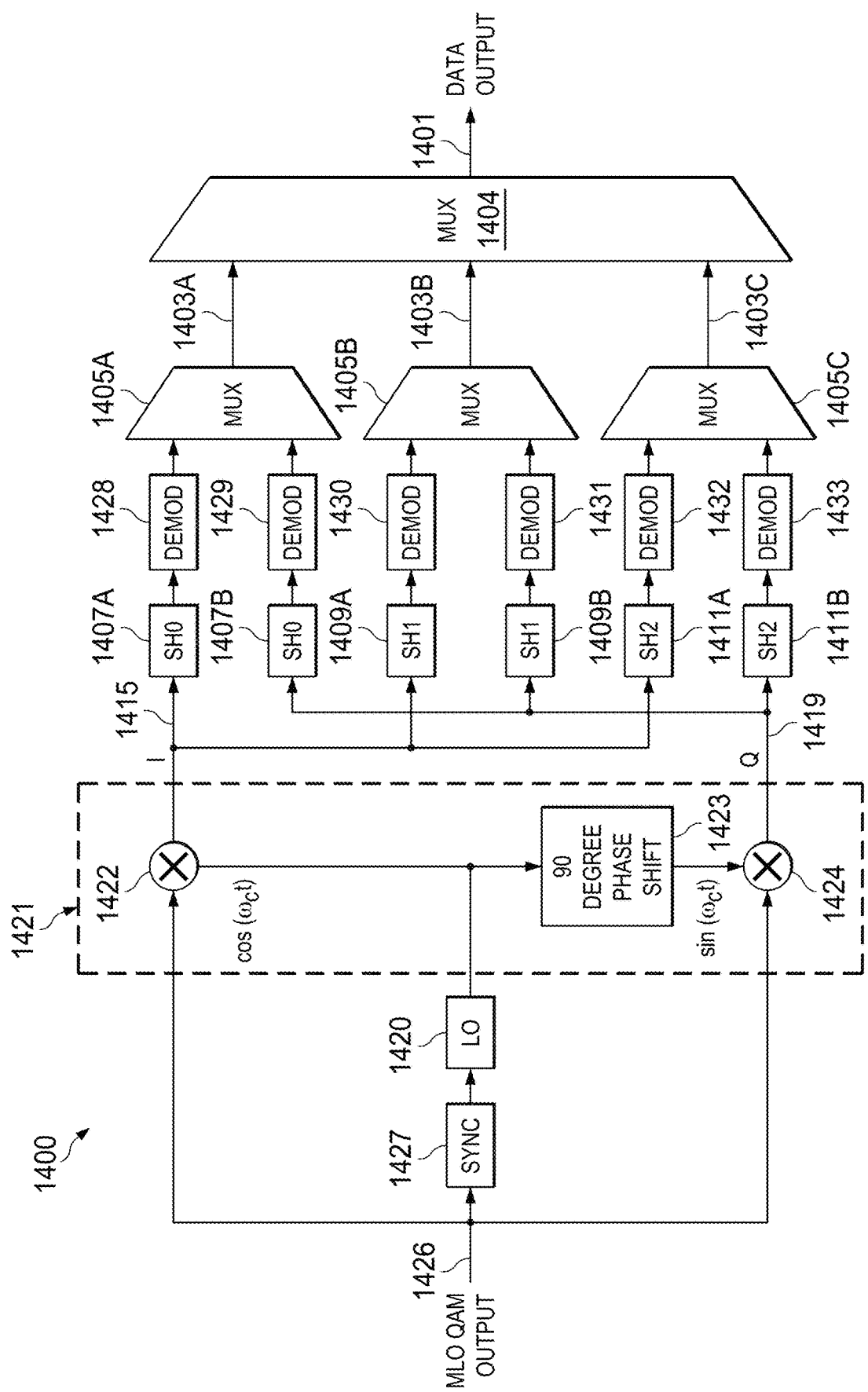
FIG. 14 illustrates a multiple level overlay demodulator.

Referring now to FIG. 14, an QLO demodulator 1400 is illustrated, although it should be understood that the term QLO and the illustrated system 1400 are examples of embodiments. The modulator 1400 takes as input an QLO signal 1226 which may be similar to output signal 1326 from system 1300. Synchronizer 1427 extracts phase information, which is input to local oscillator 1420 to maintain coherence so that the modulator 1421 can produce base band to analogue I signal 1415 and Q signal 1419. The modulator 1421 comprises mixers 1422 and 1424, which, coupled to OL 1420 through 90 degree phase shifter 1423. I signal 1415 is input to each of signal filters 1407A, 1409A, and 1411A, and Q signal 1419 is input to each of signal filters 1407B, 1409B, and 1411B. Since the orthogonal functions are known, they can be separated using correlation or other techniques to recover the modulated data. Information in each of the I and Q signals 1415 and 1419 can be extracted from the overlapped functions which have been summed within each of the symbols because the functions are orthogonal in a correlative sense.

In some embodiments, signal filters 1407A-1407B, 1409A-1409B, and 1411A-1411B use locally generated replicas of the polynomials as known signals in match filters. The outputs of the match filters are the recovered data bits, for example, equivalence of the QAM symbols 1406A-1406B, 1408A-1408B, and 1410A-1410B of system 1400. Signal filters 1407A-1407B, 1409A-1409B, and 1411A-1411B produce 2n streams of n, I, and Q signal pairs, which are input into demodulators 1428-1433. Demodulators 1428-1433 integrate the energy in their respective input signals to determine the value of the QAM symbol, and hence the logical is and 0s data bit stream segment represented by the determined symbol. The outputs of the modulators 1428-1433 are then input into multiplexers (MUXs) 1405A-1405C to generate data streams 1403A-1403C. If system 1400 is demodulating a signal from system 1300, data streams 1403A-1403C correspond to data streams 1303A-1303C. Data streams 1403A-1403C are multiplexed by MUX 1404 to generate data output stream 1401. In summary, QLO signals are overlayed (stacked) on top of one another on transmitter and separated on receiver.

QLO may be differentiated from CDMA or OFDM by the manner in which orthogonality among signals is achieved. QLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

In communications system, spectral efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.) However, spectral efficiency may also be increased for a channel by assigning the same channel to multiple processes, input/output channel or one like.

In contrast, QLO uses a set of functions which effectively form an alphabet that provides more usable channels in the same bandwidth, thereby enabling high spectral efficiency. Some embodiments of QLO do not require the use of cyclic prefixes or guard times, and therefore, outperforms OFDM in spectral efficiency, peak to average power ratio, power consumption, and requires fewer operations per bit. In addition, embodiments of QLO are more tolerant of amplifier nonlinearities than are CDMA and OFDM systems.

Figure 15:
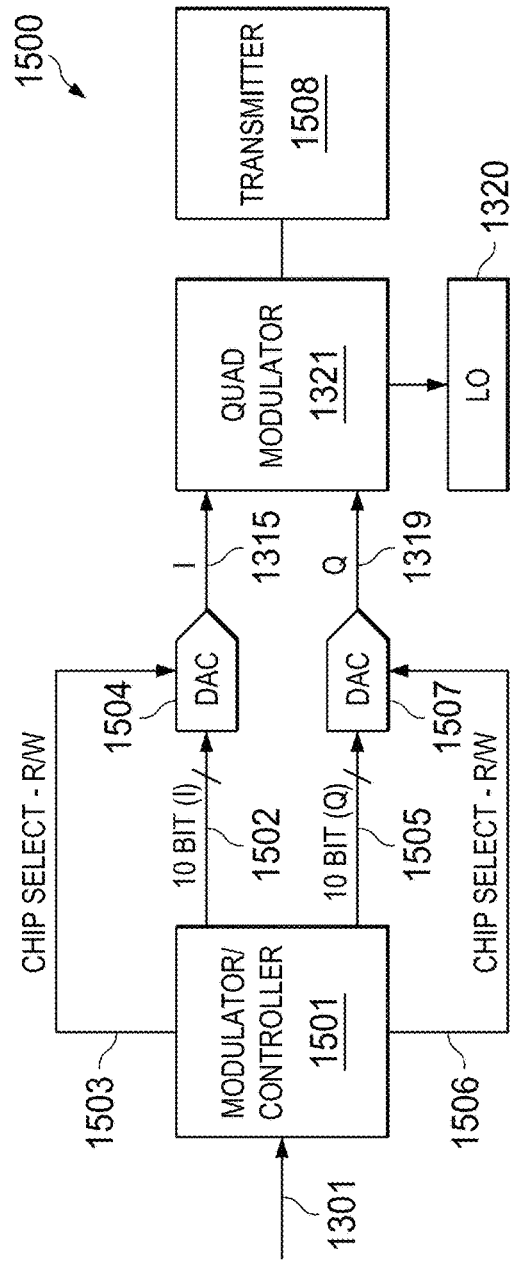
FIG. 15 illustrates a multiple level overlay transmitter system.

FIG. 15 illustrates an embodiment of an QLO transmitter system 1500, which receives input data stream 1501. System 1500 represents a modulator/controller 1501, which incorporates equivalent functionality of DEMUX 1304, QAM symbol mappers 1305A-C, function generators 1307A-1307B, 1309A-1309B, and 1311A-1311B, and summers 1312 and 1316 of system 1300, shown in FIG. 13. However, it should be understood that modulator/controller 1501 may use a greater or lesser quantity of signals than the three illustrated in system 1300. Modulator/controller 1501 may comprise an application specific integrated circuit (ASIC), a field programmable gate array (FPGA), and/or other components, whether discrete circuit elements or integrated into a single integrated circuit (IC) chip.

Modulator/controller 1501 is coupled to DACs 1504 and 1507, communicating a 10 bit I signal 1502 and a 10 bit Q signal 1505, respectively. In some embodiments, I signal 1502 and Q signal 1505 correspond to composite signals 1313 and 1317 of system 1300. It should be understood, however, that the 10 bit capacity of I signal 1502 and Q signal 1505 is merely representative of an embodiment. As illustrated, modulator/controller 1501 also controls DACs 1504 and 1507 using control signals 1503 and 1506, respectively. In some embodiments, DACs 1504 and 1507 each comprise an AD5433, complementary metal oxide semiconductor (CMOS) 10 bit current output DAC. In some embodiments, multiple control signals are sent to each of DACs 1504 and 1507.

DACs 1504 and 1507 output analogue signals 1315 and 1319 to quadrature modulator 1321, which is coupled to LO 1320. The output of modulator 1320 is illustrated as coupled to a transmitter 1508 to transmit data wirelessly, although in some embodiments, modulator 1321 may be coupled to a fiber-optic modem, a twisted pair, a coaxial cable, or other suitable transmission media.

Figure 16:
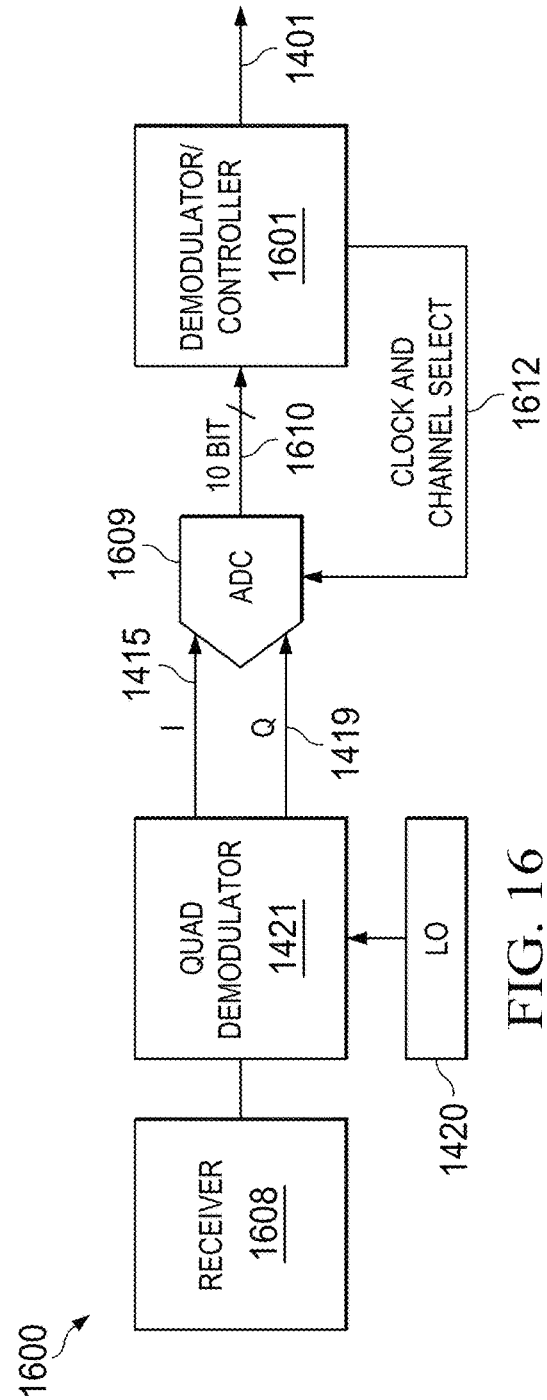
FIG. 16 illustrates a multiple level overlay receiver system.

FIG. 16 illustrates an embodiment of an QLO receiver system 1600 capable of receiving and demodulating signals from system 1500. System 1600 receives an input signal from a receiver 1608 that may comprise input medium, such as RF, wired or optical. The modulator 1421 driven by LO 1420 converts the input to baseband I signal 1415 and Q signal 1419. I signal 1415 and Q signal 1419 are input to analogue to digital converter (ADC) 1609.

ADC 1609 outputs 10 bit signal 1610 to demodulator/controller 1601 and receives a control signal 1612 from demodulator/controller 1601. Demodulator/controller 1601 may comprise an application specific integrated circuit (ASIC), a field programmable gate array (FPGA), and/or other components, whether discrete circuit elements or integrated into a single integrated circuit (IC) chip. Demodulator/controller 1601 correlates received signals with locally generated replicas of the signal set used, in order to perform demodulation and identify the symbols sent. Demodulator/controller 1601 also estimates frequency errors and recovers the data clock, which is used to read data from the ADC 1609. The clock timing is sent back to ADC 1609 using control signal 1612, enabling ADC 1609 to segment the digital I and Q signals 1415 and 1419. In some embodiments, multiple control signals are sent by demodulator/controller 1601 to ADC 1609. Demodulator/controller 1601 also outputs data signal 1401.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of QLO systems. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for QLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an QLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of QLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an QLO system uses functions based on modified Hermite polynomials, 4n, and are defined by:

$$\Psi_n(t, \xi) = \frac{(\tanh \xi)^{n/2}}{2^{n/2}(n!\cosh \xi)^{1/2}} e^{\frac{1}{2}t^2[1-\tanh \xi]} H_n\left(\frac{1}{\sqrt{2\cosh\xi \sinh\xi}}\right) \quad (9)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\int\int \Psi_n(t,\xi)\Psi_m(t,\xi) dt d\xi \quad (10)$$

The Hermite polynomial is defined by the contour integral:

$$H_n(z) = \frac{n!}{2\pi i}\oint e^{-t^2+2tz} t^{-n-1} dt, \quad (11)$$

where the contour encloses the origin and is traversed in a counterclockwise direction. Hermite polynomials are described in Mathematical Methods for Physicists, by George Arfken, for example on page 416, the disclosure of which is incorporated by reference.

Figure 17A:
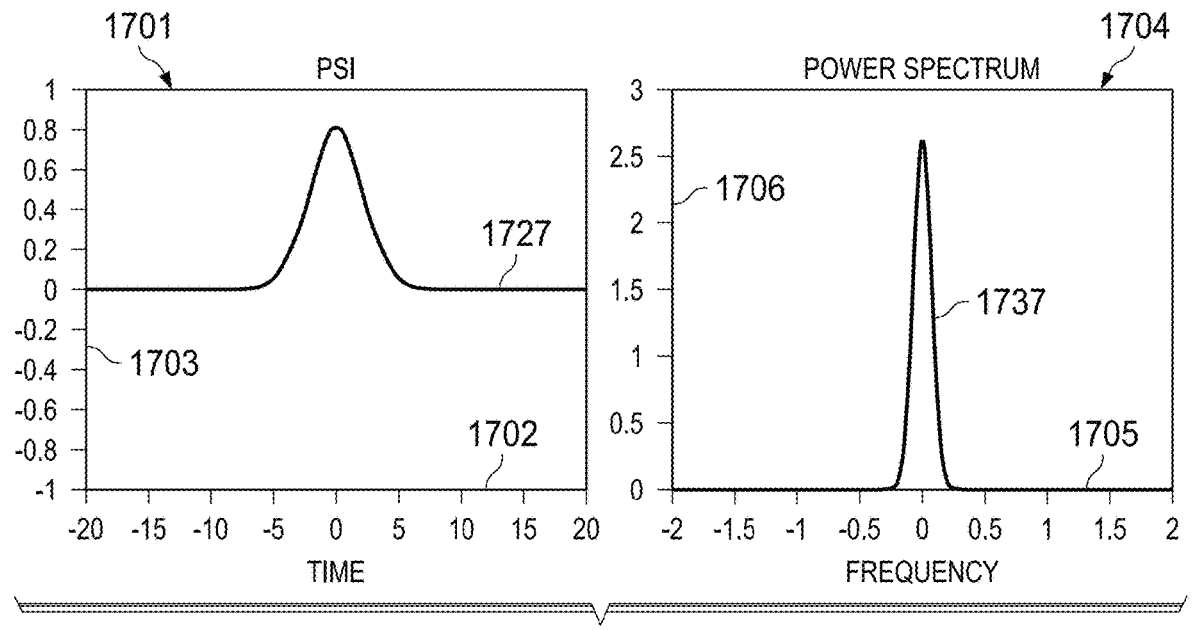
FIGS. 17A-17K illustrate representative multiple level overlay signals and their respective spectral power densities.
Figure 17B:
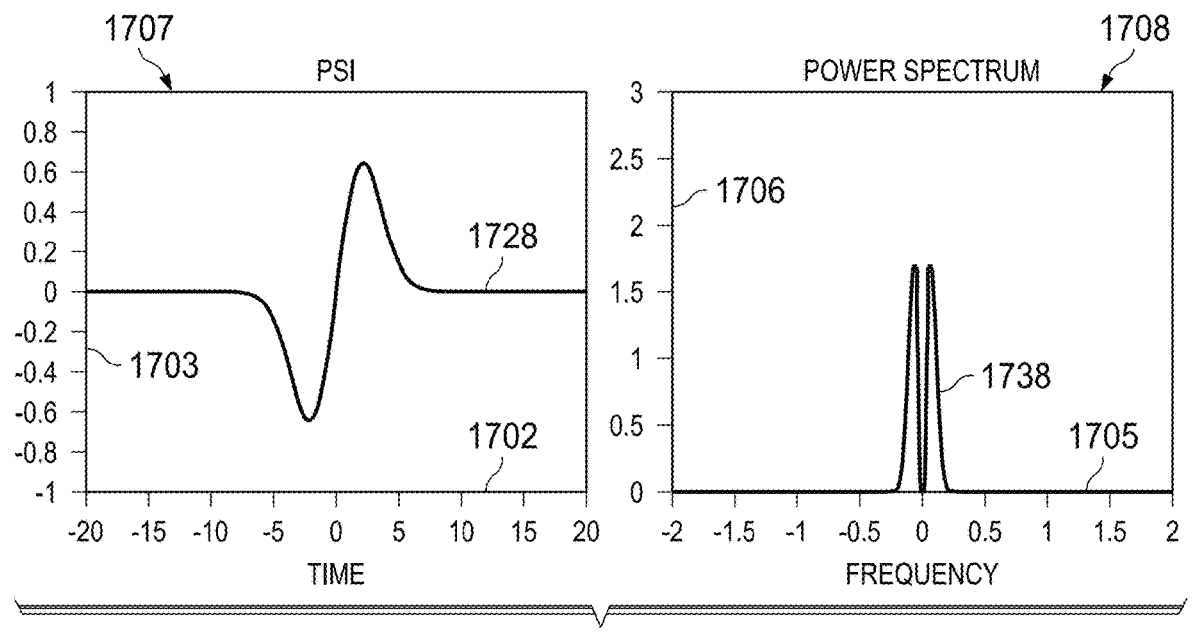
Figure 17C:
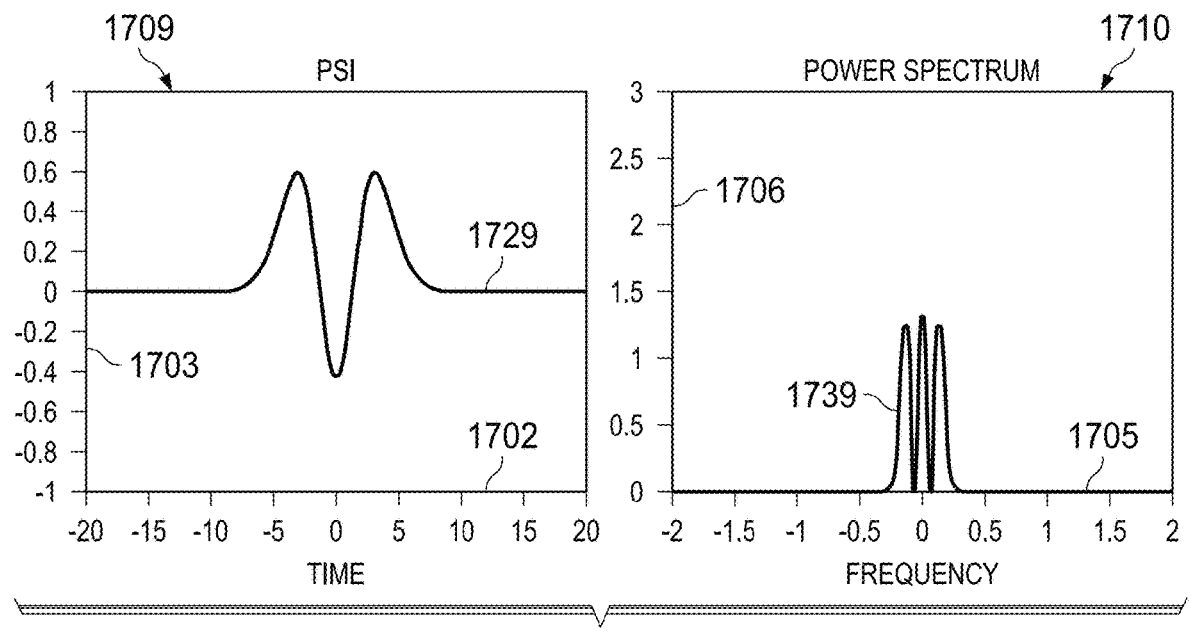
Figure 17D:
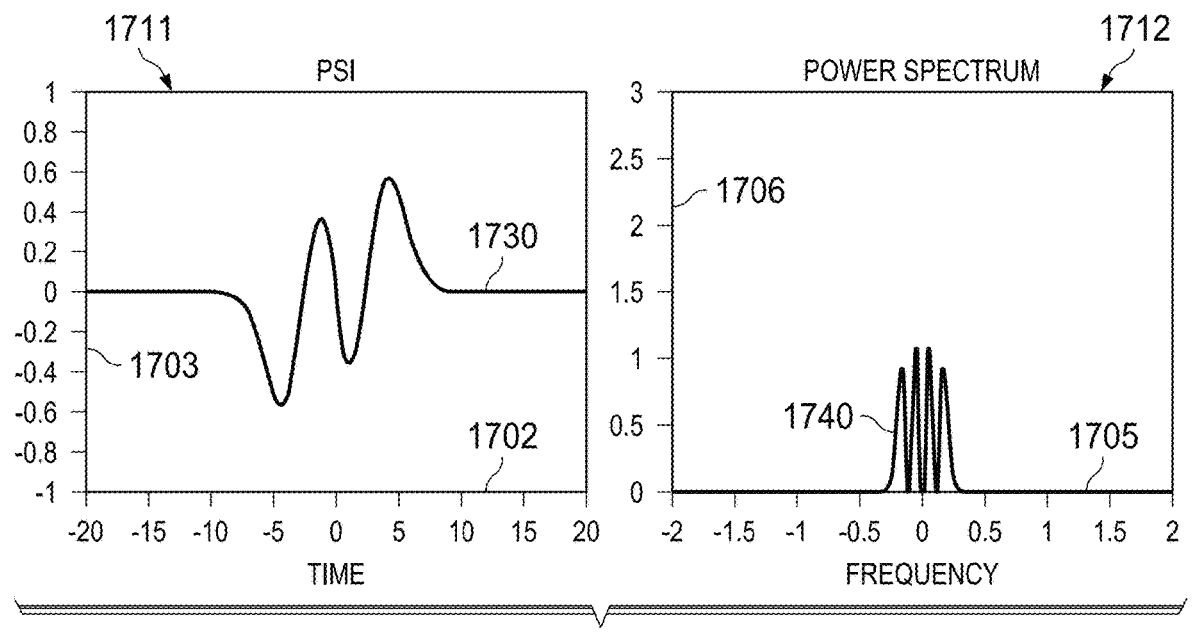
Figure 17E:
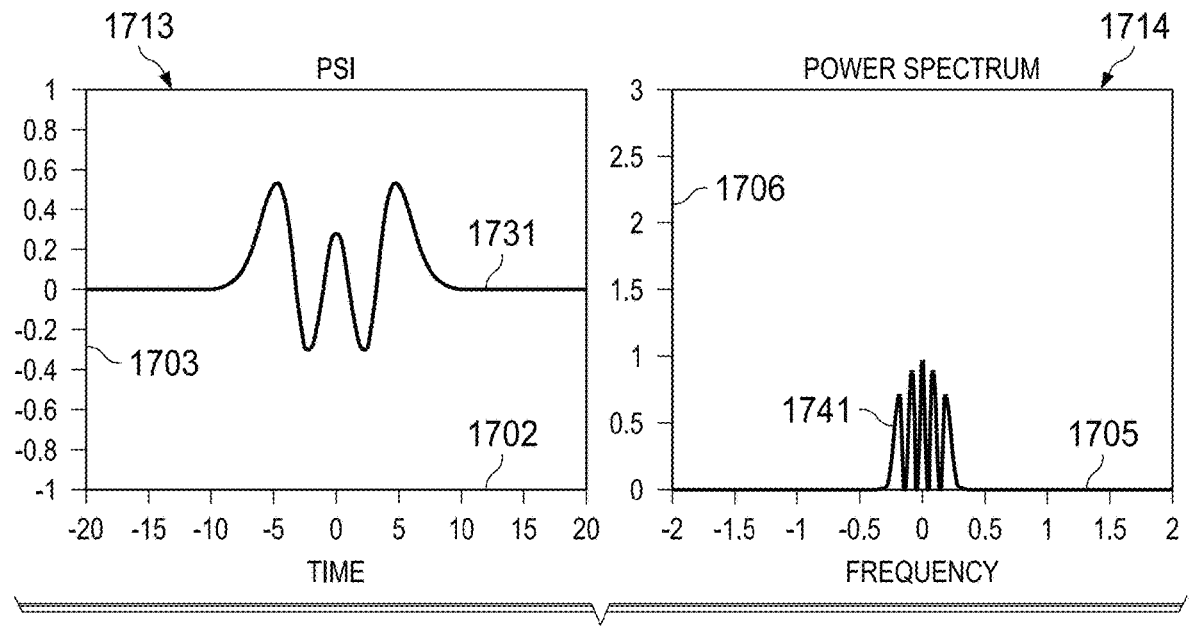
Figure 17F:
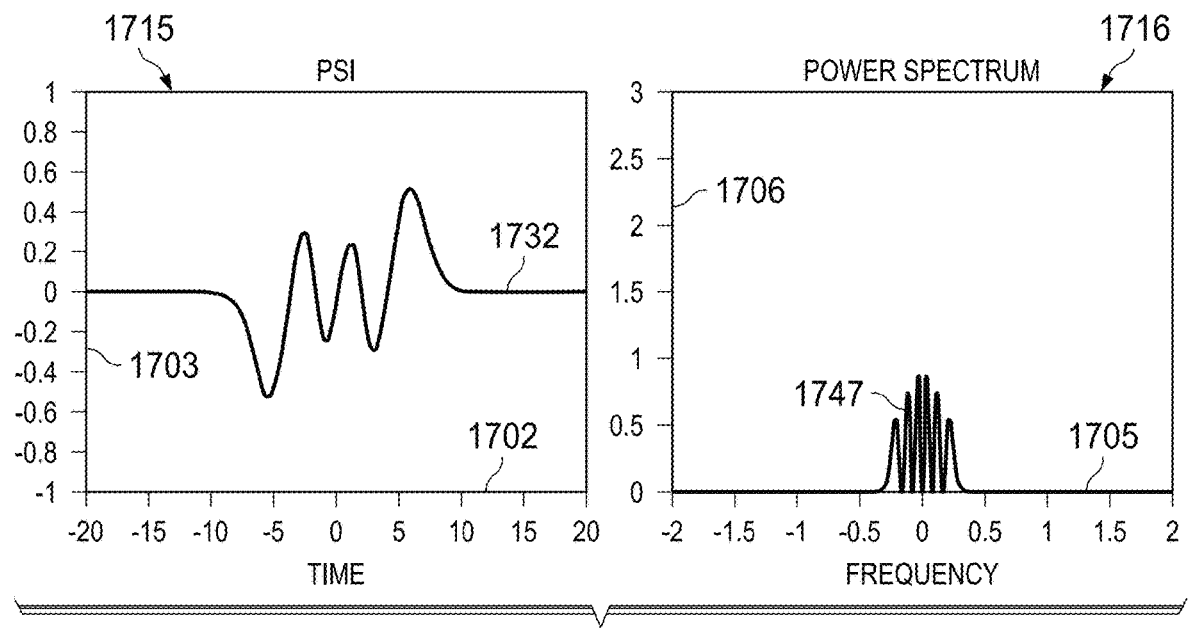
Figure 17G:
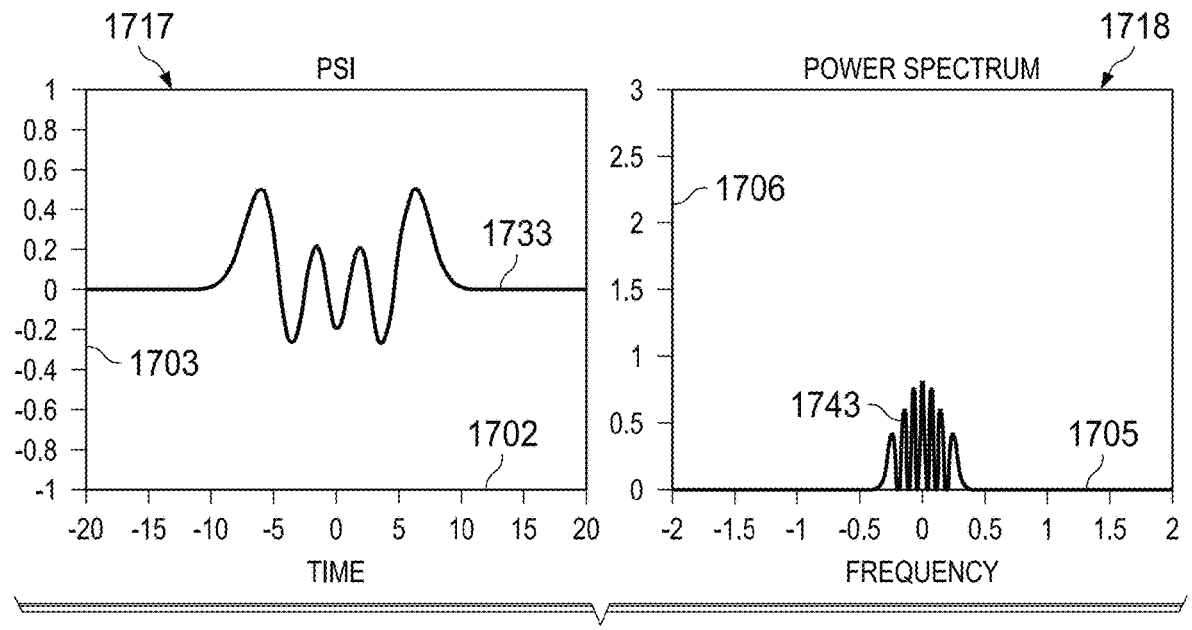
Figure 17H:
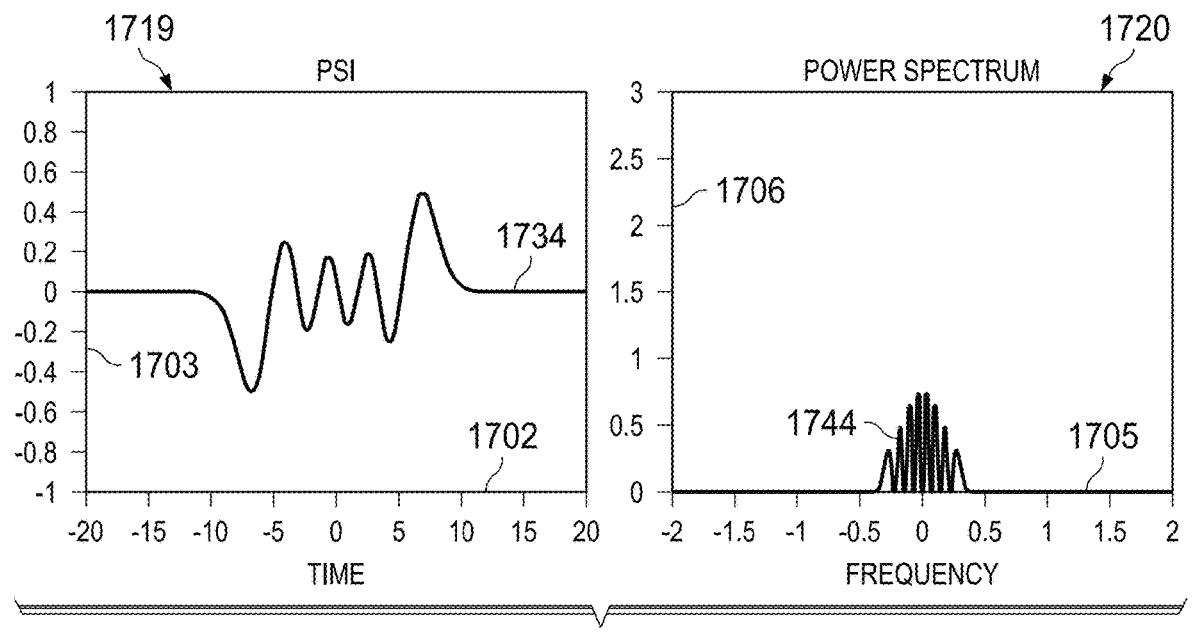
Figure 17I:
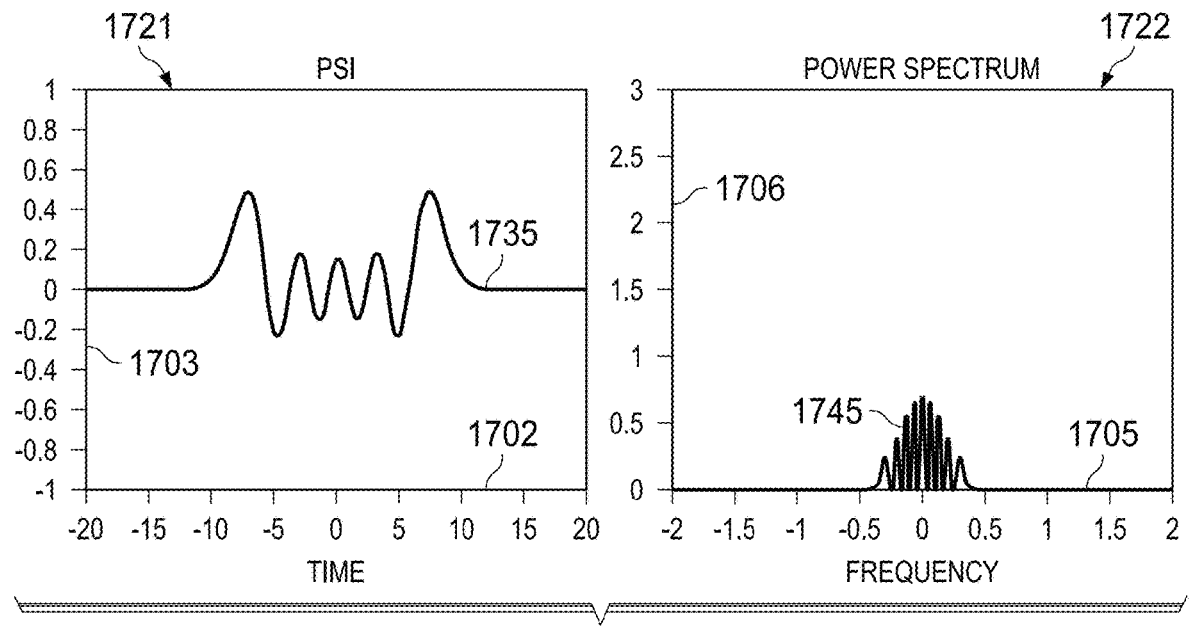
Figure 17J:
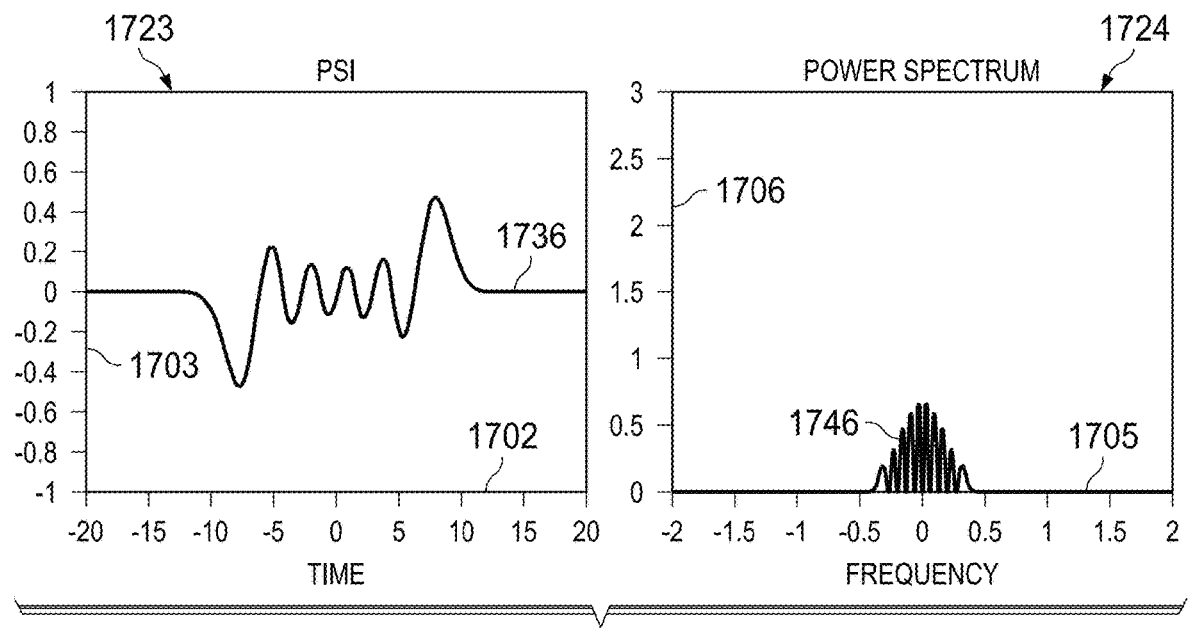

FIGS. 17A-17K illustrate representative QLO signals and their respective spectral power densities based on the modified Hermite polynomials $\Psi_n$ for n ranging from 0 to 9. FIG. 17A shows plots 1701 and 1704. Plot 1701 comprises a curve 1727 representing $\Psi_0$ plotted against a time axis 1702 and an amplitude axis 1703. As can be seen in plot 1701, curve 1727 approximates a Gaussian curve. Plot 1704 comprises a curve 1737 representing the power spectrum of $\Psi_0$ plotted against a frequency axis 1705 and a power axis 1706. As can be seen in plot 1704, curve 1737 also approximates a Gaussian curve. Frequency domain curve 1707 is generated using a Fourier transform of time domain curve 1727. The units of time and frequency on axis 1702 and 1705 are normalized for baseband analysis, although it should be understood that since the time and frequency units are related by the Fourier transform, a desired time or frequency span in one domain dictates the units of the corresponding curve in the other domain. For example, various embodiments of QLO systems may communicate using symbol rates in the megahertz (MHz) or gigahertz (GHz) ranges and the non-0 duration of a symbol represented by curve 1727, i.e., the time period at which curve 1727 is above 0 would be compressed to the appropriate length calculated using the inverse of the desired symbol rate. For an available bandwidth in the megahertz range, the non-0 duration of a time domain signal will be in the microsecond range.

FIGS. 17B-17J show plots 1707-1724, with time domain curves 1728-1736 representing $\Psi_1$ through $\Psi_9$, respectively, and their corresponding frequency domain curves 1738-1746. As can be seen in FIGS. 17A-17J, the number of peaks in the time domain plots, whether positive or negative, corresponds to the number of peaks in the corresponding frequency domain plot. For example, in plot 1723 of FIG. 17J, time domain curve 1736 has five positive and five negative peaks. In corresponding plot 1724 therefore, frequency domain curve 1746 has ten peaks.

Figure 17K:
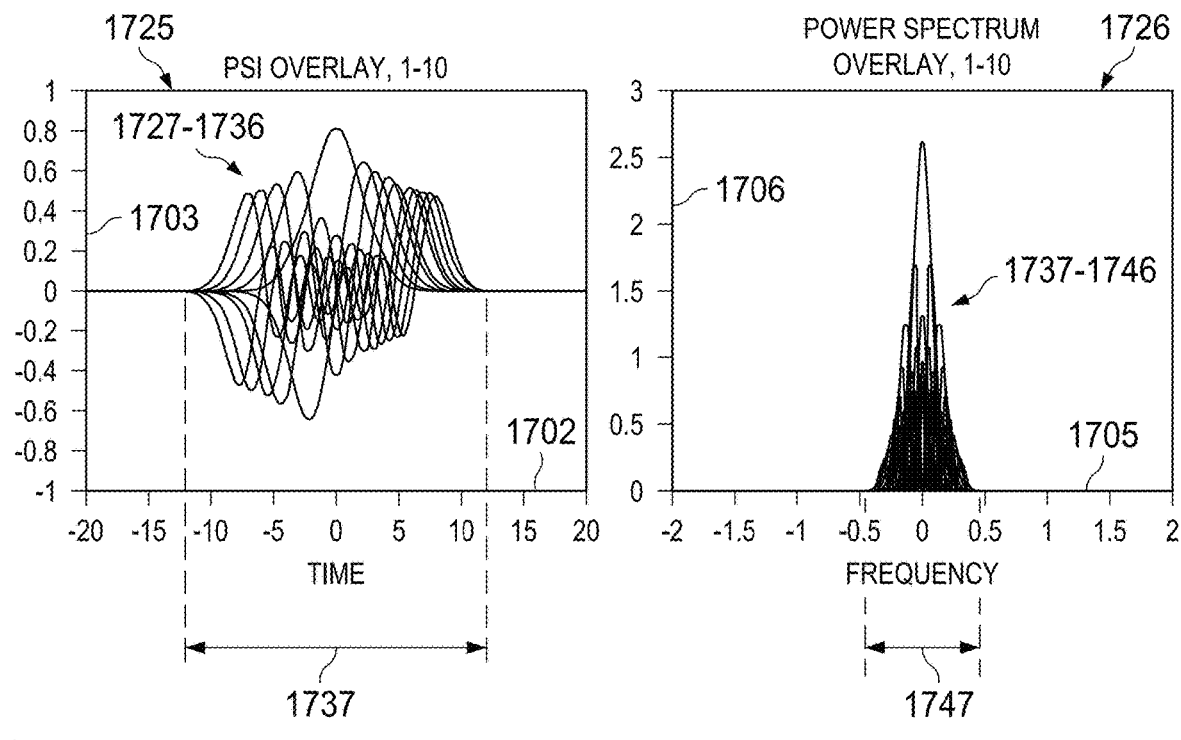

FIG. 17K shows overlay plots 1725 and 1726, which overlay curves 1727-1736 and 1737-1746, respectively. As indicated in plot 1725, the various time domain curves have different durations. However, in some embodiments, the non-zero durations of the time domain curves are of similar lengths. For an QLO system, the number of signals used represents the number of overlays and the improvement in spectral efficiency. It should be understood that, while ten signals are disclosed in FIGS. 17A-17K, a greater or lesser quantity of signals may be used, and that further, a different set of signals, rather than the $\Psi_n$ signals plotted, may be used.

QLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. QLO overlays orthogonal signals within a single symbol period. This orthogonality prevents ISI and inter-carrier interference (ICI).

Because QLO works in the baseband layer of signal processing, and some embodiments use QAM architecture, conventional wireless techniques for optimizing air interface, or wireless segments, to other layers of the protocol stack will also work with QLO. Techniques such as channel diversity, equalization, error correction coding, spread spectrum, interleaving and space-time encoding are applicable to QLO. For example, time diversity using a multipath-mitigating rake receiver can also be used with QLO. QLO provides an alternative for higher order QAM, when channel conditions are only suitable for low order QAM, such as in fading channels. QLO can also be used with CDMA to extend the number of orthogonal channels by overcoming the Walsh code limitation of CDMA. QLO can also be applied to each tone in an OFDM signal to increase the spectral efficiency of the OFDM systems.

Embodiments of QLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for QLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because QLO is transparent beyond the symbol level. QLO addresses modification of the symbol, but since CDMA and TDMA are spreading techniques of multiple symbol sequences over time. QLO can be used along with CDMA and TDMA.

Figure 18:
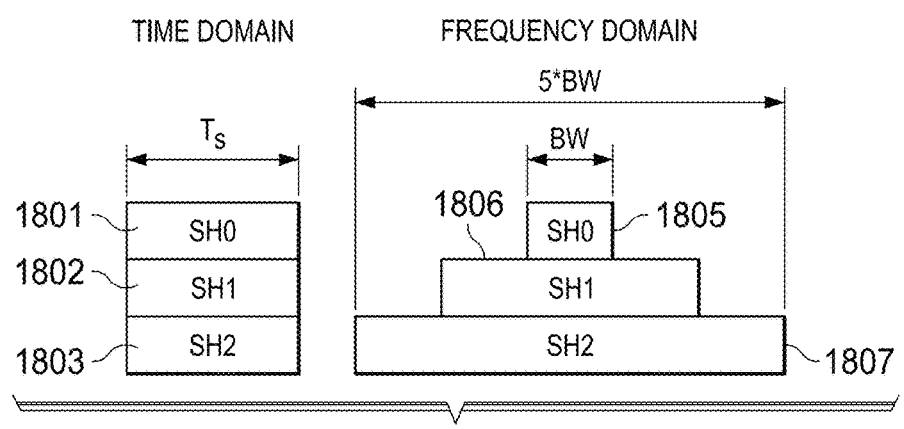
FIG. 18 illustrates comparisons of multiple level overlay signals within the time and frequency domain.

FIG. 18 illustrates a comparison of QLO signal widths in the time and frequency domains. Time domain envelope representations 1801-1803 of signals SH0-SH3 are illustrated as all having a duration Ts. SH0-SH3 may represent $PSI_0$-$PSI_2$, or may be other signals. The corresponding frequency domain envelope representations are 1805-1807, respectively. SH0 has a bandwidth BW, SH1 has a bandwidth three times BW, and SH2 has a bandwidth of 5 BW, which is five times as great as that of SH0. The bandwidth used by an QLO system will be determined, at least in part, by the widest bandwidth of any of the signals used. If each layer uses only a single signal type within identical time windows, the spectrum will not be fully utilized, because the lower order signals will use less of the available bandwidth than is used by the higher order signals.

FIG. 19 illustrates a spectral alignment of QLO signals that accounts for the differing bandwidths of the signals, and makes spectral usage more uniform, using SH0-SH3. Blocks 1901-1904 are frequency domain blocks of an OFDM signal with multiple subcarriers. Block 1903 is expanded to show further detail. Block 1903 comprises a first layer 1903x comprised of multiple SH0 envelopes 1903a-1903o. A second layer 1903y of SH1 envelopes 1903p-1903t has one third the number of envelopes as the first layer. In the illustrated example, first layer 1903x has 15 SH0 envelopes, and second layer 1903y has five SH1 envelopes. This is because, since the SH1 bandwidth envelope is three times as wide as that of SH0, 15 SH0 envelopes occupy the same spectral width as five SH1 envelopes. The third layer 1903z of block 1903 comprises three SH2 envelopes 1903u-1903w, because the SH2 envelope is five times the width of the SH0 envelope.

The total required bandwidth for such an implementation is a multiple of the least common multiple of the bandwidths of the QLO signals. In the illustrated example, the least common multiple of the bandwidth required for SH0, SH1, and SH2 is 15 BW, which is a block in the frequency domain. The OFDM-QLO signal can have multiple blocks, and the spectral efficiency of this illustrated implementation is proportional to (15+5+3)/15.

FIG. 20 illustrates another spectral alignment of QLO signals, which may be used alternatively to alignment scheme shown in FIG. 18. In the embodiment illustrated in FIG. 20, the OFDM-QLO implementation stacks the spectrum of SH0, SH1, and SH2 in such a way that the spectrum in each layer is utilized uniformly. Layer 2000A comprises envelopes 2001A-2001D, which includes both SH0 and SH2 envelopes. Similarly, layer 2000C, comprising envelopes 2003A-2003D, includes both SH0 and SH2 envelopes. Layer 2000B, however, comprising envelopes 2002A-2002D, includes only SH1 envelopes. Using the ratio of envelope sizes described above, it can be easily seen that BW+5 BW=3 BW+3 BW. Thus, for each SH0 envelope in layer 2000A, there is one SH2 envelope also in layer 2000C and two SH1 envelopes in layer 2000B.

Three Scenarios Compared:
1) QLO with 3 Layers defined by:

$$f_0(t) = W_0 e^{-\frac{t^2}{4}}, W_0 = 0.6316$$

$$f_1(t) = W_1 t e^{-\frac{t^2}{4}}, W_1 \approx 0.6316$$

$$f_2(t) = W_2(t^2 - 1)e^{-\frac{t^2}{4}}, W_2 \approx 0.4466$$

(The current FPGA implementation uses the truncation interval of [−6, 6].)
2) Conventional scheme using rectangular pulse
3) Conventional scheme using a square-root raised cosine (SRRC) pulse with a roll-off factor of 0.5

For QLO pulses and SRRC pulse, the truncation interval is denoted by [−t1, t1] in the following figures. For simplicity, we used the QLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of l 1 and l 2, respectively:

$$U_1(r,\theta,z) = A_1(r,z)\exp(il_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different l states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 21:
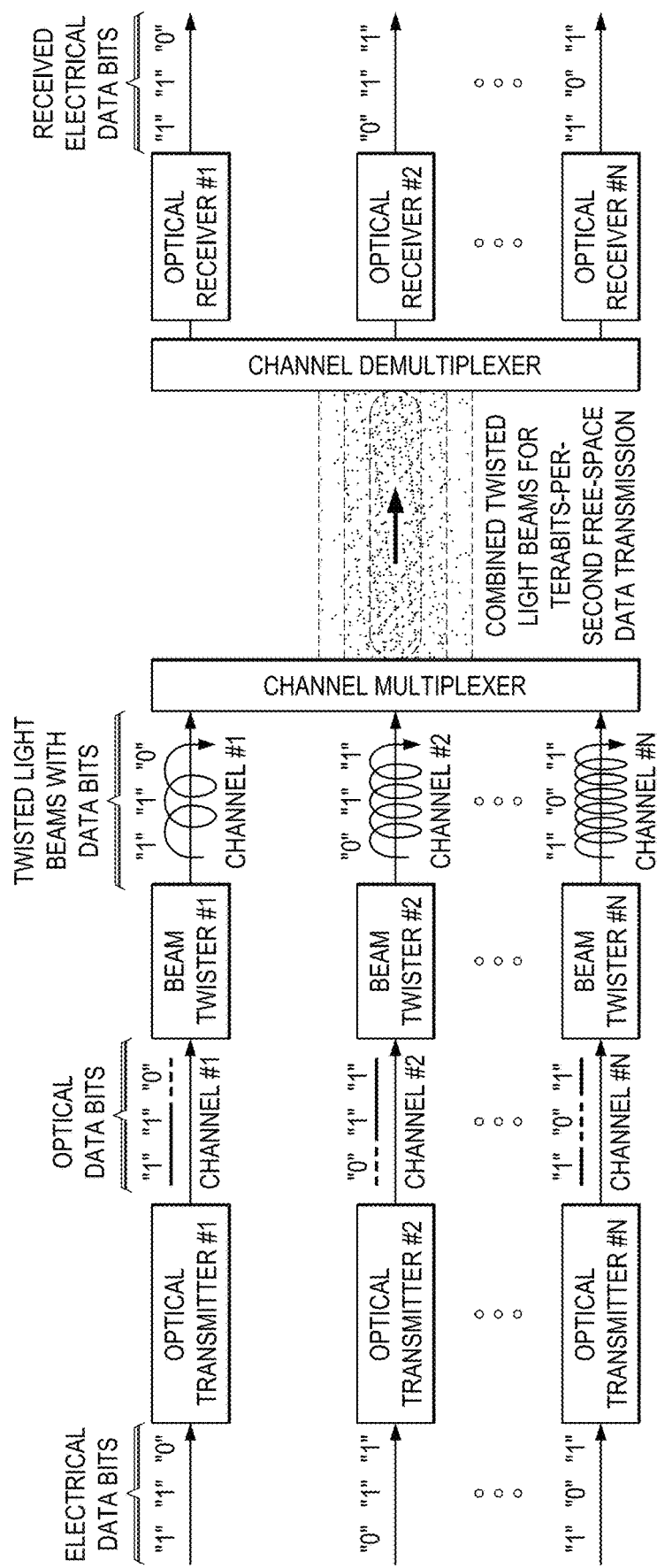
FIG. 21 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 21. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated.

One could obtain a single or multiple OAM beams directly from the output of a laser cavity, or by converting a fundamental Gaussian beam into an OAM beam outside a cavity. The converter could be a spiral phase plate, diffractive phase holograms, metal materials, cylindrical lens pairs, q-plates or fiber structures. There are also different ways to detect an OAM beam, such as using a converter that creates a conjugate helical phase, or using a plasmonic detector.

Mode Conversion Approaches

Figure 22:
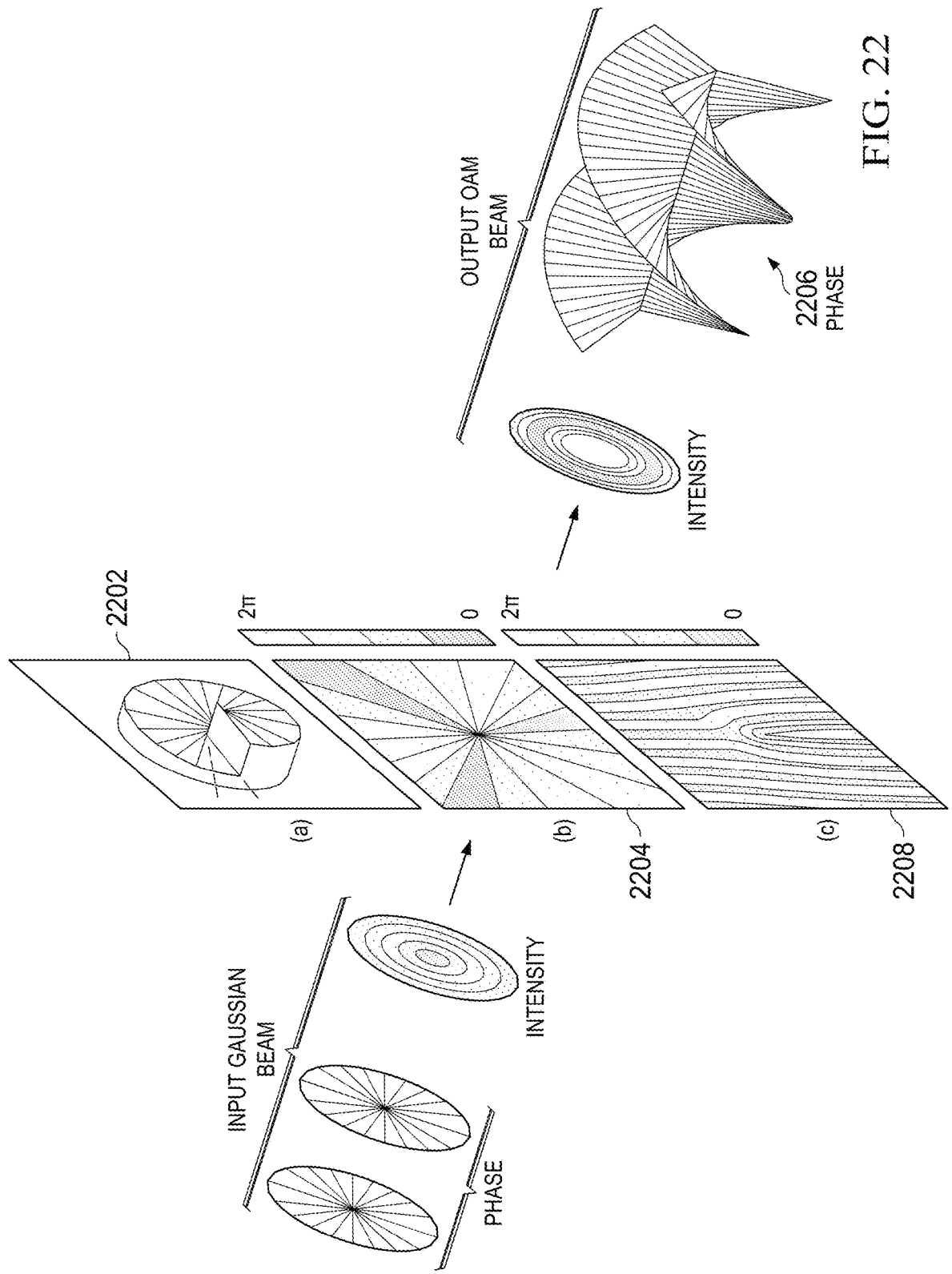
FIG. 22 illustrates various manners for converting a Gaussian beam into an OAM beam.

Referring now to FIG. 22, among all external-cavity methods, perhaps the most straightforward one is to pass a Gaussian beam through a coaxially placed spiral phase plate (SPP) 2202. An SPP 2202 is an optical element with a helical surface, as shown in FIG. 22A. To produce an OAM beam with a state of l, the thickness profile of the plate should be machined as $l\lambda\theta/2\pi(n-1)$, where n is the refractive index of the medium. A limitation of using an SPP 2202 is that each OAM state requires a different specific plate. As an alternative, reconfigurable diffractive optical elements, e.g., a pixelated spatial light modulator (SLM) 2204, or a digital micro-mirror device can be programmed to function as any refractive element of choice at a given wavelength. As mentioned above, a helical phase profile exp(ilθ) converts a linearly polarized Gaussian laser beam into an OAM mode, whose wave front resembles an f-fold corkscrew 2206, as shown at 2204. Importantly, the generated OAM beam can be easily changed by simply updating the hologram loaded on the SLM 2204. To spatially separate the phase-modulated beam from the zeroth-order non-phase-modulated reflection from the SLM, a linear phase ramp is added to helical phase code (i.e., a "fork"-like phase pattern 2208 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

Figure 23A:
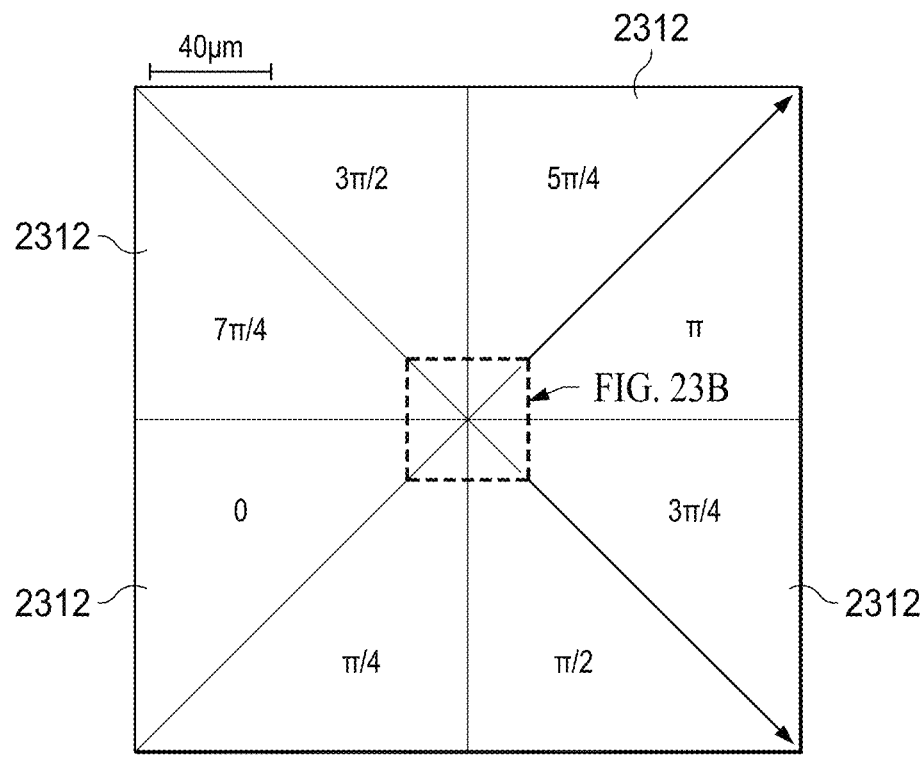
FIG. 23A illustrates a fabricated metasurface phase plate.
Figure 23B:
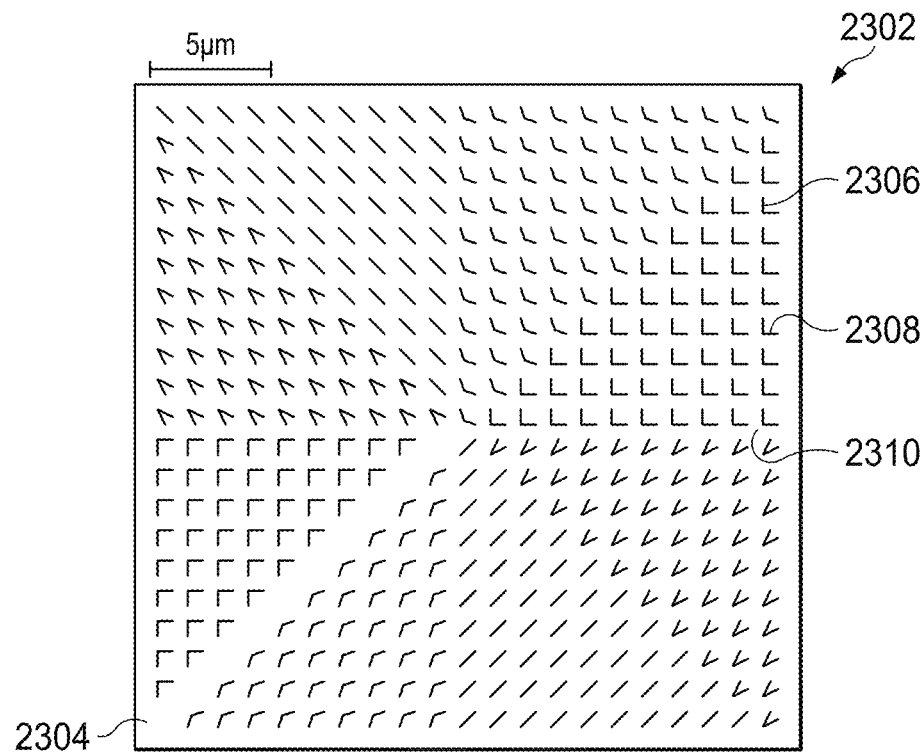
FIG. 23B illustrates a magnified structure of the metasurface phase plate.
Figure 23C:
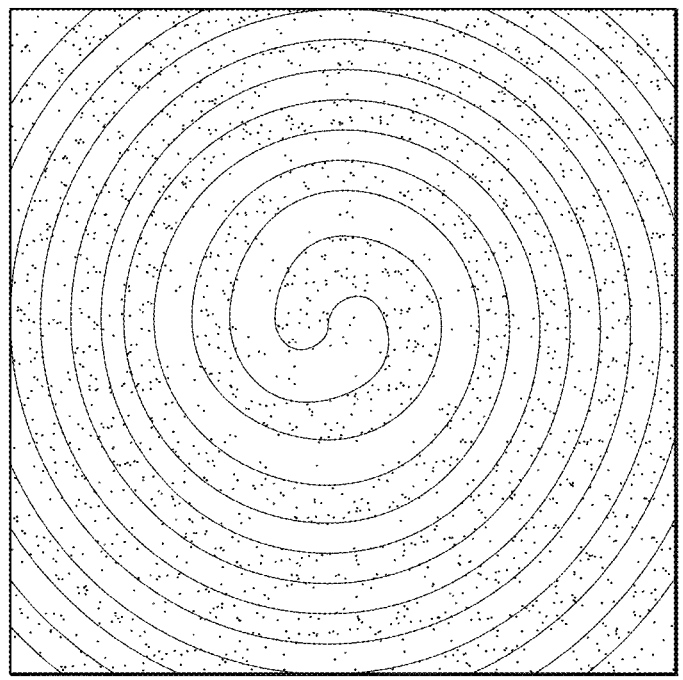
FIG. 23C illustrates an OAM beam generated using the phase plate with l=+1.

Some novel material structures, such as metal-surface, can also be used for OAM generation. A compact metal-surface could be made into a phase plate by manipulation of the structure caused spatial phase response. As shown in FIGS. 23A and 23B, a V-shaped antenna array 2302 is fabricated on the metal surface 2304, each of which is composed of two arms 2306, 2308 connected at one end 2310. A light reflected by this plate would experience a phase change ranging from 0 to 2π, determined by the length of the arms and angle between two arms. To generate an OAM beam, the surface is divided into 8 sectors 2312, each of which introduces a phase shift from 0 to 7π/4 with a step of π/4. The OAM beam with l=+1 is obtained after the reflection, as shown in FIG. 23C.

Figure 24:
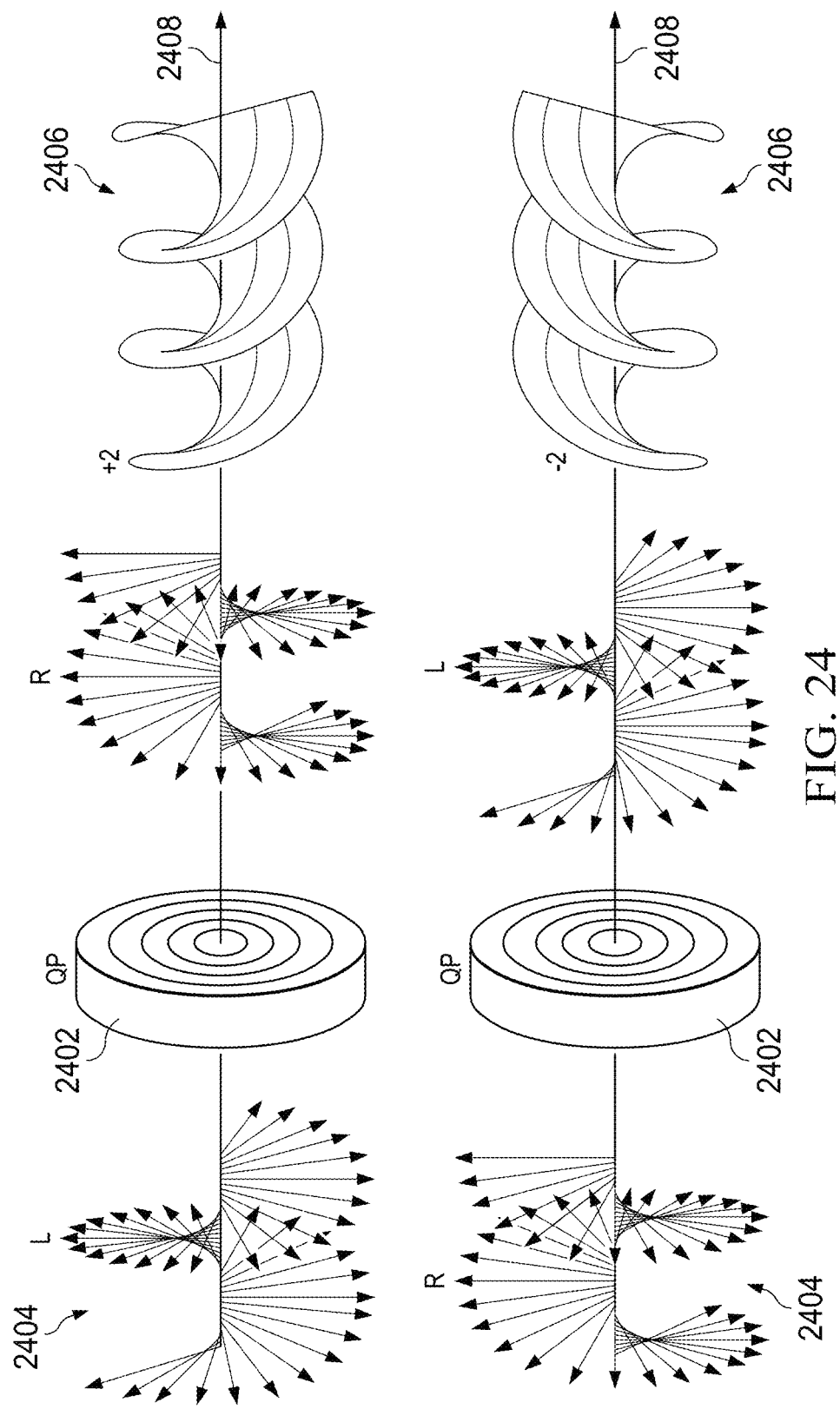
FIG. 24 illustrates the manner in which a q-plate can convert a left circularly polarized beam into a right circular polarization or vice-versa.

Referring now to FIG. 24, another interesting liquid crystal-based device named "q-plate" 2402 is also used as a mode converter which converts a circularly polarized beam 2404 into an OAM beam 2406. A q-plate is essentially a liquid crystal slab with a uniform birefringent phase retardation of it and a spatially varying transverse optical axis 2408 pattern. Along the path circling once around the center of the plate, the optical axis of the distributed crystal elements may have a number of rotations defined by the value of q. A circularly polarized beam 2404 passing through this plate 2402 would experience a helical phase change of exp (ilθ) with l=2 q, as shown in FIG. 24.

Note that almost all the mode conversion approaches can also be used to detect an OAM beam. For example, an OAM beam can be converted back to a Gaussian-like non-OAM beam if the helical phase front is removed, e.g., by passing the OAM beam through a conjugate SPP or phase hologram.

Intra-Cavity Approaches

Figure 25:
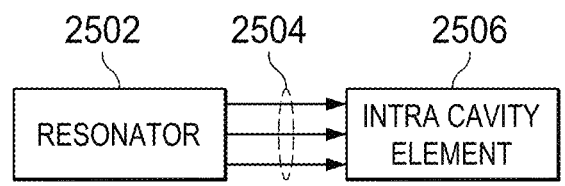
FIG. 25 illustrates the use of a laser resonator cavity for producing an OAM beam.

Referring now to FIG. 25, OAM beams are essentially higher order modes and can be directly generated from a laser resonator cavity. The resonator 2500 supporting higher order modes usually produce the mixture of multiple modes 2504, including the fundamental mode. In order to avoid the resonance of fundamental Gaussian mode, a typical approach is to place an intra-cavity element 2506 (spiral phase plate, tiled mirror) to force the oscillator to resonate on a specific OAM mode. Other reported demonstrations include the use of an annular shaped beam as laser pump, the use of thermal lensing, or by using a defect spot on one of the resonator mirrors.

Figure 26A:
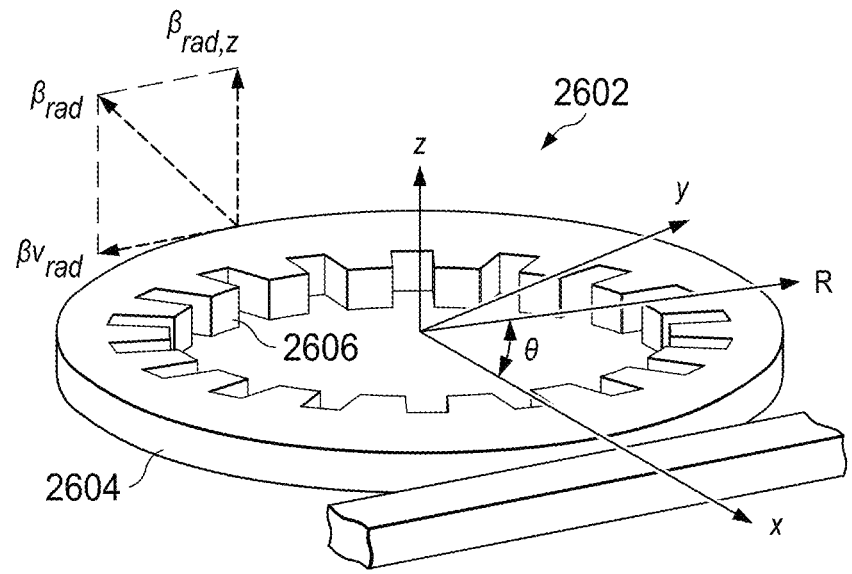
FIG. 26A illustrates a vortex beam generator.
Figure 26B:
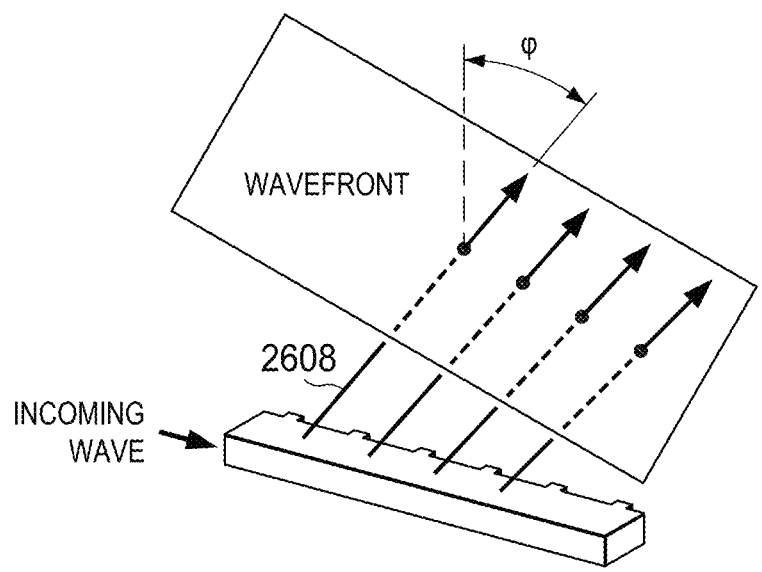
FIG. 26B illustrates the manner in which gratings of a linear waveguide produce a tiltwave by diffraction.
Figure 26C:
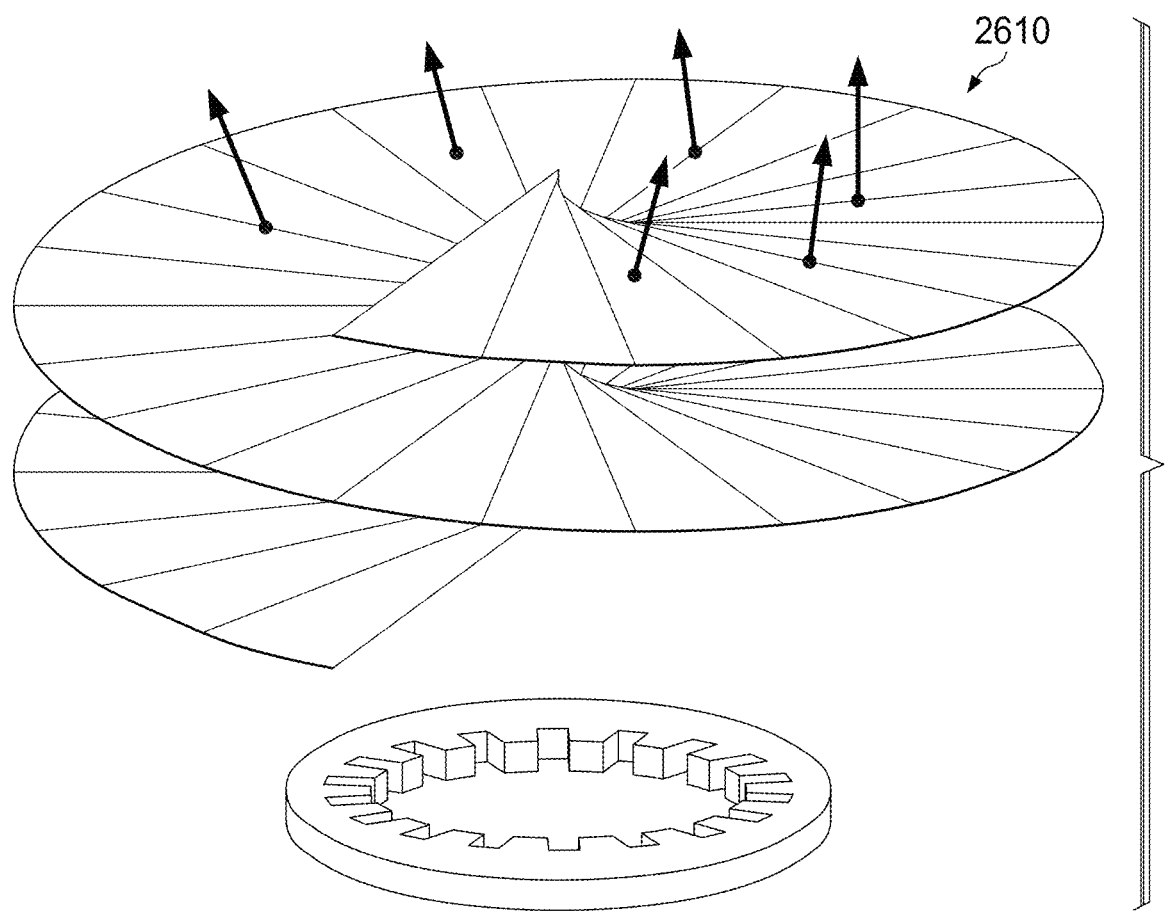
FIG. 26C illustrates an on-chip OAM generator.
Figure 26D:
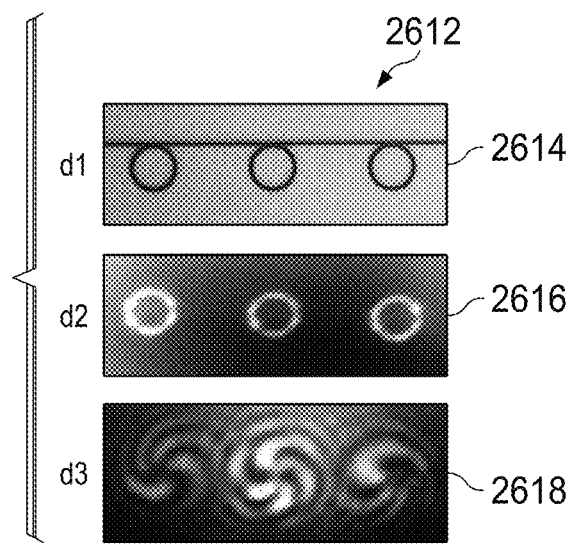
FIG. 26D illustrates three OAM emitters fabricated on a single chip.

Referring now to FIG. 26A-26D, instead of using bulk free space optics, a more compact version of an OAM beam generator in the micrometer scale is reported using a modified microring resonator 2602. The general idea is that whisper gallery mode (WGM) modes can be excited and confined in a ring resonator 2604. To change it into an OAM beam emitter, angular grating structures 2606 are embedded into the regular ring resonator 2604 to periodically vary the refractive index in the azimuthal direction, as shown in FIG. 26A. The grating structure 2606 distributed along the ring cavity is used to create diffractions on the guided mode in the ring resonator 2604. The principle is similar to what a linearly distributed grating does to the incoming light, as shown in FIG. 26B. The diffracted beam 2608 from the side of the ring resonator possesses a helical phase front 2610 (FIG. 26C), the azimuthal state of which is determined by the difference between the azimuthal order of the mode guided in the ring and the period of grating elements in the ring 2604. The tuning of the E state of the generated beam can be achieved by exciting different orders of guided modes in the ring. A fast switching between two different OAM states in the rate of 20 μs is demonstrated through the use of electrically contacted thermo-optical control. Due to the miniaturized dimension, there is potential to produce an array of OAM beam generators on a single photonic chip. A fabricated array including three identical ring resonators 2604 and their generated output beams 2612 is shown in FIG. 26D at 2614, 2616 and 2618, respectively.

OAM Beams Multiplexing and Demultiplexing

One of the benefits of OAM is that multiple coaxially propagating OAM beams with different l states provide additional data carriers as they can be separated based only on the twisting wavefront. Hence, one of the critical techniques is the efficient multiplexing/demultiplexing of OAM beams of different l states, where each carries an independent data channel and all beams can be transmitted and received using a single aperture pair. Several multiplexing and demultiplexing techniques have been demonstrated, including the use of an inverse helical phase hologram to down-convert the OAM into a Gaussian beam, a mode sorter, free-space interferometers, a photonic integrated circuit, and q-plates. Some of these techniques are briefly described below.

Beam Splitter and Inverse Phase Hologram

Figure 27A:
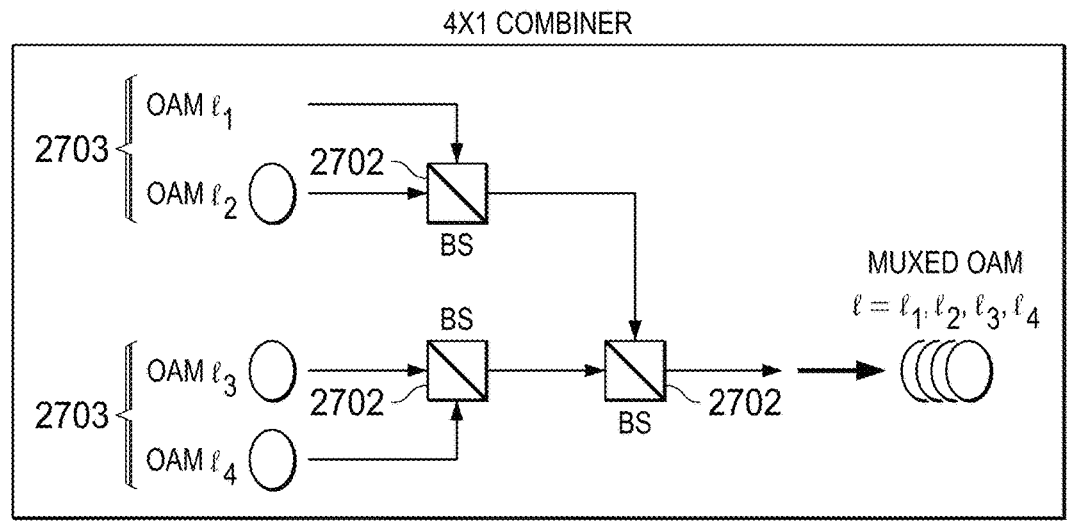
FIG. 27A illustrates spatial multiplexing using cascaded beam splitters.
Figure 27B:
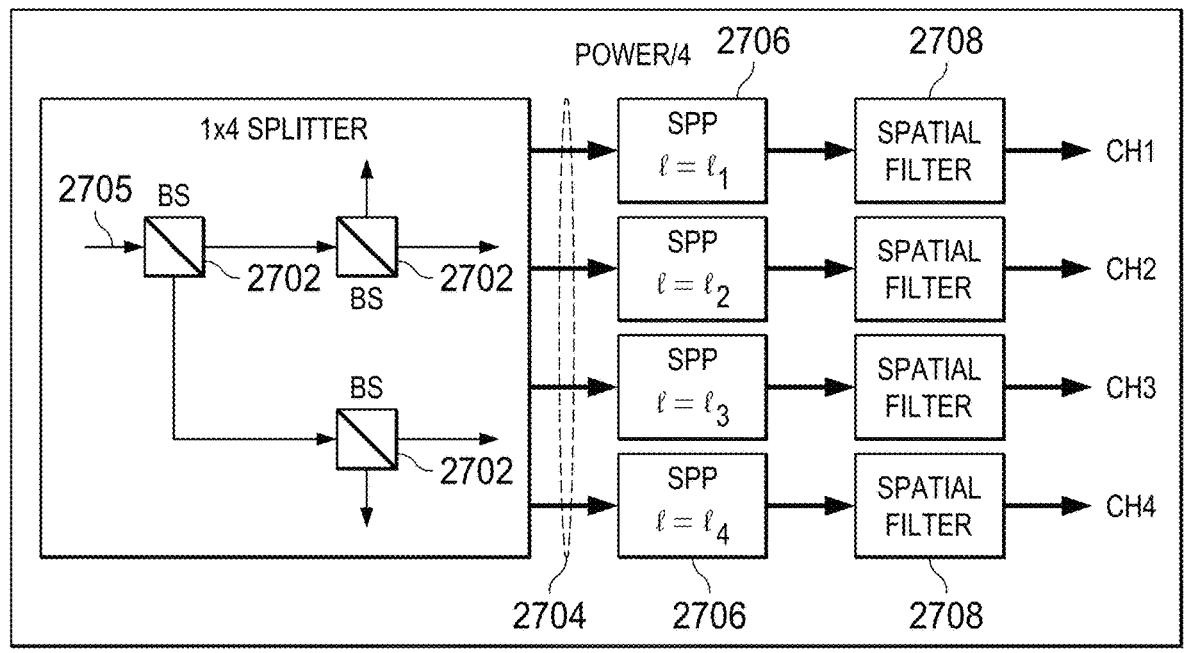
FIG. 27B illustrated demultiplexing using cascaded beam splitters and conjugated spiral phase holograms.

A straightforward way of multiplexing is simply to use cascaded 3-dB beam splitters (BS) 2702. Each BS 2702 can coaxially multiplex two beams 2703 that are properly aligned, and cascaded N BSs can multiplex N+1 independent OAM beams at most, as shown in FIG. 27A. Similarly, at the receiver end, the multiplexed beam 2705 is divided into four copies 2704 by BS 2702. To demultiplex the data channel on one of the beams (e.g., with l=1_i), a phase hologram 2706 with a spiral charge of [ -l]_i is applied to all the multiplexed beams 2704. As a result, the helical phase on the target beam is removed, and this beam evolves into a fundamental Gaussian beam, as shown in FIG. 27B. The down-converted beam can be isolated from the other beams, which still have helical phase fronts by using a spatial mode filter 2708 (e.g., a single mode fiber only couples the power of the fundamental Gaussian mode due to the mode matching theory). Accordingly, each of the multiplexed beams 2704 can be demultiplexed by changing the spiral phase hologram 2706. Although this method is very power-inefficient since the BSs 2702 and the spatial mode filter 2706 cause a lot of power loss, it was used in the initial lab demonstrations of OAM multiplexing/demultiplexing, due to the simplicity of understanding and the reconfigurability provided by programmable SLMs.

Optical Geometrical Transformation-Based Mode Sorter

Figure 28:
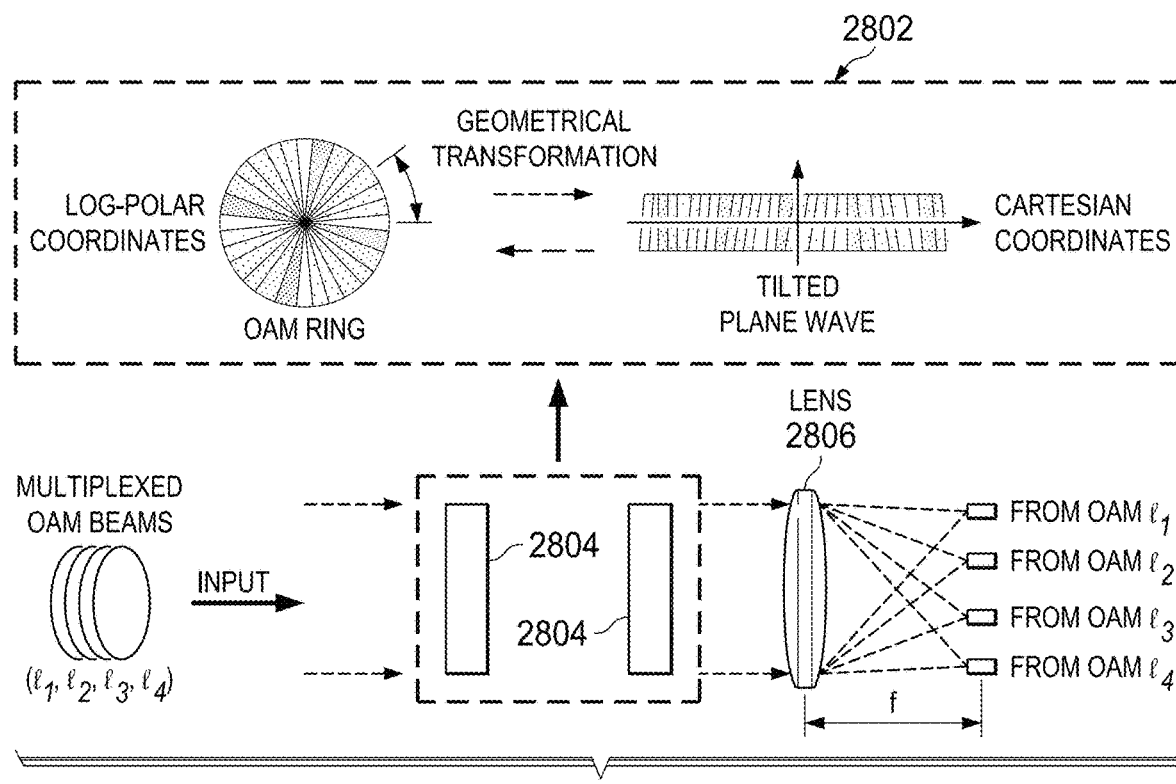
FIG. 28 illustrates a log polar geometrical transformation based on OAM multiplexing and demultiplexing.

Referring now to FIG. 28, another method of multiplexing and demultiplexing, which could be more power-efficient than the previous one (using beam splitters), is the use of an OAM mode sorter. This mode sorter usually comprises three optical elements, including a transformer 2802, a corrector 2804, and a lens 2806, as shown in FIG. 28. The transformer 2802 performs a geometrical transformation of the input beam from log-polar coordinates to Cartesian coordinates, such that the position (x,y) in the input plane is mapped to a new position (u,v) in the output plane, where $$u = -a\ln\left(\frac{\sqrt{x^2+y^2}}{b}\right),$$

and v=a arctan(y/x). Here, a and b are scaling constants. The corrector 2804 compensates for phase errors and ensures that the transformed beam is collimated. Considering an input OAM beam with a ring-shaped beam profile, it can be unfolded and mapped into a rectangular-shaped plane wave with a tilted phase front. Similarly, multiple OAM beams having different l states will be transformed into a series of plane waves each with a different phase tilt. A lens 2806 focuses these tilted plane waves into spatially separated spots in the focal plane such that all the OAM beams are simultaneously demultiplexed. As the transformation is reciprocal, if the mode sorter is used in reverse it can become a multiplexer for OAM. A Gaussian beam array placed in the focal plane of the lens 2806 is converted into superimposed plane waves with different tilts. These beams then pass through the corrector and the transformer sequentially to produce properly multiplexed OAM beams.

OAM Multiplexing/Demultiplexing Using Photonic Integrated Circuits

Figure 29B:
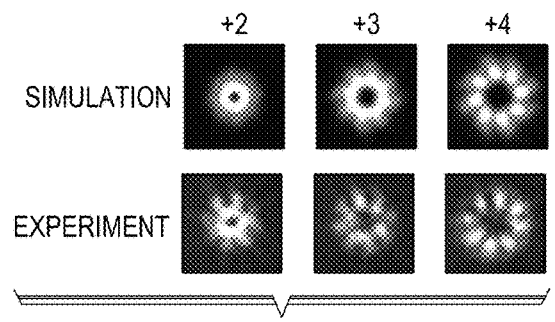
FIG. 29B illustrates simulated and experimentally generated OAM beams using the photonic integrated circuit.
Figure 29A:
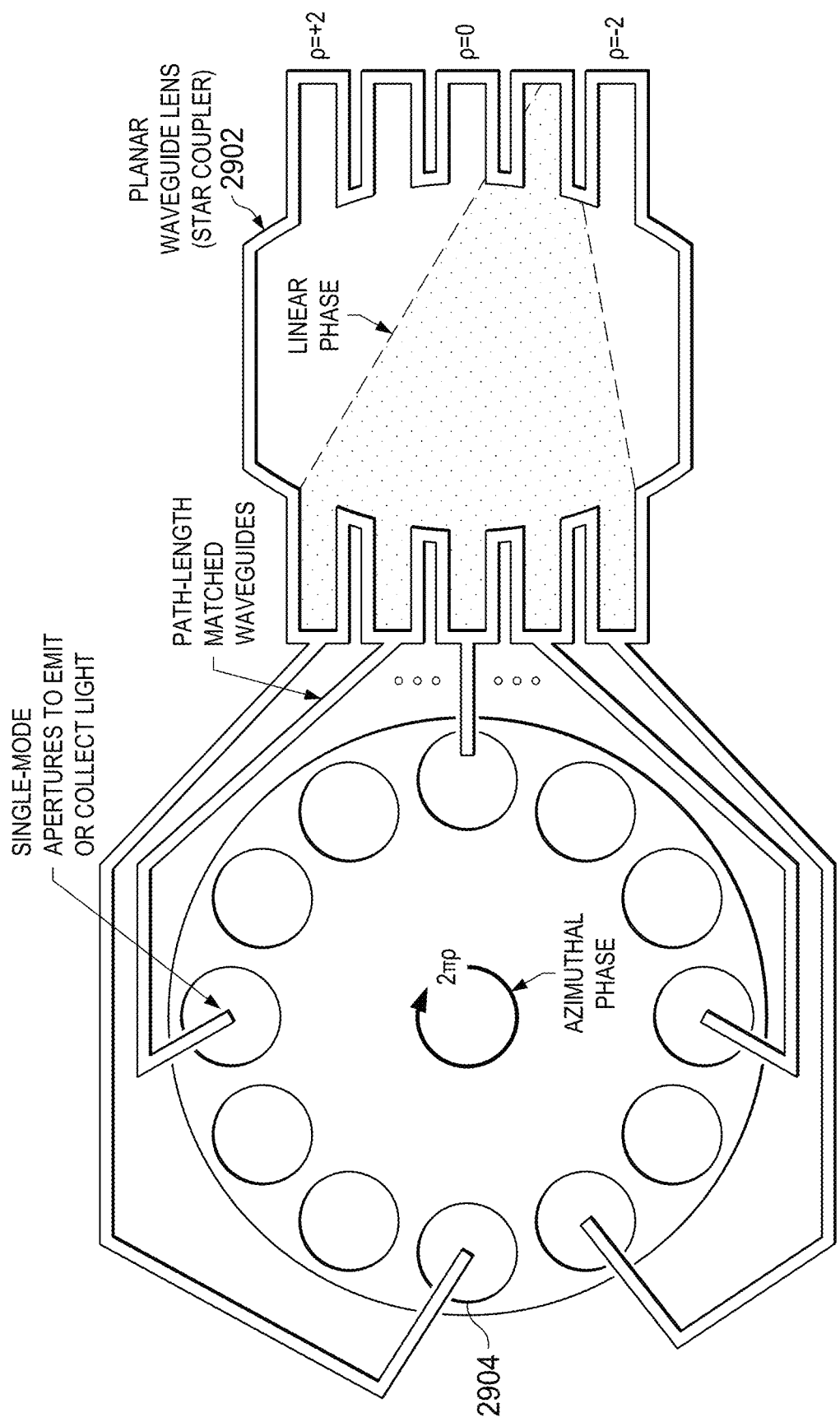
FIG. 29A illustrates an OAM multiplexer/demultiplexer using a photonic integrated circuit.

Integrated versions of an OAM (de)multiplexer can be performed using planar photonic waveguides 2902. The schematic concept of such a device is shown in FIG. 29A. A group of single mode waveguides interfaced with SMFs are placed in parallel as the input ports. The beam from each input port is expanded to a plane wave with a phase tilt, and is then sampled by a number of path-length matched waveguides. The output apertures 2904 of all the waveguides are circularly arranged. The coherent combination of output beams from each aperture 2904 could evolve into an OAM beam, the state of which is determined by the position of the input port. In principle, such a device with M waveguide apertures 2904 can support at most N different OAM states ranging from −N/2 to N/2−1. Practically, much lower orders of OAM beams can be generated with a better quality. The simulated and experimentally observed OAM beams using a circuit with 29 available apertures are shown in FIG. 29B.

Figure 29C:
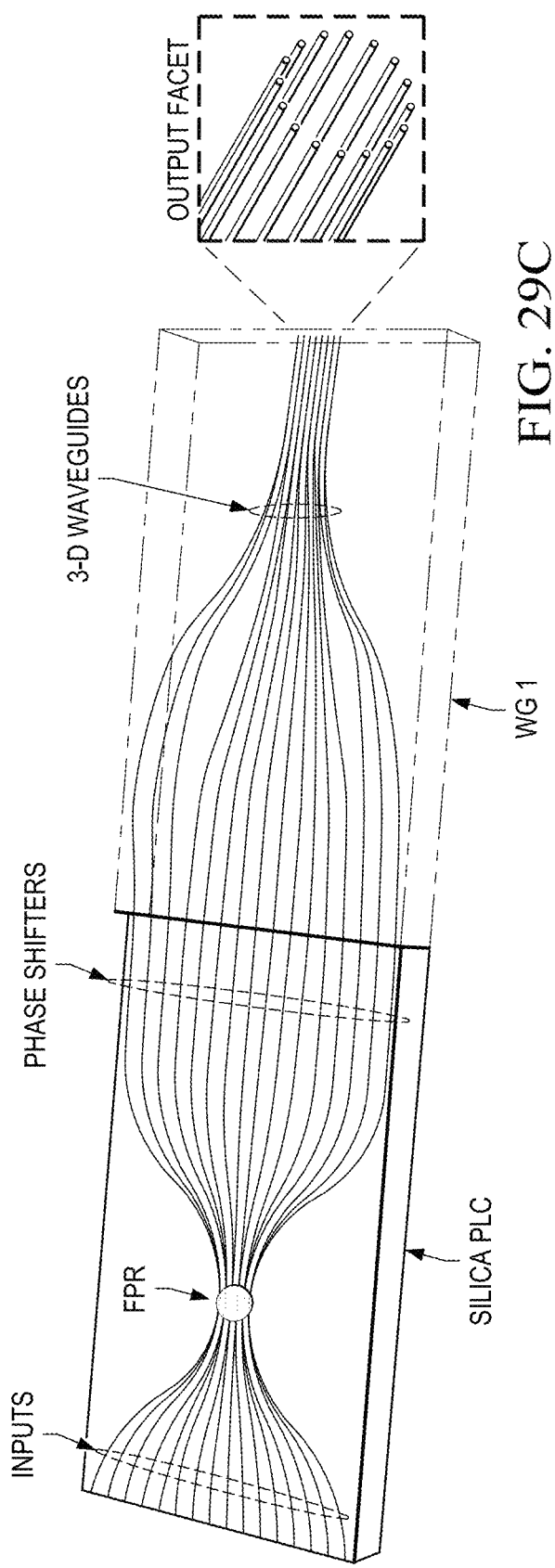
FIG. 29C illustrates a conceptual view of the 3D integrated device for OAM multiplexing and demultiplexing.

Note that instead of being placed perpendicular to the chip surface, the output aperture arrays could also be arranged laterally in a 3-D structure, as shown in FIG. 29C. This device was demonstrated and used in a free space optical communication link multiplexed with two OAM states.

Free Space Communications

The first proof-of-concept experiment using OAM for free space communications transmitted eight different OAM states each representing a data symbol one at a time. The azimuthal index of the transmitted OAM beam is measured at the receiver using a phase hologram modulated with a binary grating. To effectively use this approach, fast switching is required between different OAM states to achieve a high data rate. Alternatively, classic communications using OAM states as data carriers can be multiplexed at the transmitter, co-propagated through a free space link, and demultiplexed at a receiver. The total data rate of a free space communication link has reached 100 Tbit/s or even beyond by using OAM multiplexing. The propagation of OAM beams through a real environment (e.g., across a city) is also under investigation.

Basic Link Demonstrations

Figure 30A:
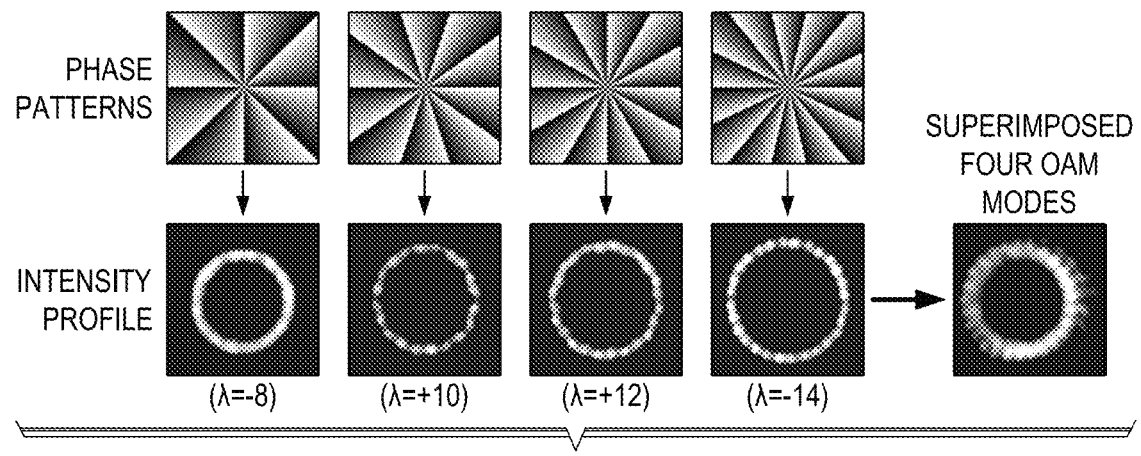
FIG. 30A illustrates an intensity profile of generated OAM beams and their multiplexing.
Figure 30C:
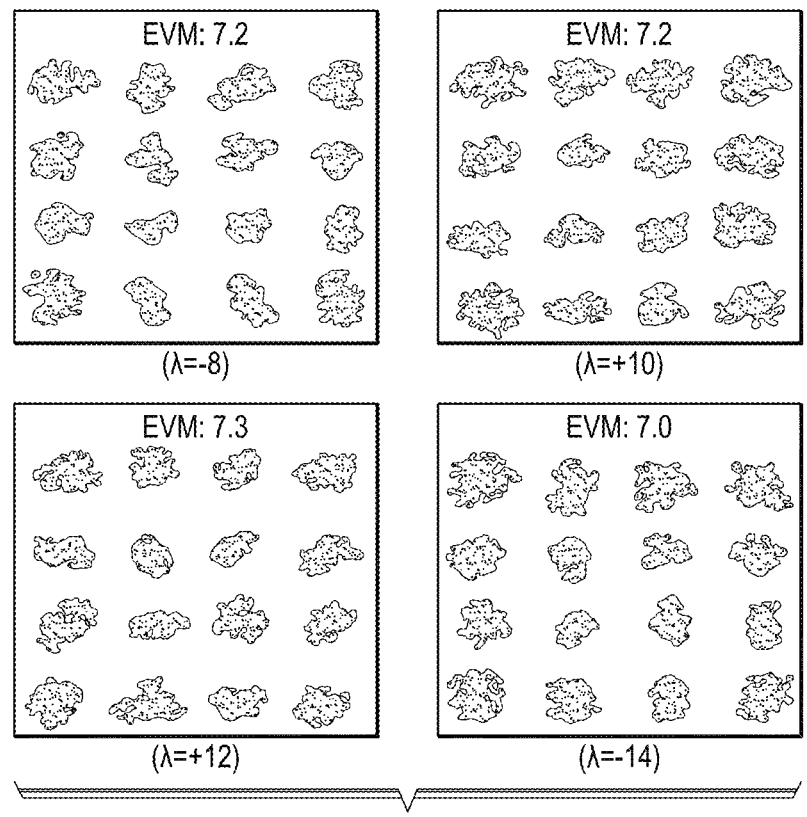
FIG. 30C illustrates the recovered constellations of 16-QAM signals carried on each OAM beam.
Figure 30B:
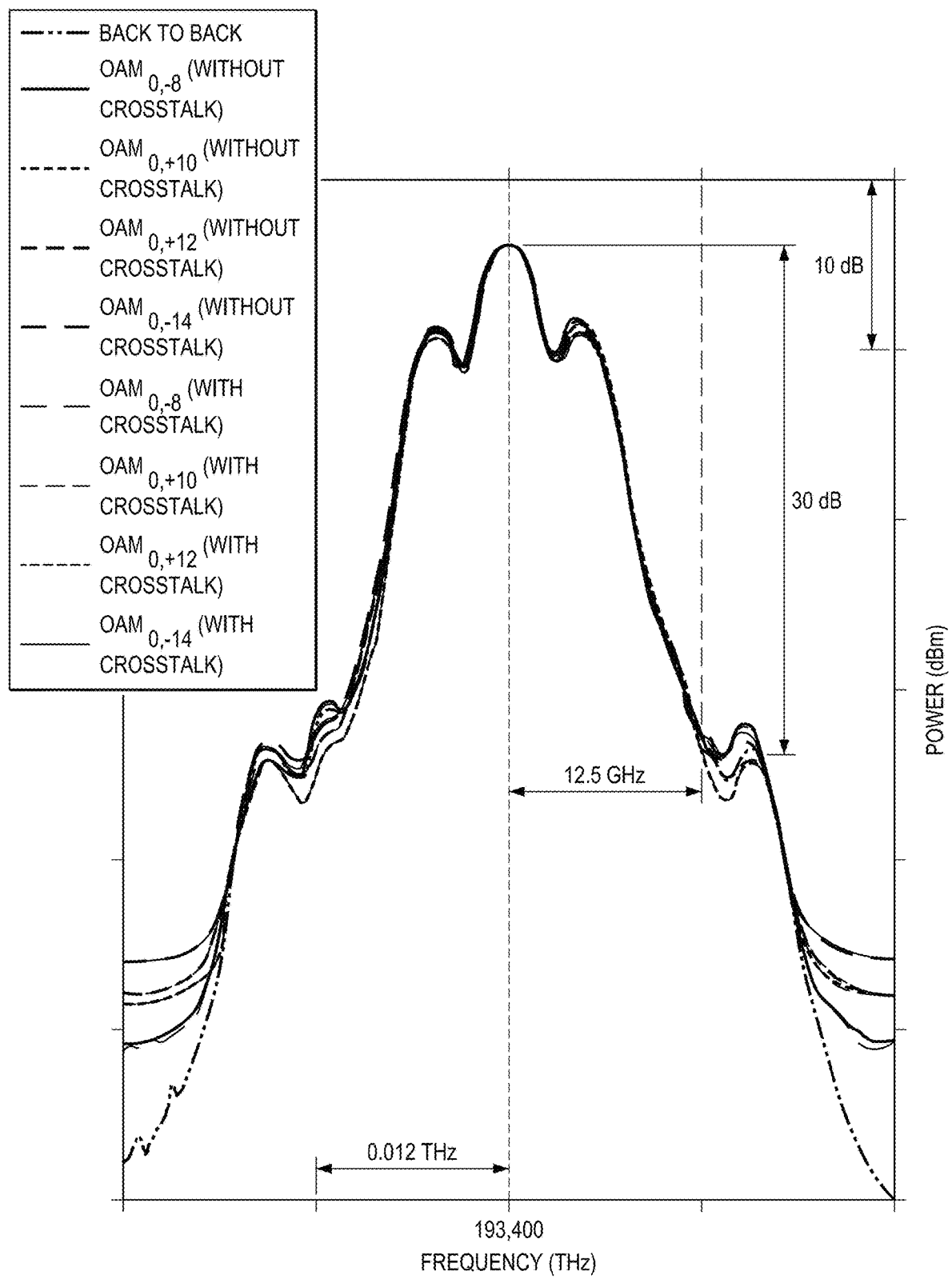
FIG. 30B illustrates the optical spectrum of each channel after each multiplexing for the OAM beams of FIG. 10A.

Referring now to FIGS. 30A-30C, initial demonstrates of using OAM multiplexing for optical communications include free space links using a Gaussian beam and an OAM beam encoded with OOK data. Four monochromatic Gaussian beams each carrying an independent 50.8 Gbit/s (4×12.7 Gbit/s) 16-QAM signal were prepared from an IQ modulator and free-space collimators. The beams were converted to OAM beams with l=−8, +10, +12 and −14, respectively, using 4 SLMs each loaded with a helical phase hologram, as shown in FIG. 30A. After being coaxially multiplexed using cascaded 3 dB-beam splitters, the beams were propagated through ~1 m distance in free-space under lab conditions. The OAM beams were detected one at a time, using an inverse helical phase hologram and a fiber collimator together with a SMF. The 16-QAM data on each channel was successfully recovered, and a spectral efficiency of 12.8 bit/s/Hz in this data link was achieved, as shown in FIGS. 30B and 30C.

A following experiment doubled the spectral efficiency by adding the polarization multiplexing into the OAM-multiplexed free-space data link. Four different OAM beams (l=+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

TABLE 1

| Measured Crosstalk | | OAM + 4 | | OAM + 8 | | OAM − 8 | | OAM + 16 | |
|---|---|---|---|---|---|---|---|---|---|
| | | X-Pol. | Y-Pol. | X-Pol. | Y-Pol. | X-Pol. | Y-Pol. | X-Pol. | Y-Pol. |
| OAM + 4 (dB) | X-Pol. | | −23.2 | −26.7 | −30.8 | −30.5 | −27.7 | −24.6 | −30.1 |
| | Y-Pol. | −25.7 | | | | | | | |
| OAM + 8 (dB) | X-Pol. | −26.6 | −23.5 | | | −21.6 | −18.9 | −25.4 | −23.9 | −28.8 |
| | Y-Pol. | | | | −25.0 | | | | |
| OAM − 8 (dB) | X-Pol. | −27.5 | −33.9 | −27.6 | −30.8 | | | −20.5 | −26.5 | −21.6 |
| | Y-Pol. | | | | | | −26.8 | | |
| OAM + 16 (dB) | X-Pol. | −24.5 | −31.2 | −23.7 | −23.3 | −25.8 | −26.1 | | −30.2 |
| | Y-Pol. | | | | | | | −24.0 | |
| Total from other OAMs * (dB) | | −21.8 | −21.0 | −21.2 | −21.4 | −18.5 | −21.2 | −22.2 | −20.7 |

Figure 31A:
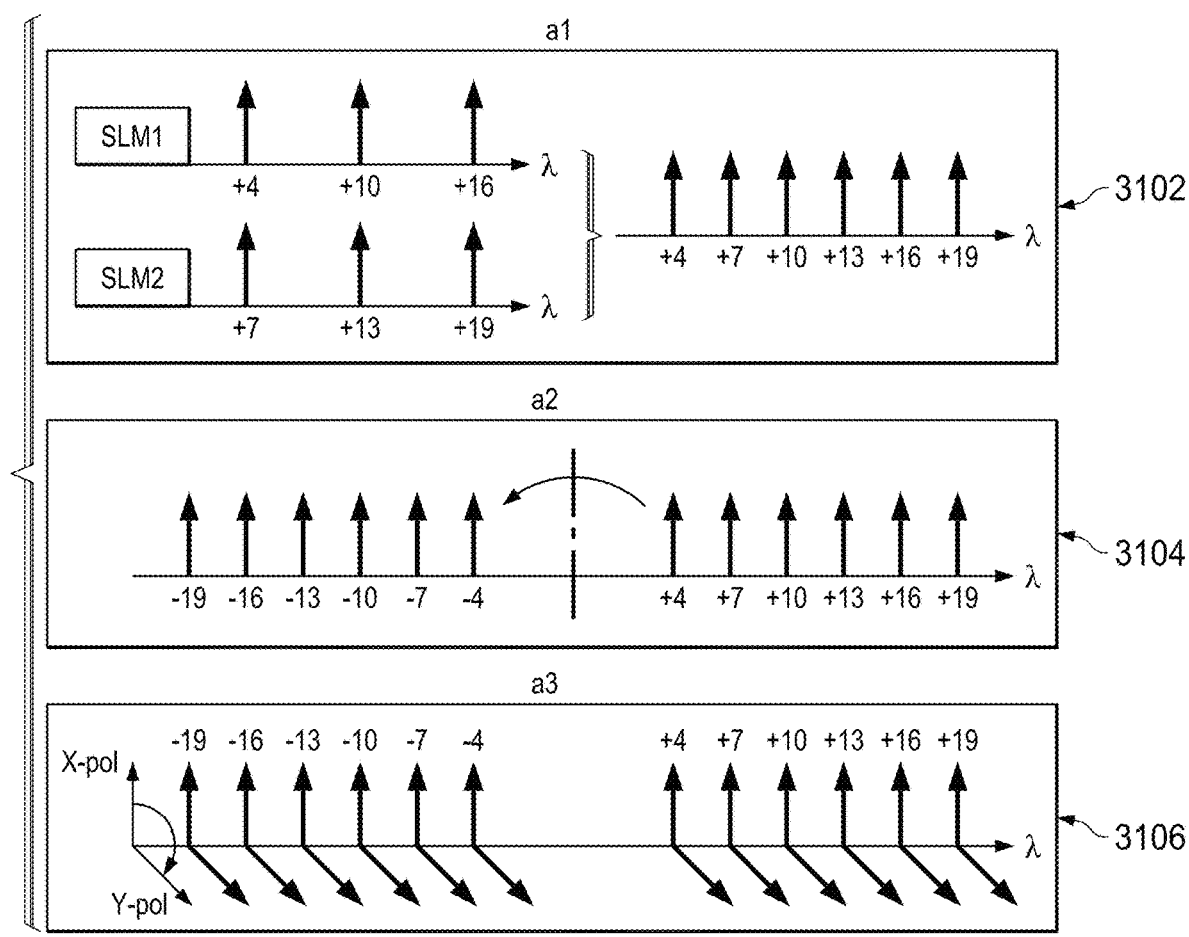
FIG. 31A illustrates the steps to produce 24 multiplex OAM beams.
Figure 31B:
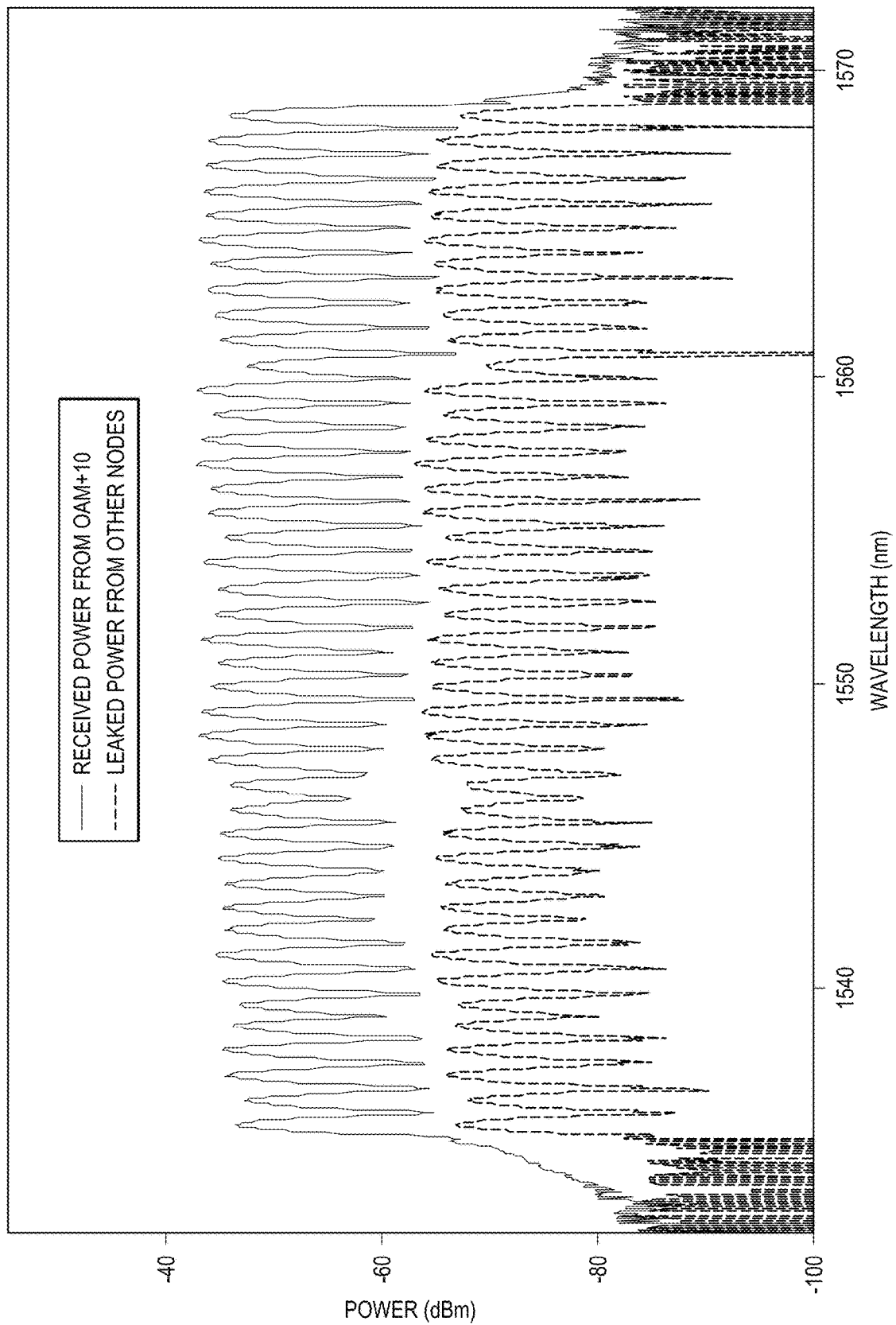
FIG. 31B illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (l=±4, ±7, ±10, ±13, ±16, and ±19, each with two polarizations) were prepared using 2 SLMs, the procedures for which are shown in FIG. 31 at 3102-3106. Specifically, one SLM generated a superposition of OAM beams with l=+4, +10, and +16, while the other SLM generated another set of three OAM beams with l=+7, +13, and +19 (FIG. 31A). These two outputs were multiplexed together using a beam splitter, thereby multiplexing six OAM beams: l=+4, +7, +10, +13, +16, and +19 (FIG. 31A). Secondly, the six multiplexed OAM beams were split into two copies. One copy was reflected five times by three mirrors and two beam splitters, to create another six OAM beams with inverse charges (FIG. 31B). There was a differential delay between the two light paths to de-correlate the data. These two copies were then combined again to achieve 12 multiplexed OAM beams with l=±4, ±7, ±10, ±13, ±16, and ±19 (FIG. 31B). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with l=±4, ±7, ±10, ±13, ±16, and ±19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (l=+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path, and can easily distort the phase front of a light beam. This could be particularly important for OAM communications, since the separation of multiplexed OAM beams relies on the helical phase-front. As predicted by simulations in the literature, these refractive index inhomogeneities may cause inter-modal crosstalk among data channels with different OAM states.

Figure 32A:
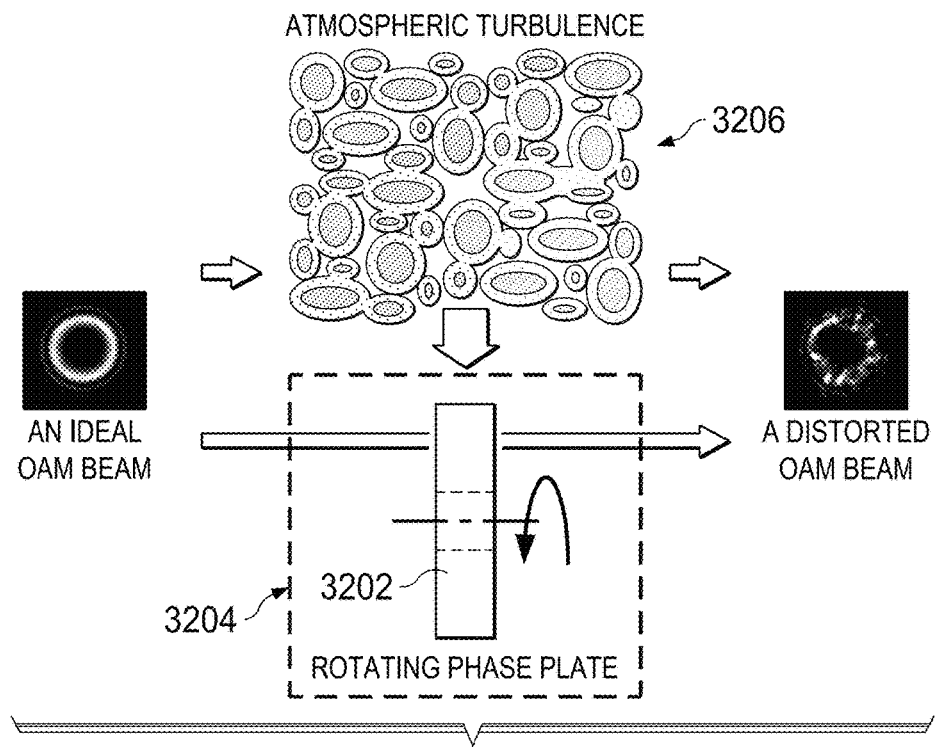
FIG. 32A illustrates a turbulence emulator.
Figure 32B:
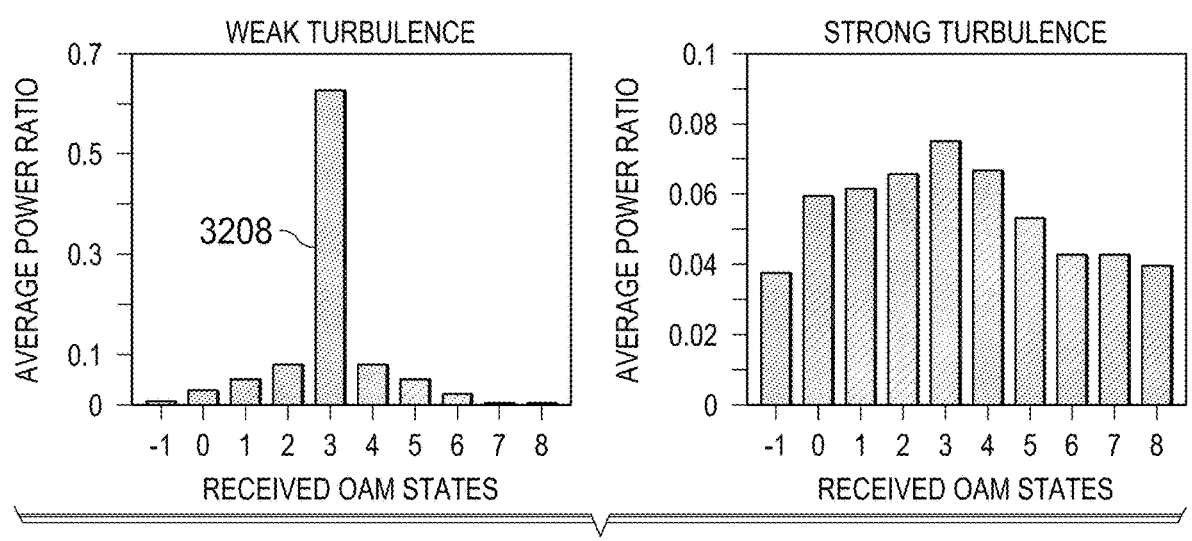
FIG. 32B illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 32A illustrates an emulator built using a thin phase screen plate 3202 that is mounted on a rotation stage 3204 and placed in the middle of the optical path. The pseudo-random phase distribution machined on the plate 3202 obeys Kolmogorov spectrum statistics, which are usually characterized by a specific effective Fried coherence length r0. The strength of the simulated turbulence 3206 can be varied either by changing to a plate 3202 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 32B shows the measured average power (normalized) l=3 beam under different emulated turbulence conditions. It can be seen that the majority of the power is still in the transmitted OAM mode 3208 under weak turbulence, but it spreads to neighboring modes as the turbulence strength increases.

Turbulence Effects Mitigation Techniques

Figure 33A:
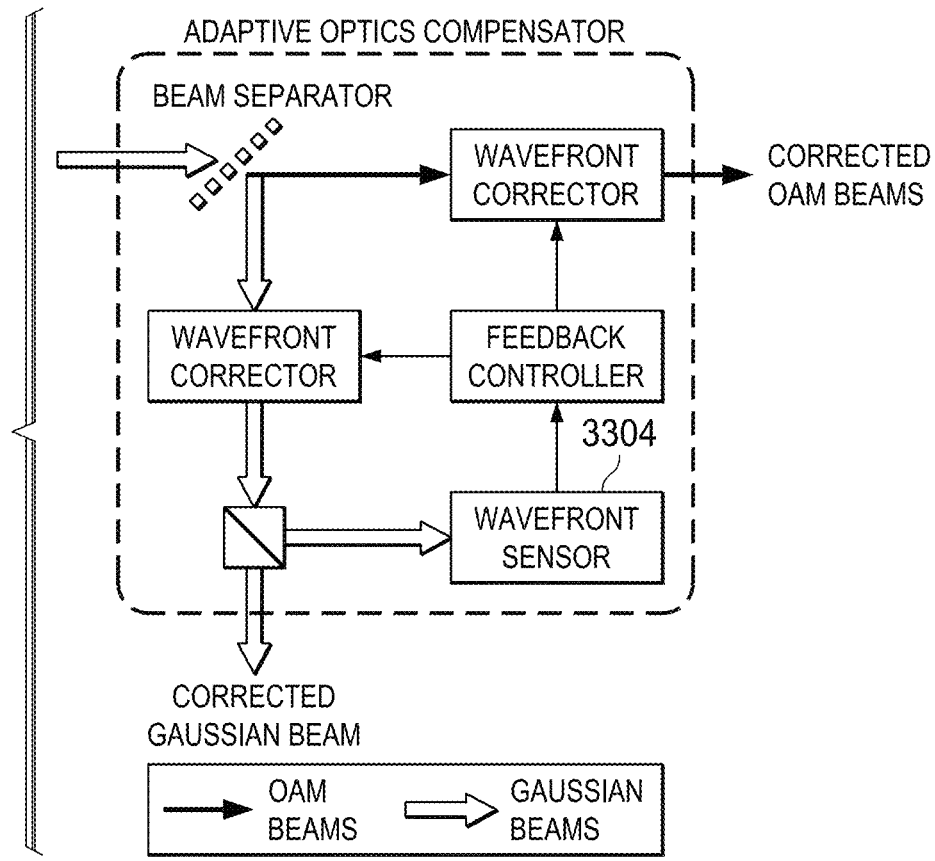
FIG. 33A illustrates how turbulence effects mitigation using adaptive optics.
Figure 33B:
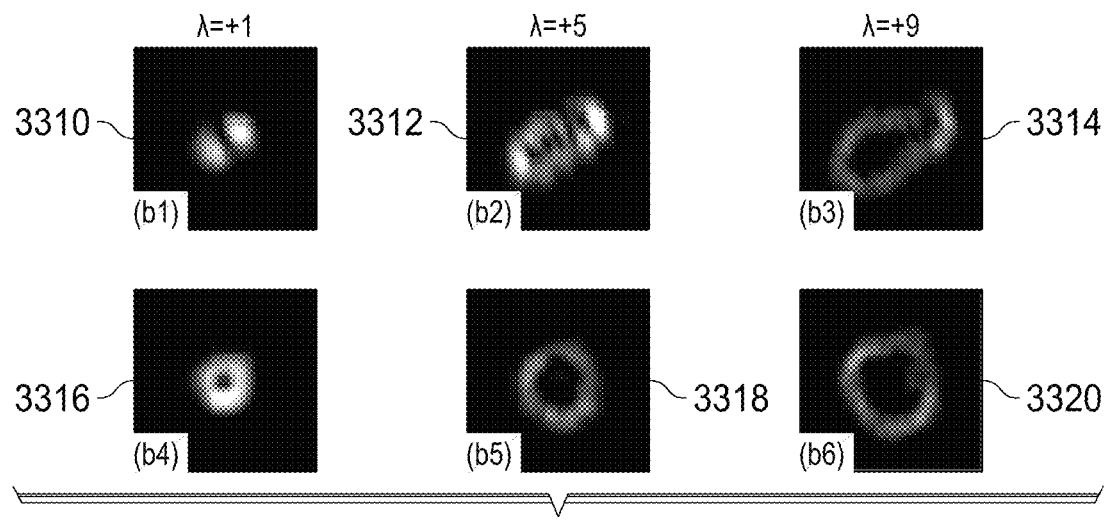
FIG. 33B illustrates experimental results of distortion mitigation using adaptive optics.

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion. As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 33A. Due to the fact that turbulence is almost independent of the light polarization, the probe beam is orthogonally polarized as compared to all other beams for the sake of convenient separation at beam separator 3302. The correction phase pattern can be derived based on the probe beam distortion that is directly measured by a wavefront sensor 3204. It is noted that this phase correction pattern can be used to simultaneously compensate multiple coaxially propagating OAM beams. FIG. 33 at 3310-3320 illustrate the intensity profiles of OAM beams with l=1, 5 and 9, respectively, for a random turbulence realization with and without mitigation. From the far-field images, one can see that the distorted OAM beams (upper), up to l=9, were partially corrected, and the measured power distribution also indicates that the channel crosstalk can be reduced.

Another approach for combating turbulence effects is to partially move the complexity of optical setup into the electrical domain, and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

OAM Free Space Link Design Considerations

Figure 34:
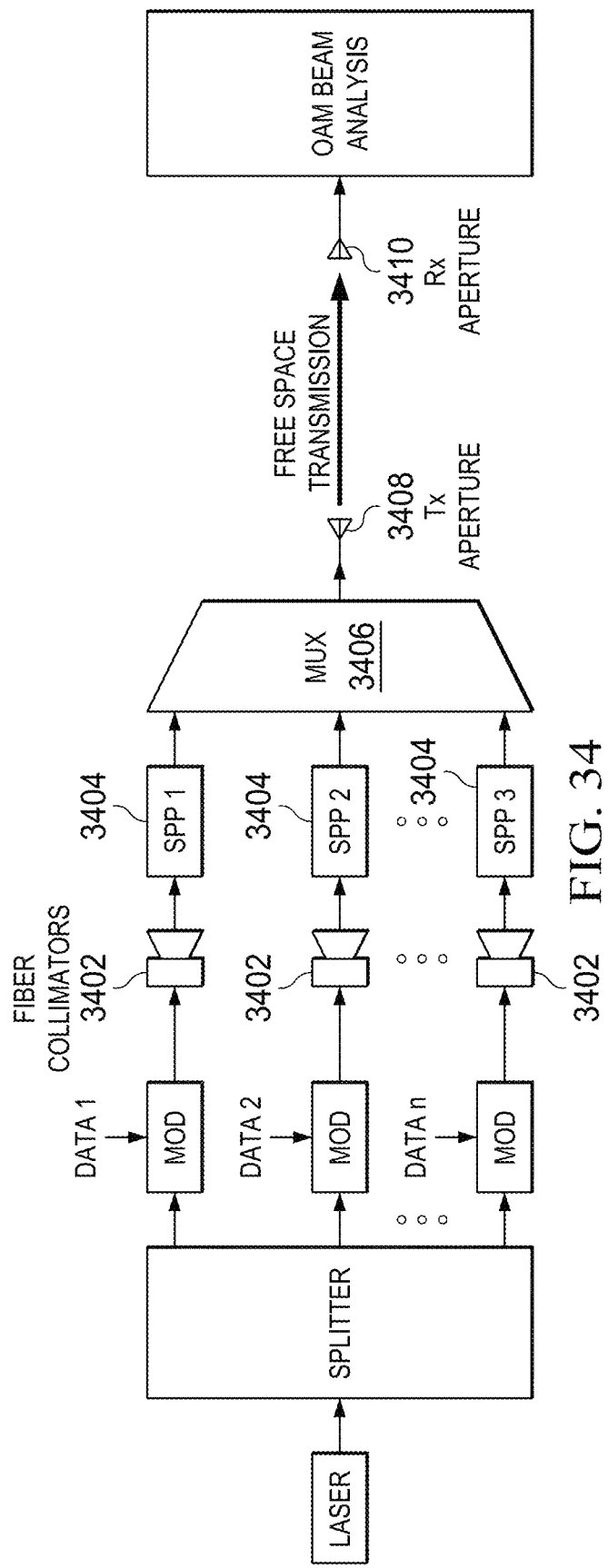
FIG. 34 illustrates a free-space optical data link using OAM.

To date, most of the experimental demonstrations of optical communication links using OAM beams took place in the lab conditions. There is a possibility that OAM beams may also be used in a free space optical communication link with longer distances. To design such a data link using OAM multiplexing, several important issues such as beam divergence, aperture size and misalignment of two transmitter and receiver, need to be resolved. To study how those parameters affect the performance of an OAM multiplexed system, a simulation model was described by Xie et al, the schematic setup of which is shown in FIG. 34. Each of the different collimated Gaussian beams 3402 at the same wavelength is followed by a spiral phase plate 3404 with a unique order to convert the Gaussian beam into a data-carrying OAM beam. Different orders of OAM beams are then multiplexed at multiplexor 3406 to form a concentric-ring-shape and coaxially propagate from transmitter 3408 through free space to the receiver aperture located at a certain propagation distance. Propagation of multiplexed OAM beams is numerically propagated using the Kirchhoff-Fresnel diffraction integral. To investigate the signal power and crosstalk effect on neighboring OAM channels, power distribution among different OAM modes is analyzed through a modal decomposition approach, which corresponds to the case where the received OAM beams are demultiplexed without power loss and the power of a desired OAM channel is completely collected by its receiver 3410.

Beam Divergence

Figure 35A:
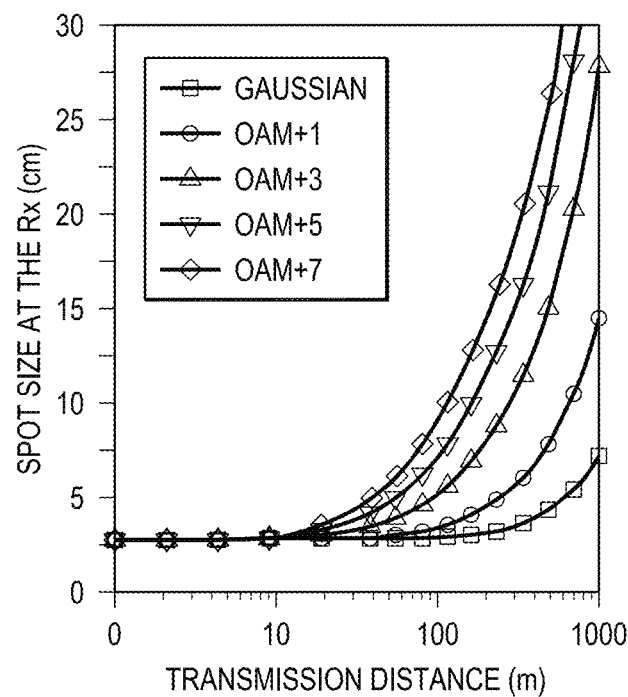
FIG. 35A illustrates simulated spot sized of different orders of OAM beams as a function of transmission distance for a 3 cm transmitted beam.
Figure 35B:
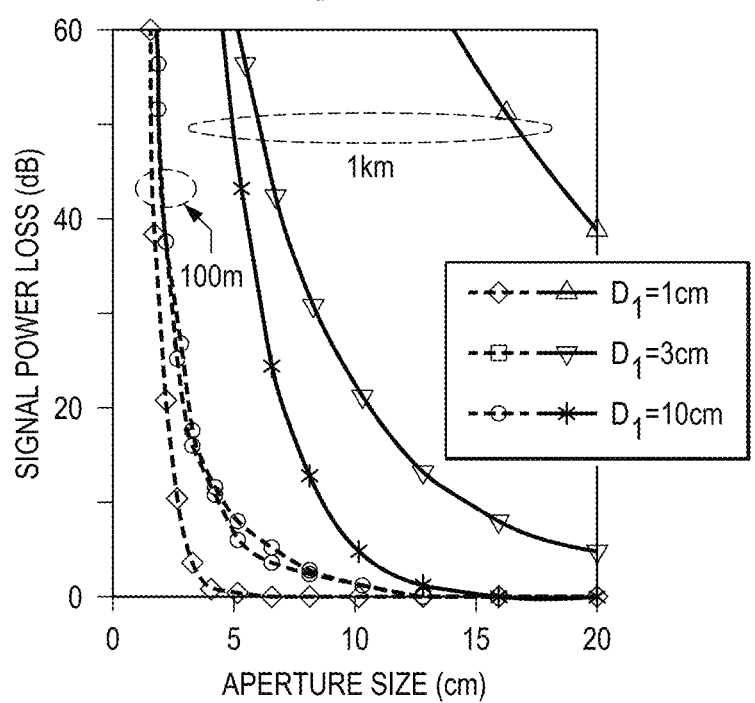
FIG. 35B illustrates simulated power loss as a function of aperture size.

For a communication link, it is generally preferable to collect as much signal power as possible at the receiver to ensure a reasonable signal-to-noise ratio (SNR). Based on the diffraction theory, it is known that a collimated OAM beam diverges while propagating in free space. Given the same spot size of three cm at the transmitter, an OAM beam with a higher azimuthal index diverges even faster, as shown in FIG. 35A. On the other hand, the receiving optical element usually has a limited aperture size and may not be able to collect all of the beam power. The calculated link power loss as a function of receiver aperture size is shown in FIG. 35B, with different transmission distances and various transmitted beam sizes. Unsurprisingly, the power loss of a 1-km link is higher than that of a 100-m link under the same transmitted beam size due to larger beam divergence. It is interesting to note that a system with a transmitted beam size of 3 cm suffers less power loss than that of 1 cm and 10 cm over a 100-m link. The 1-cm transmitted beam diverges faster than the 3 cm beam due to its larger diffraction. However, when the transmitted beam size is 10 cm, the geometrical characteristics of the beam dominate over the diffraction, thus leading larger spot size at the receiver than the 3 cm transmitted beam. A trade-off between the diffraction, geometrical characteristics and the number of OAMs of the beam therefore needs to be carefully considered in order to achieve a proper-size received beam when designing a link.

Misalignment Tolerance

Figure 36A:
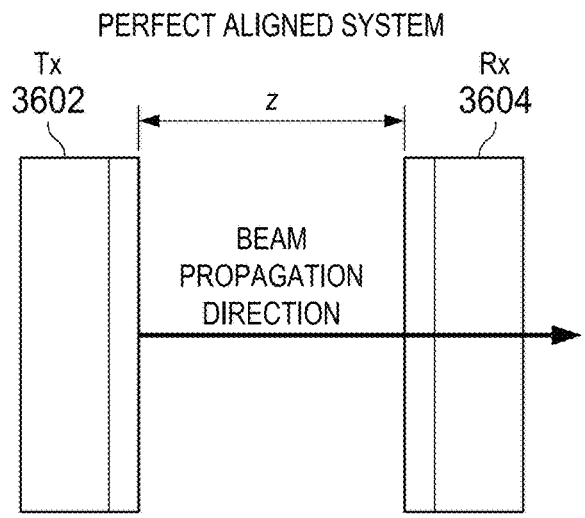
FIG. 36A illustrates a perfectly aligned system between a transmitter and receiver.
Figure 36B:
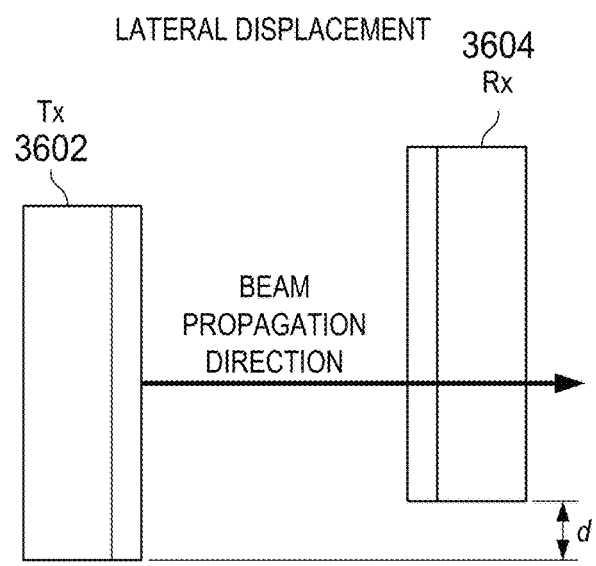
FIG. 36B illustrates a system with lateral displacement of alignment between a transmitter and receiver.
Figure 36C:
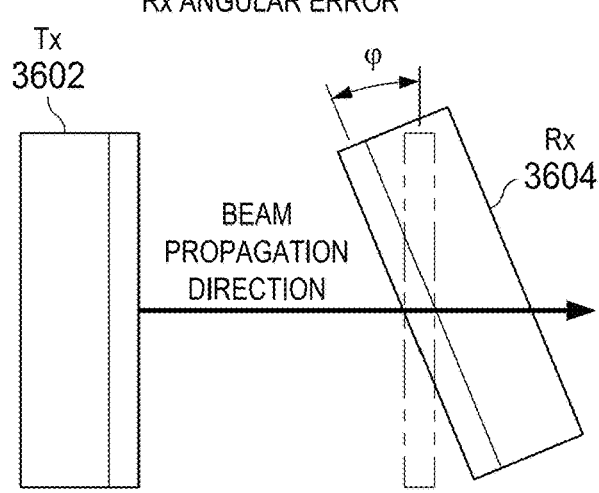
FIG. 36C illustrates a system with receiver angular error for alignment between a transmitter and receiver.

Referring now to FIGS. 36A-36C, besides the power loss due to limited-size aperture and beam divergence, another issue that needs further discussion is the potential misalignment between the transmitter and the receiver. In an ideal OAM multiplexed communication link, transmitter and receiver would be perfectly aligned, (i.e., the center of the receiver would overlap with the center of the transmitted beam 3602, and the receiver plane 3604 would be perpendicular to the line connecting their centers, as shown in FIG. 36A). However, due to difficulties in aligning because of substrate distances, and jitter and vibration of the transmitter/receiver platform, the transmitter and receiver may have relative lateral shift (i.e., lateral displacement) (FIG. 36B) or angular shift (i.e., receiver angular error) (FIG. 36C). Both types of misalignment may lead to degradation of system performance.

Figure 37A:
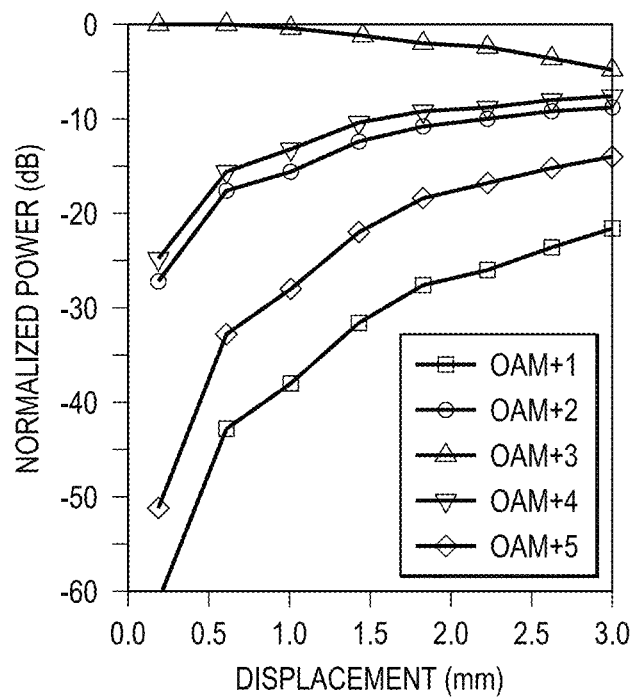
FIG. 37A illustrates simulated power distribution among different OAM modes with a function of lateral displacement.
Figure 37B:
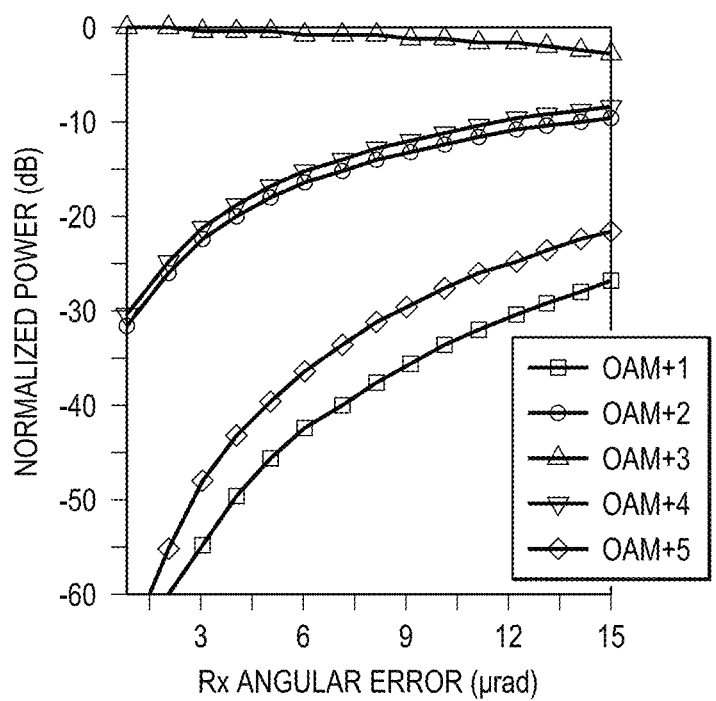
FIG. 37B illustrates simulated power distribution among different OAM modes as a function of receiver angular error.

Focusing on a link distance of 100 m, FIGS. 37A and 37B show the power distribution among different OAM modes due to lateral displacement and receiver angular error when only l=+3 is transmitted with a transmitted beam size of 3 cm. In order to investigate the effect of misalignment, the receiver aperture size is chosen to be 10 cm, which could cover the whole OAM beam at the receiver. As the lateral displacement or receiver angular error increases, power leakage to other modes (i.e., channel crosstalk) increases while the power on l=+3 state decreases. This is because larger lateral displacement or receiver angular causes larger phase profile mismatch between the received OAM beams and receiver. The power leakage to l=+1 and l=+5 is greater than that of l=+2 and l=+3 due to their larger mode spacing with respect to l=+3. Therefore, a system with larger mode spacing (which also uses higher order OAM states) suffers less crosstalk. However, such a system may also have a larger power loss due to the fast divergence of higher order OAM beams, as discussed above. Clearly, this trade-off between channel crosstalk and power loss shall be considered when choosing the mode spacing in a specific OAM multiplexed link.

Figure 38:
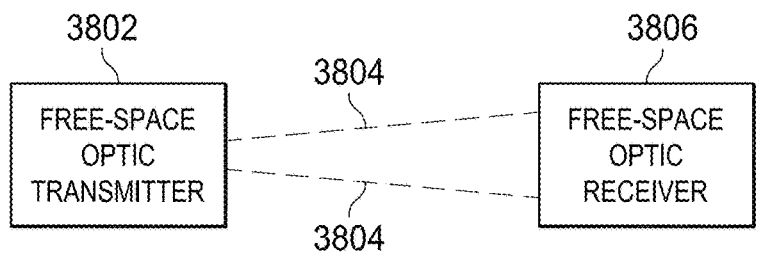
FIG. 38 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional RF based systems from improved isolation between the systems, the size and the cost of the receivers/transmitters, need for an FCC license, and by combining space, lighting, and communication into the same system. Referring now to FIG. 38, there is illustrated an example of the operation of a free-space communication system. The free-space communication system utilizes a free-space optics transmitter 3802 that transmits a light beam 3804 to a free-space optics receiver 3806. The major difference between a fiber-optic network and a free-space optic network is that the information beam is transmitted through free space rather than over a fiber-optic cable. This causes a number of link difficulties, which will be more fully discussed herein below. However, because the free space system does not have the optic fiber to act as a waveguide, it is more susceptible to the problems outlined above. Free-space optics is a line of sight technology that uses the invisible beams of light to provide optical bandwidth connections that can send and receive up to 2.5 Gbps of data, voice, and video communications between a transmitter 3802 and a receiver 3806. Free-space optics uses the same concepts as fiber-optics, except without the use of a fiber-optic cable. Free-space optics systems provide the light beam 3804 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

Figure 39:
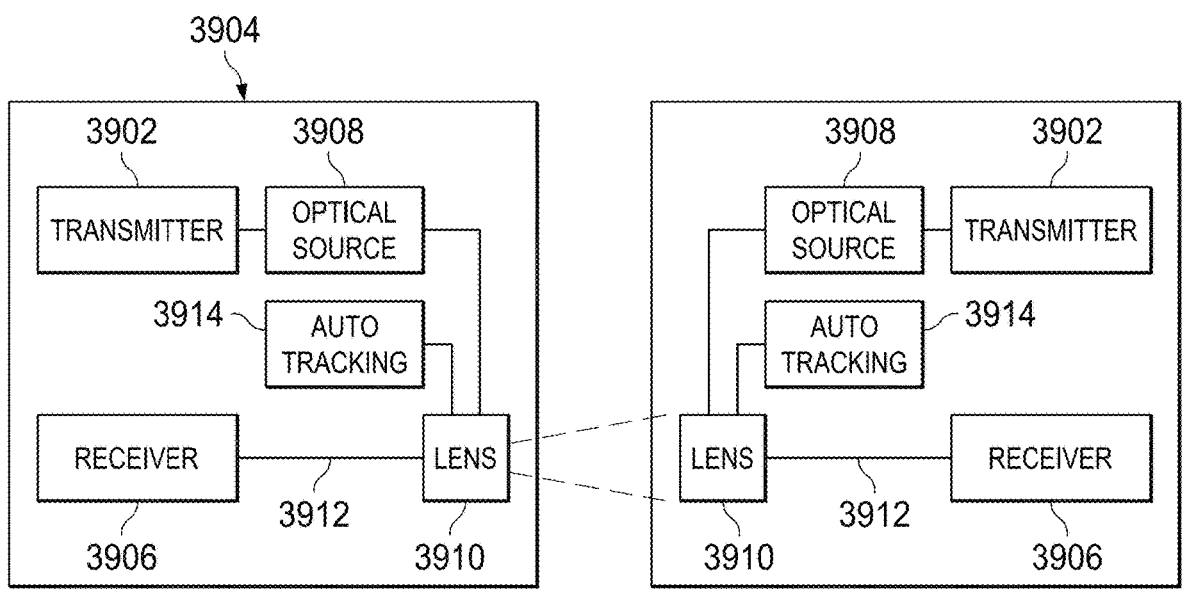
FIG. 39 illustrates a block diagram of a free-space optics system using orbital angular momentum and multi-level overlay modulation.

Referring now to FIG. 39, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 3902 at each of the FSO transceivers 3904. Free-space optics technology is based on the connectivity between the FSO based optical wireless units, each consisting of an optical transceiver 3904 with a transmitter 3902 and a receiver 3906 to provide full duplex open pair and bidirectional closed pairing capability. Each optical wireless transceiver unit 3904 additionally includes an optical source 3908 plus a lens or telescope 3910 for transmitting light through the atmosphere to another lens 3910 receiving the information. At this point, the receiving lens or telescope 3910 connects to a high sensitivity receiver 3906 via optical fiber 3912. The transmitting transceiver 3904a and the receiving transceiver 3904b have to have line of sight to each other and be aligned both laterally and angularly. Obstacles, such as, trees, buildings, animals, and atmospheric conditions, all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 3914 that maintains a tightly focused beam on the receiving transceiver 3404b, even when the transceivers are mounted on tall buildings or other structures that sway.

The modulated light source used with optical source 3908 is typically a laser or light emitting diode (LED) providing the transmitted optical signal that determines all the transmitter capabilities of the system. Only the detector sensitivity within the receiver 3906 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 3908 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 3908.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 3908. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 3914. Class 1 lasers are safe under reasonably foreseeable operating conditions including the use of optical instruments for intrabeam viewing. Class 1 systems can be installed at any location without restriction.

Another potential optical source 3908 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 3908 are illustrated in Table 2 below.

TABLE 2

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Perot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop sites. Further, it is easier to deploy in buildings as the system can be located as the area requires, saving significant costs of running cables to rooftops. It is also immune to radiofrequency interference or saturation. The system is also fairly speedy. The system provides 10 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost or the amount of signal received severely diminished. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Further, the more OAMs applied, the greater divergence over distance. Additionally, all systems require line of sight be maintained at all times during transmission. Any obstacle, be it environmental or animals can hinder the transmission. Free-space optic technology must be designed to combat changes in the atmosphere which can affect free-space optic system performance capacity. Finally, any shift in the mounting apparatus can cause the beam to be misaligned. Shifts can be caused by wind, earthquakes, ground shifting and even traffic.

Referring now to FIGS. 40A through 40D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

Figure 40A:
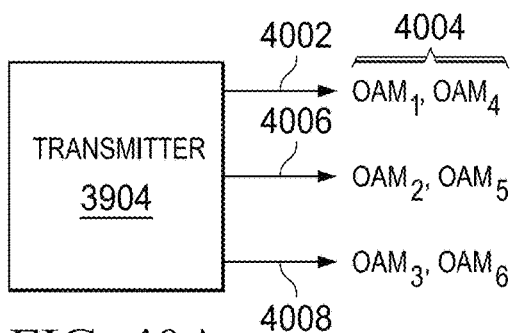
FIGS. 40A-40C illustrate the manner for multiplexing multiple data channels into optical links to achieve higher data capacity.
Figure 40B:
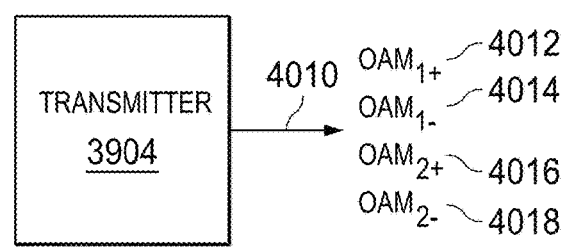

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100. Tbits/capacity. Various techniques for implementing this as illustrated in FIGS. 40A through 40D include a combination of multiple beams 4002 having multiple different OAM values 4004 on each wavelength. Thus, beam 4002 includes OAM values, OAM1 and OAM4. Beam 4006 includes OAM value 2 and OAM value 5. Finally, beam 4008 includes OAM3 value and OAM6 value. Referring now to FIG. 40B, there is illustrated a single beam wavelength 4010 using a first group of OAM values 4012 having both a positive OAM value 4012 and a negative OAM value 4014. Similarly, OAM2 value may have a positive value 4016 and a negative value 4018 on the same wavelength 4010. While mode division multiplexing of OAM modes is described above, other orthogonal functions may be used with mode division multiplexing such as Laguerre Gaussian functions, Hermite Gaussian functions, Jacobi functions, Gegenbauer functions, Legendre functions and Chebyshev functions.

Figure 40C:
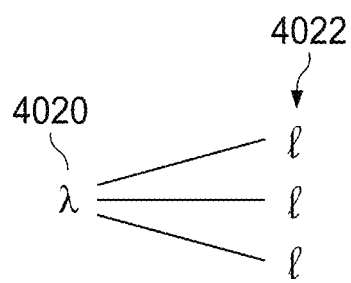
Figure 40D:
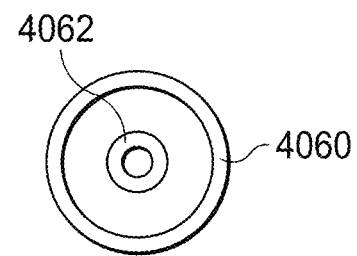
FIG. 40D illustrates groups of concentric rings for a wavelength having multiple OAM valves.

FIG. 40C illustrates the use of a wavelength 4020 having polarization multiplexing of OAM value. The wavelength 4020 can have multiple OAM values 4022 multiplexed thereon. The number of available channels can be further increased by applying left or right handed polarization to the OAM values. Finally, FIG. 40D illustrates two groups of concentric rings 4060, 4062 for a wavelength having multiple OAM values.

Figure 41:
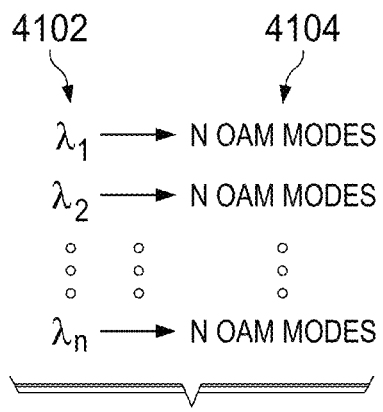
FIG. 41 illustrates a WDM channel containing many orthogonal OAM beams.

Another multiplexing technique is wavelength distribution multiplexing (WDM), WDM has been widely used to improve the optical communication capacity within both fiber-optic systems and free-space communication system. Combining OAM and WDM has not previously been done. However, OAM mode multiplexing and WDM are mutually orthogonal such that they can be combined to achieve a dramatic increase in system capacity. Referring now to FIG. 41, there is illustrated a scenario where each WDM channel 4102 contains many orthogonal OAM beam 4104. Thus, using a combination of orbital angular momentum with wave division multiplexing, a significant enhancement in communication link to capacity may be achieved.

Current optical communication architectures have considerable routing challenges. A routing protocol for use with free-space optic system must take into account the line of sight requirements for optical communications within a free-space optics system. However, an optics network may be modeled as a directed hierarchical random sector geometric graph in which sensors route their data via multi-hop paths to a base station through a cluster head. This technique is a new efficient routing algorithm for local neighborhood discovery and a base station uplink and downlink discovery algorithm. The routing protocol requires order O log(n) storage at each node versus order O(n) used within current techniques and architectures. This new technique has the advantage of being much faster than current systems.

Current routing protocols are based on link state, distance vectors, path vectors, or source routing, and they differ from the new routing technique in significant manners. First, current techniques assume that a fraction of the links are bidirectional. This is not true within a free-space optic network in which links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 42:
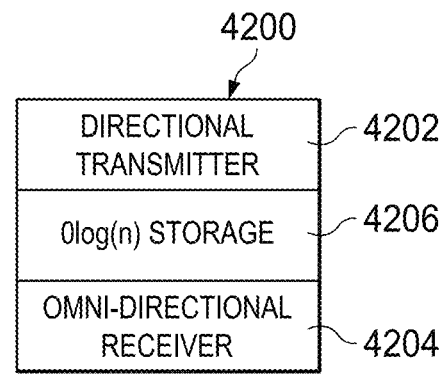
FIG. 42 illustrates a node of a free-space optical system.

Many paths of wireless and free space network are unidirectional. Recent studies on wireless and free space optical systems show that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Unidirectionality only allows information transmission in a single direction which does not enable a response to be provided to an information transmission system. Referring now to FIG. 42, one solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 43:
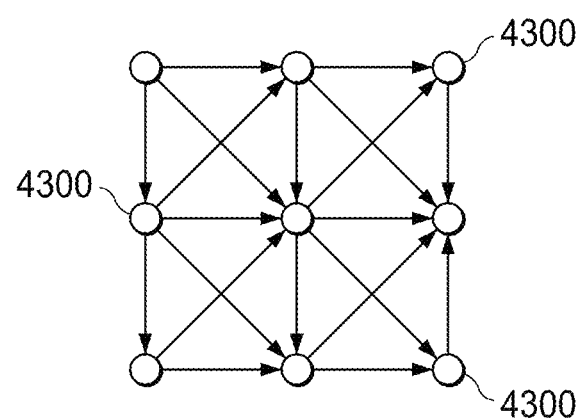
FIG. 43 illustrates a network of nodes within a free-space optical system.

Within a network using only unidirectional links such as a free-space optical network, systems such as that illustrated in FIGS. 42 and 43 would be more applicable. Nodes within a unidirectional network utilize a directional transmit 4202 transmitting from the node 4200 in a single, defined direction. Additionally, each node 4200 includes an omnidirectional receiver 4204 which can receive a signal coming to the node in any direction. Also, as discussed here and above, the node 4200 would also include a 0 log(n) storage 4206. Thus, each node 4200 provide only unidirectional communications links. Thus, a series of nodes 4200 as illustrated in FIG. 43 may unidirectionally communicate with any other node 4200 and forward communication from one location to another through a sequence of interconnected nodes.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 11E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Figure 44:
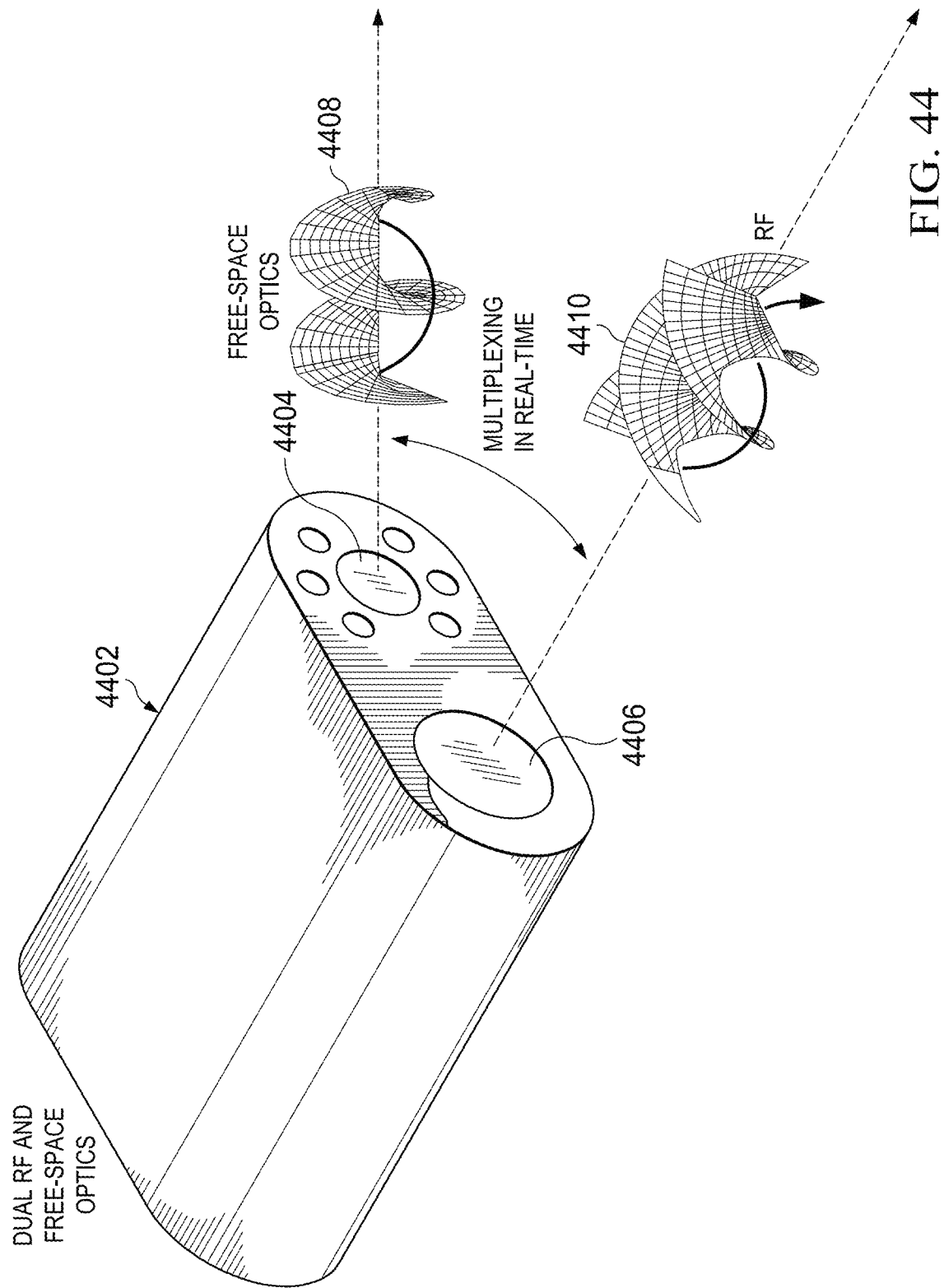
FIG. 44 illustrates a system for multiplexing between a free space signal and an RF signal.

In a further embodiment illustrated in FIG. 44, both RF signals and free space optics may be implemented within a dual RF and free space optics mechanism 4402. The dual RF and free space optics mechanism 4402 include a free space optics projection portion 4404 that transmits a light wave having an orbital angular momentum applied thereto with multilevel overlay modulation and a RF portion 4406 including circuitry necessary for transmitting information with orbital angular momentum and multilayer overlay on an RF signal 4410. The dual RF and free space optics mechanism 4402 may be multiplexed in real time between the free space optics signal 4408 and the RF signal 4410 depending upon operating conditions. In some situations, the free space optics signal 4408 would be most appropriate for transmitting the data. In other situations, the free space optics signal 4408 would not be available and the RF signal 4410 would be most appropriate for transmitting data. The dual RF and free space optics mechanism 4402 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Focusing OAM Signals

Figure 45:
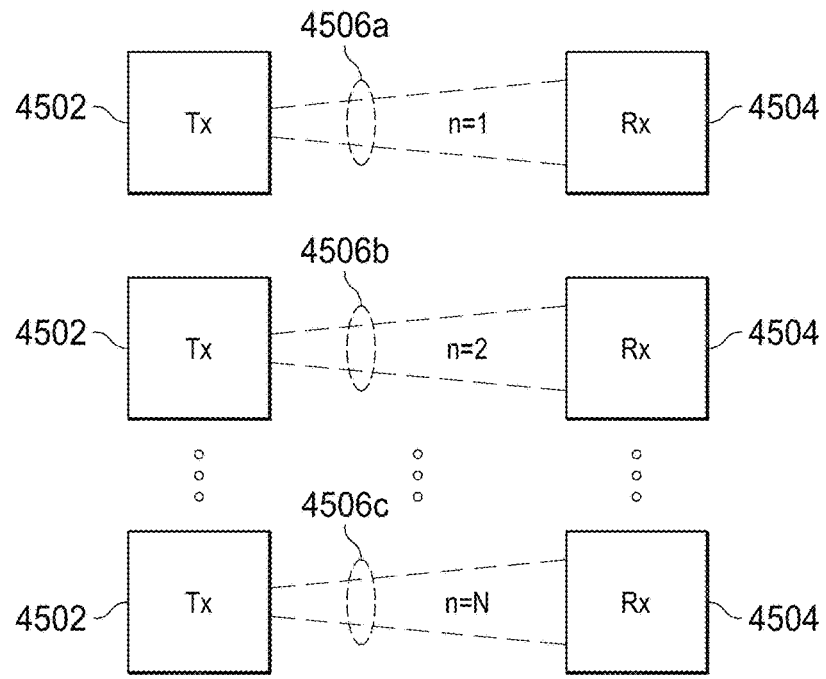
FIG. 45 illustrates the manner in which beam divergence increases for higher orbital angular momentum values.

When applying higher order orbital angular momentum (OAM) values to optical or RF beams, divergence issues can cause problems between transmitting and receiving units as shown in FIGS. 35A and 35B. As illustrated in FIG. 45, there are illustrated transmissions between a transmitter 4502 and a receiver 4504 of an RF or optical beam 4506. For lower order values of beam helicity, for example, l=1, the beam 4506A is fairly focused and the entire beam can be transmitted from the transmitter 4502 to the receiver 4508. However, as the helicity of the beam increases for l=2 up to f=n, as illustrated by beams 4506B and 4506C, the divergence of the beam 4506 increases enabling less and less of the beam transmitted from the transmitter 4502 to be received by the receiver 4504. When a beam becomes divergent to such a level that most of the beam 4506C may not be received by the receiver 4504 a great deal of data may be lost as only a portion of the transmission beam 4506C may be received. Thus, in order to extend the transmission distance and capacity of a communication or radar system using free-space optics or RF communications using orbital angular momentum processing, there is a need to more narrowly focus the OAM based multiplexed beam 4506 since the beams are diverging for higher values of beam helicity.

Figure 46:
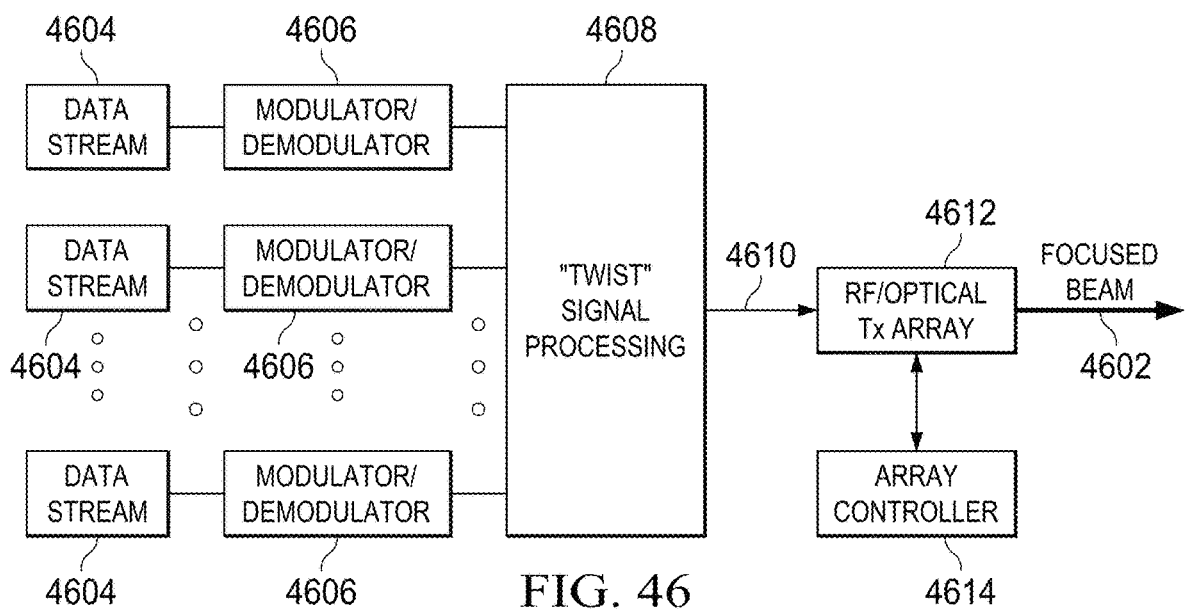
FIG. 46 illustrates a block diagram of a system for generating a focused OAM beam.

One manner for more particularly focusing higher value helicity RF beams utilizes an antenna array is illustrated in FIG. 46 for focusing the higher value helicity OAM processed beam 4602. The system such as that illustrated in FIG. 46 overcomes the problem of beam divergence using focused OAM beams as well as the application of non-sinusoidal ultra-wide band techniques. The development of ultra-wide band large current radiator (LCR) antennas has made it possible to radiate nanosecond wide impulses within inexpensive CMOS chips. As discussed previously, the generation of an OAM processed beam involves the receipt of multiple data streams 4604. Each of the data streams 4604 are processed by modulation/demodulation circuitry 4606 to provide a modulation scheme to the data stream, for example, the multiple level overlay modulation technique described herein above. The modulator/demodulator circuitries 4606 provide the modulated signals to the OAM signal processing circuitry 4608 that applies the OAM twist to the data streams and combines them into a single output OAM processed data stream 4610. The multiplex OAM signal 4610 is provided to an RF or optical transmission array 4612 controlled in accordance with control signals from an array controller 4614 such that the OAM multiplex beam 4610 may be more particularly focused into the focus beam 4602 as will be more fully described herein below.

Figure 47:
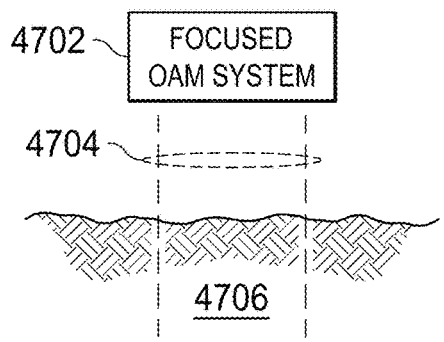
FIG. 47 illustrates an OAM focused beam used in a ground-penetrating application.

By providing a more focused OAM processed RF or optical beam, a number of applications may become more practical for implementation using the OAM focused beam. The first of these include an OAM processed optical or RF beam used in a ground penetrating application such as that illustrated in FIG. 47. In this application, the ground based OAM focused system 4702 produces a focused OAM beam 4704 that is radiated into the ground 4706 for detecting below-ground materials and structures. The ground penetrating system can be reengineered and repackaged for a number of applications. Examples of these applications include the energy industry for use in oil and gas exploration. The ground penetrating radar can be used within the water industry for water exploration. Other typical applications are the locations of non-metallic pipes in the ground, cavities under roads and railroad beds and location of reinforcement iron bars in concrete walls of atomic power stations. Military applications of the ground penetrating application would include detection of hidden arms piles, land mines, unexploded ordinance and underground tunnels or detection of underground explosive devices. Archeological explorations would also find useful applications of the ground penetrating application. The ground penetrating application could also be used within ship navigation for the detection of ice thicknesses for ship navigation in order to find thinner ice for passing of ice breakers or in the determination of ice-thickness for ground based transportation over ice that is thick enough to support a load. Geophysical applications would include the exploration of earth layers for geophysical analysis. While the above list provides only a partial example of a number of applications for use with a ground penetrating radar, any other number of possible applications would be understood by one skilled in the art.

Ground probing radars have been developed since the 1960's. A common feature of ground probing radars is that they do not use a sinuosoidal carrier, in order to reduce attenuation by absorption within the ground. Ground penetrating radars penetrate soil, rock, sand, ice and fresh water to depths of a few meters. A probing depth of 10 meters is an upper limit under exceptional and optimal conditions usually involving an absence of moisture.

The increase of penetration depth of ground probing radars has been handicapped by two things. First, there is no significant market for radars that reach depths of more than 10 meters until one reaches several hundred meters, and the radar becomes suitable for geological exploration. The energy required for a radar pulse to reach a distance r and produce a useful return signal increases linearly with the distance r due to absorption and "geometric spreading." The absorption is not a serious problem. If a resolution of about $\Delta r=10$ cm is desired at a distance of $r=10$ meters or a ratio $\Delta r/r=0.01$, a pulse of a nominal duration of 1 nanosecond is needed. For $r=1000$ meters, and $\Delta r/r=0.01$, we get $\Delta r=10$ meters and a nominal pulse duration of 100 nanoseconds is obtained. Since a resolution of 10 meters at a distance of 1000 meters appears sufficient for geological probing, the increase in the required pulse energy by a factor of 100 can be achieved by making the pulse 100 times longer. No increase of the peak power is required. The important problem is the geometric spreading of the wave. An increase of the probing depth from 10 meters to 100 meters calls for $10^4=10,000$ times the energy to overcome geometric spreading, and a distance of 1,000 meters requires $100^4=100,000,000$ times the energy.

In order to overcome the two effects blocking the development of deep ground probing radars, two things must be accomplished. First, there is no point in developing ground probing radar incrementally for depths of 20 meters, 40 meters, etc., but one must reach several hundred meters before there is a market for the radar. Additionally, the decrease of the received energy due to the $r^4$ or $1/r^4$ law can be reduced to $1/r^2$ due to the principle of the "focused radar." Such a radar will give good images of what there is at certain depths, for example, 500 meters, but obscure images from lesser or greater depths. The principle works for stationary objects or targets that are detectable by a ground probing radar, but is if no use for surveillance radars that are used to detect moving objects. The attenuation loss due to geometric spreading proportionate to $1/r^2$ is 100 for an increase of distance from 10 to 100 meters and 10,000 for an increase to 1,000 meters. Thus, the required power becomes on the order of one kilowatt. Such a value is within technical capabilities of existing technologies.

Figure 48:
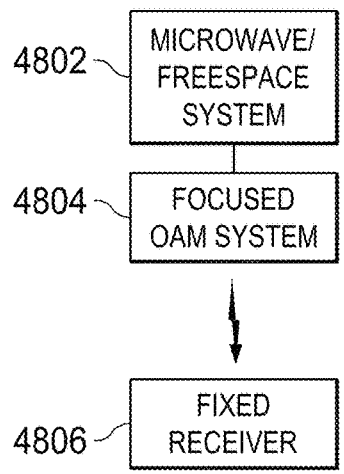
FIG. 48 illustrates a microwave/free-space system providing a focused OAM beam to a fixed receiver.
Figure 49:
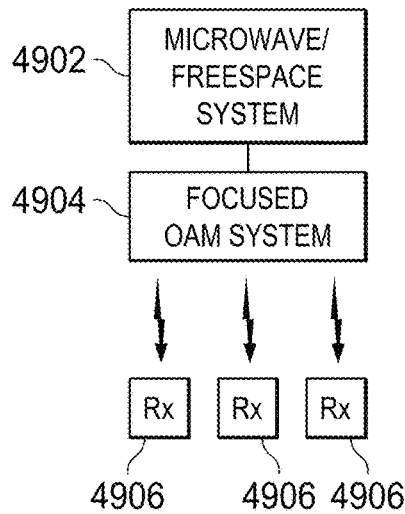
FIG. 49 illustrates a multi-point broadcast of a focused OAM beam.

Another useful application of the focused OAM beam is with backhaul and data sensor applications. Referring now to FIG. 48, there is illustrated a microwave/free space system 4802 providing an output unfocused OAM beam to an OAM beam focusing system 4804. The OAM beam focusing system 4804 provides a single point to point broadcast to a fixed receiver 4806 for example in a microwave backhaul system. Additionally, as shown in FIG. 49, a microwave/free space optical system 4902 may provide an unfocused OAM processed beam to a OAM beam focusing system 4904 which may provide a point to multipoint broadcast to multiple receivers 4906 within a free space optical communications or microwave backhaul system.

Figure 50:
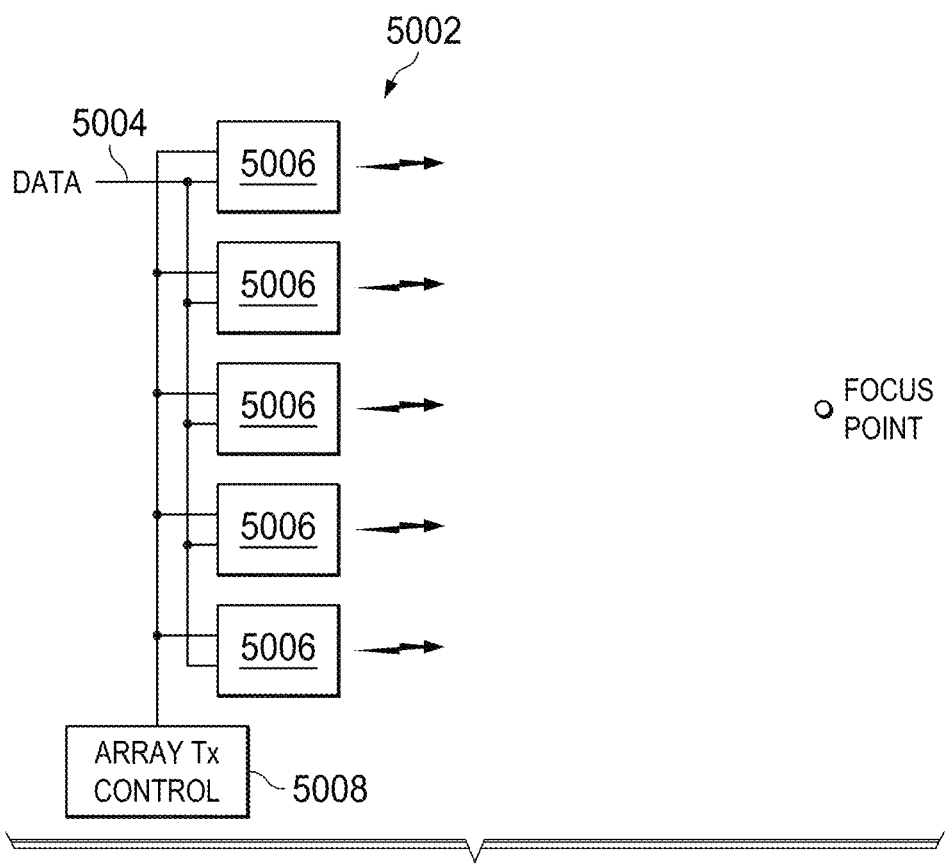
FIG. 50 illustrates a block diagram of an antenna array for providing a focused OAM beam.

Referring now to FIG. 50, there is illustrated a block diagram of an antenna array 5002 that may be used for providing a focused OAM processed beam in accordance with the present disclosure. The antenna array 5002 receives a data stream including multiplexed OAM processed data 5004. The OAM processed data 5004 is applied to each antenna 5006 within the antenna array 5002. Each of the antennas 5006 transmit the OAM processed data 5004 in accordance with transmissions instructions provided from the array transmission control block 5008. The array transmission control block 5008 controls transmission of the data in a defined fashion in order to control the transmissions to provide a more focused beam that overcomes the divergence inherent in higher order OAM processed signals. The particular manner for controlling the transmission of the OAM processed data will be more fully described herein below.

Figure 51:
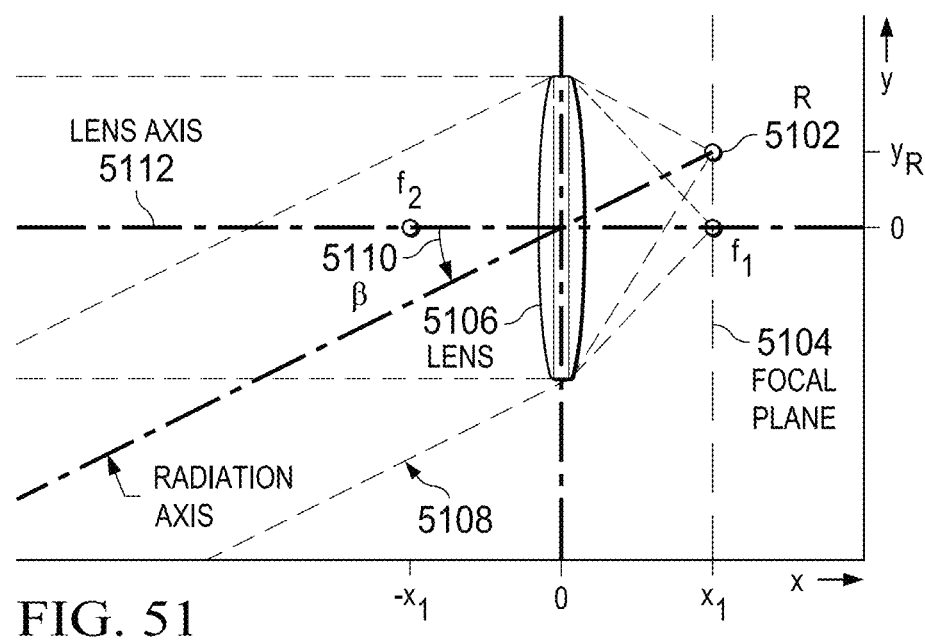
FIG. 51 illustrates a point like radiator generating a beam relative to a lens axis.

The manner for focusing an OAM processed beam may be illustrated by means of ray optics. Referring now to FIG. 51, there is illustrated a point-like light source 5102 denoted radiator R at location $y_R$ in the focal plane $f_1$ 5104 of a lens 5106. The focal plane 5104 is a distance $x_f$ from the center $x=0$ of the lens 5106. A light beam 5108 is formed that has an angle $\beta$ 5110 relative to the lens axis 5112. The value of $\beta$ is given by the formula:

$$\tan\beta = \frac{y_R}{x_f} \qquad (14)$$

In terms of ray optics, the power or energy density of the radiation propagating through a plane perpendicular to the radiation axis does not depend on the distance r from the radiator. The transition from ray optics to wave optics brings a decrease of the power or energy density proportionate to $1/r^2$. For sinusoidal waves, one must use the concept of energy density since a periodic, infinitely extended sine wave has infinite energy. Waves representing signals which include sinusoidal pulses with a finite number of cycles have a finite energy and energy density, their beam patterns differ from those of sinusoidal waves, but their energy density decreases like $1/r^2$ just like the power density of sinusoidal waves.

Figure 52:
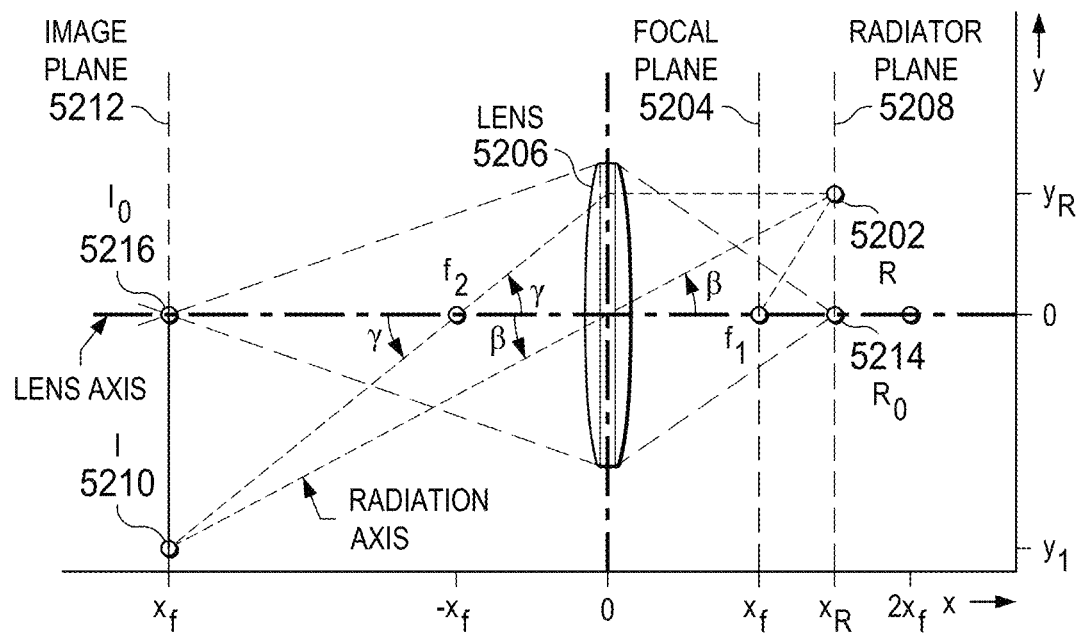
FIG. 52 illustrates a radiator in a radiator plane generating an image in the image plane.

Referring now to FIG. 52, in this image the Radiator® 5202 is not located in the focal plane 5204 of the lens 5206 but further away from the focal plane 5204 and the radiator plane 5208. An image (I) 5210 of the radiator 5202 is produced in the image plane 5212. Thus, all of the radiation is concentrated in one point at a distance $x_1$ from the lens 5206 which is quite different from the divergent beam illustrated in FIG. 51. The angles $\beta$ and $\gamma$ in FIG. 51 are defined by the relationships:

$$\tan\beta = \frac{y_R}{x_R} = \frac{y_I}{x_I} \qquad (15)$$

$$\tan\gamma = \frac{y_R}{x_f} = \frac{y_I}{x_I + x_f} \qquad (16)$$

from which we get the x and y-coordinates of the image I 3710 of the radiator R 3702:

$$x_I = -\frac{x_f}{x_R - x_f} x_R \qquad (17)$$

$$y_I = -\frac{x_f}{x_R - x_f} y_R \qquad (18)$$

For $x_R \to x_f$ we get $x_I \to -\infty$ and $y_I \to -\infty$, which represents FIG. 36. The image of R 3702 is produced at an infinite distance x and is infinitely far from the lens with sign reversal of the location $y_R$ of R.

When the radiator R 5202 of FIG. 52 is moved to the location $y=0$ in the radiator plane (see radiator $R_0$ 5214), the new radiator 5214 is denoted $R_0$ and its image is $I_0$ 5216. If the radiator $R_0$ 5214 is moved in the interval $2x_f \geq x_R > x_f$, the image $I_0$ 5216 will move in the interval $-2x_f \geq x_I > -\infty$. The velocity $dx_I/dt$ of the image $I_0$ 5216 as a function of the velocity $dx_R/dt$ of the radiator $R_0$ 5214 is obtained by the differentiation of Equation 17:

$$\frac{dx_I}{dt} = \frac{x_f^2}{(x_R - x_f)^2} \frac{dx_R}{dt} \qquad (19)$$

At $x_R = 2x_f$ the image $I_0$ 5216 moves with the velocity of the radiator. While for $x_R \to x_f$ the velocity of the image $I_0$ 5216 approaches $\infty$ since ray optics is not a relativistic theory. Radiator 5214 and image 5216 always move in the same direction.

Figure 53:
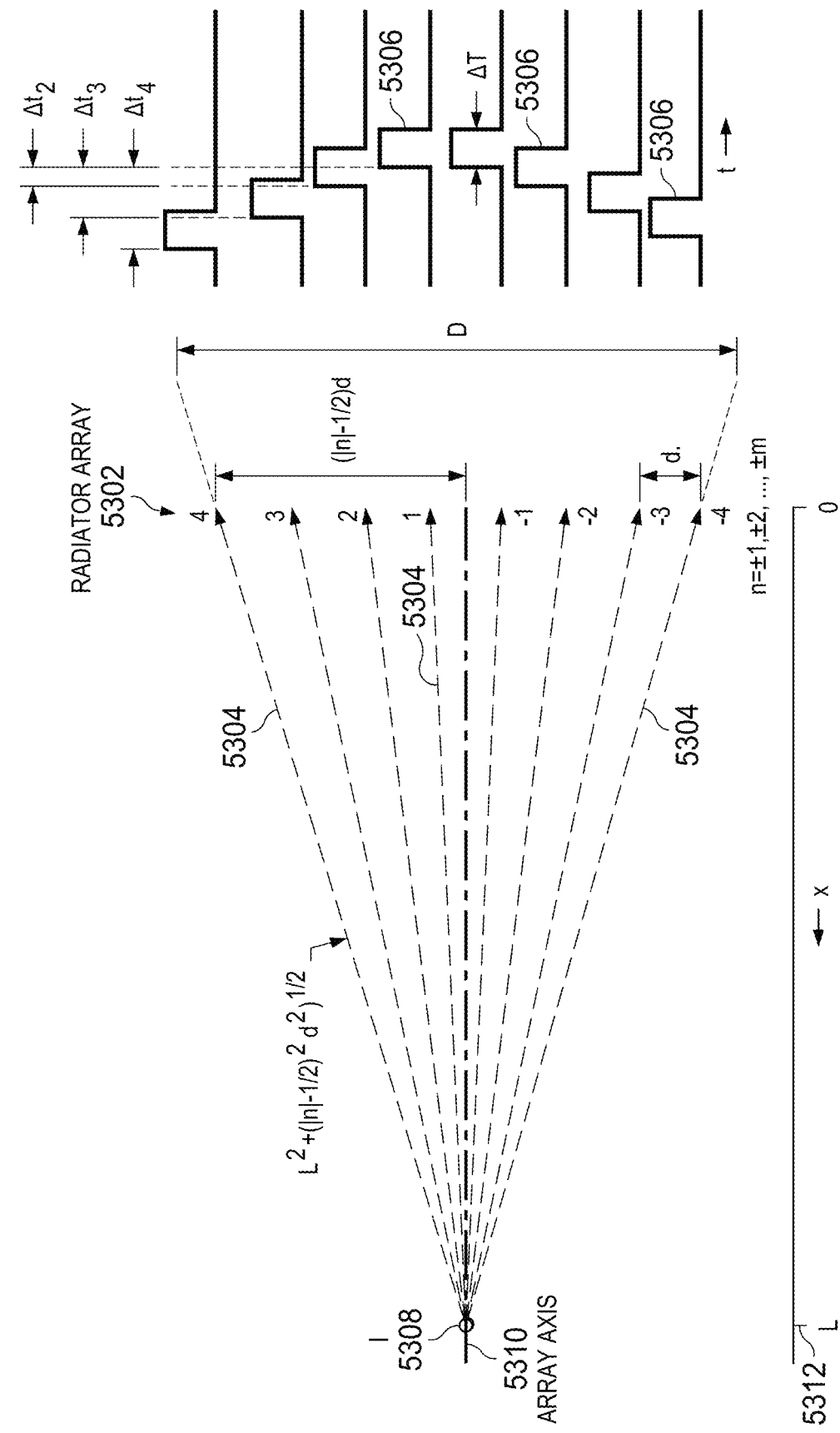
FIG. 53 illustrates a radiator array consisting of a plurality of radiating antennas.

A comparison of FIGS. 51 and 52 suggest that variable focusing should provide a narrower beam or angular resolution than fixed focusing at infinity, provided the distances of interest are not too large compared with the diameter of the lens 5206. To investigate this possibility further, the lens 5206 and radiator 5202 are replaced with an array of radiators that emit electromagnetic waves with carefully chosen time variation and timing as illustrated in FIG. 53. FIG. 53 illustrates a radiator array 5302 consisting of a plurality of radiating antennas 5304 that radiate energy as described herein. A line of array antennas 5304 includes 2 m=8 radiators that are a distance $(|n|-\frac{1}{2})d$, $n=\pm 1, \pm 2, \pm 3, \pm 4$ apart from the array axis radiates electromagnetic waves whose electric and magnetic field strengths have the time variation of rectangular pulses 5306. These pulses 5306 are delayed in time with respect to each other and should arrive at the image point I 5308 on the array axis 5310 at a distance L 5312 from the center of the array at the same time. The distance $x_n$ between the radiator 5302 and the image point I 5308 is given by the equation:

$$x_n = [L^2 + (|n|-\tfrac{1}{2})^2 d^2]^{1/2} \qquad (20)$$

and the propagation time is $x_n/c$. In order to have the leading edge of all pulses 5306 arrive simultaneously at the image point I 5308 at the time $t_0 = L/c$ one must radiate the pulses 5306 from the radiator n 5302 at the time $$t_n = \frac{L - \left[L^2 + \left(|n|-\tfrac{1}{2}\right)^2 d^2\right]^{\tfrac{1}{2}}}{c} \qquad (21)$$

$$\approx -\frac{(2|n|-1)^2}{8} \frac{d^2}{Lc} \text{ for } (2|n|-1)^2 d^2/4L^2 \ll 1 \qquad (22)$$

The time difference between the pulse radiation from radiator n 5302 and from radiator 1 is of practical interest:

$$\Delta t_n = t_n - t_1 = \frac{L}{c}\left\{\left(1 + \frac{d^2}{4L^2}\right)^{\tfrac{1}{2}} - \left[1 + \left(|n|-\tfrac{1}{2}\right)^2 \frac{d^2}{L^2}\right]^{\tfrac{1}{2}}\right\}$$

$$\approx -\frac{(2|n|-1)^2}{8} \frac{d^2}{Lc} \qquad (23)$$

$$\Delta t_n = t_n - t_1 = \qquad (24)$$

$$\frac{L}{c}\left\{\left(1 + \frac{d^2}{4L^2}\right)^{1/2} - \left[1 + \left(|n|-\tfrac{1}{2}\right)^2 \frac{d^2}{L^2}\right]^{1/2}\right\} \approx -\frac{(2|n|-1)^2}{8} \frac{d^2}{Lc}$$

If one wants a concentration of energy by focusing not in one image point at the distance L 5312 but generally at k points L, L+ΔL, . . . , L+(i−1)ΔL, . . . for i=1, 2, . . . , k one must replace the k=1 set of 2 m pulses in FIG. 53 by k sets of 2 m pulses each. An example is given in FIG. 39 as indicated generally at 3902 for k=3. If the image point i 3908 is produced at the distance L+ΔL at the time $t_1=(L+\Delta L)/c+\Delta T$, and generally at the location L+(i−1) ΔL at the time $t_{i-1}=[L+(i-1)\Delta L]/c+(i-1)\Delta T$. The extra time (i−1)ΔT is required to permit a selectable minimum time difference between the pulses of the radiators 5304 n=±1. The generalization of the time $t_n$ in Equation 23 to $t_{n,1}$ becomes:

$$t_{n,i} = \frac{1}{c}\left\{L+(i-1)\Delta L - \left[[L+(i-1)\Delta L]^2 + \left(|n|-\frac{1}{2}\right)^2 d^2\right]^{1/2}\right\} + (i-1)\Delta T \quad (25)$$

The generalization of Equation 9 does not contain ΔT:

$$\Delta t_{n,i} = t_{n,i} - t_{1,i} = \frac{L+(i-1)\Delta L}{c} \left\{\left(1+\frac{d^2}{4[L+(i-1)\Delta L]^2}\right)^{\frac{1}{2}} - \left[1+\left(|n|-\frac{1}{2}\right)^2 \frac{d^2}{[L+(i-1)\Delta L]^2}\right]^{\frac{1}{2}}\right\} \quad (26)$$

In order to obtain some numerical values to judge the potential applications of focused waves we take from FIG. 53 the relation $$d=D/2m \quad (27)$$

and substituted into Equation 24:

$$\Delta t_m = t_m - t_1 \approx -D^2/8Lc \quad (28)$$

TABLE 3

CHARACTERISTIC TIME DELAYS $\Delta T_M$ REQUIRED TO PRODUCE A FOCUSED WAVE AT THE DISTANCE L WITH A LINE ARRAY OF LENGTH D

| D [m] | L [m] | $-\Delta t_m = D^2/8Lc$ [ps] |
|---|---|---|
| 1 | 10 | 41.7 |
|  | 100 | 4.17 |
|  | 1000 | 0.417 |
| 2 | 20 | 83.3 |
|  | 200 | 8.33 |
|  | 2000 | 0.833 |
| 5 | 50 | 208.3 |
|  | 500 | 20.8 |
|  | 5000 | 2.8 |
| 10 | 100 | 417 |
|  | 1000 | 41.7 |
|  | 10000 | 4.17 |
| 20 | 200 | 833.3 |
|  | 2000 | 83.3 |
|  | 20000 | 8.33 |
| 50 | 500 | 2083 |
|  | 5000 | 208 |
|  | 50000 | 20.8 |
| 100 | 1000 | 4167 |
|  | 10000 | 417 |
|  | 100000 | 41.7 |

Table 3 shows $\Delta t_m$ as a function of D and L. A few values of $\Delta t_m$ are larger than 1 ns and a few are smaller than 1 ps, but most lie in the range from 1 ps to 1 ns. This determines the typical required accuracy of the beginning of the pulses in FIGS. 53 and 54.

Figure 54:
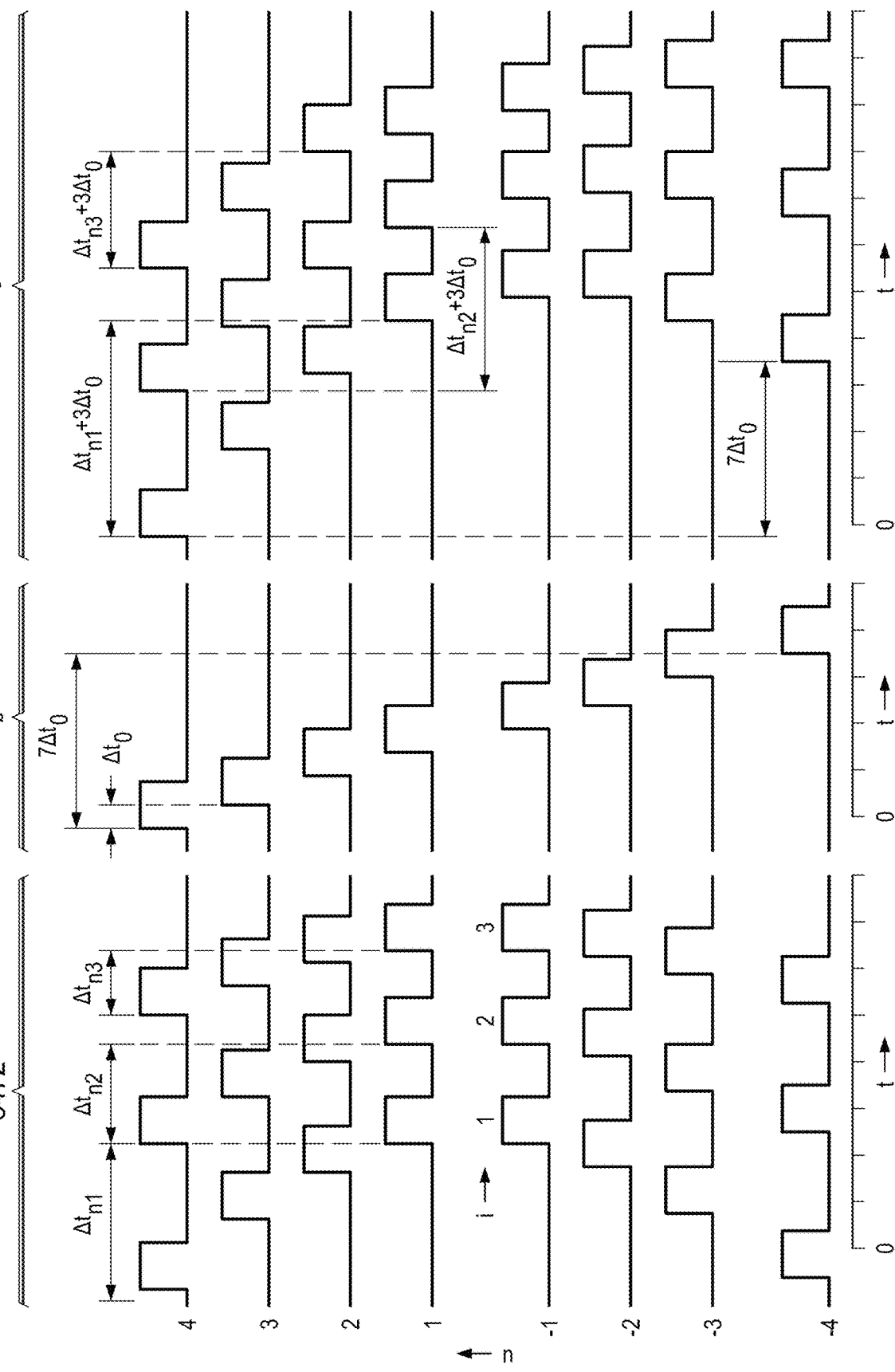
FIG. 54 illustrates various pulses produced from the radiating antennas of FIG. 53.

If one wants to produce one focused point $I_0$ in FIG. 53 one needs one set of pulses (i=1, 2 . . . ) according to FIG. 54 at 5402 which shall have the combined energy W. For k focused points at k different distances k sets of pulses are needed when combined with a combined energy kW. Hence, in principle the required energy increases linearly with distance. The usual beamforming requires that the radiated energy increases with the square of the distance if a certain energy density at the chosen distance is to be achieved. For a numerical comparison of the two methods reference is now made to FIG. 55. An array R 5502 of radiators radiates the energy $W_0$ into a spherical angle ε 5504 at distance L 5506. The energy density $\omega_L$ is obtained according to the equation:

$$\omega_L = W_0/\epsilon L^2 \quad (29)$$

while at the distance L+(k−1) ΔL we get the energy density $\omega_{L,k}$ is generated according to the equation:

$$\omega_{L,k} = W_0/\epsilon[L+(k-1)\Delta L]^2 \quad (30)$$

If the energy density $\omega_{L,k}$ is to be increased to the value of $\omega_L$ one must multiply $W_0$ by a factor of K:

$$K=[L+(k-1)\Delta L]^2/L^2=[1+(k-1)\Delta L/L]^2 \quad (31)$$

Figure 55:
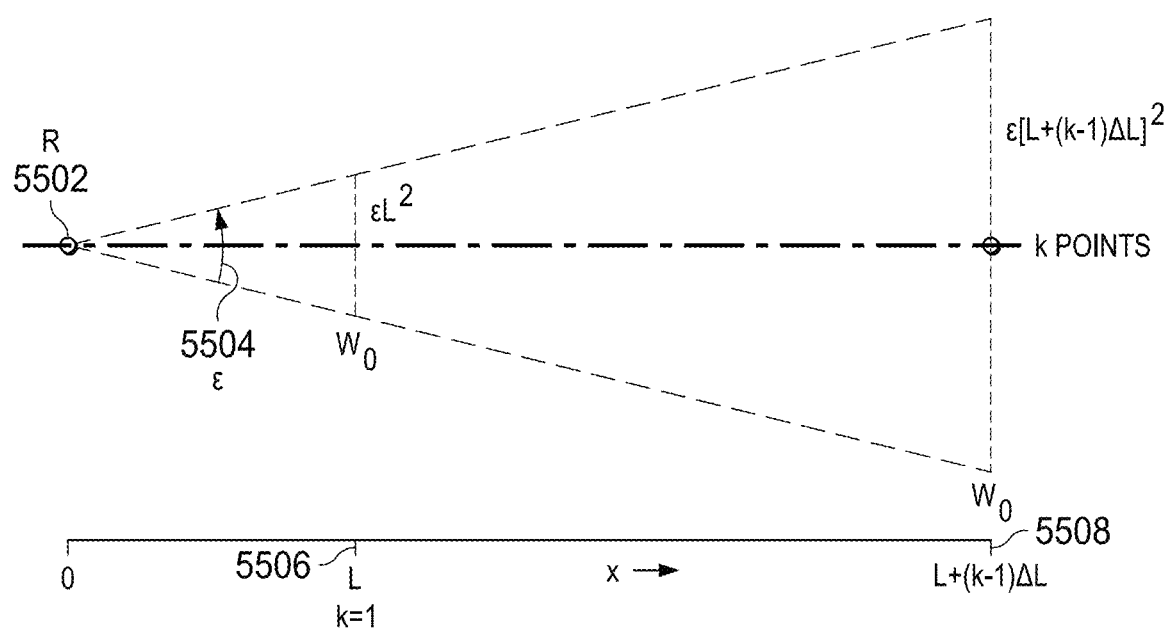
FIG. 55 illustrates the derivation of energy density of a spherical wave from a radiator r over various distances.

If a focused wave makes the energy W flow through the point at distance L 5506 in FIG. 55 the energy kW makes the energy W flow through each one of the k points L, L+ΔL, . . . , L+(k−1)ΔL. If the condition $$kW < LW_0 = [1+(k-1)\Delta L/L]^2 W_0 \quad (32)$$

is satisfied the focused wave will require less energy than the spherical wave. Equation 17 may then be rewritten as:

$$0 < k^2 - \left[\frac{W}{W_0}\left(\frac{L}{\Delta L}\right)^2 - 2\frac{L}{\Delta L} + 2\right]k + \left(\frac{\Delta L}{L}\right)^2\left(1-\frac{\Delta L}{L}\right)^2 \quad (33)$$

If the sign < is replaced by an equality sign we obtain for the larger root $k_1$ of k in the following second order approximation:

$$k_1 \approx \frac{W}{W_0}\left(\frac{L}{\Delta L}\right)^2 - 2\frac{L}{\Delta L} \quad (34)$$

As a first example, consider the values $W=W_0$, $L/\Delta L=10$. From Equation 34 we obtain the approximation $k_1 \approx 100-20=80$. From the exact formula of Equation 31, we derive the following values:

| k→ | 79 | 80 | 81 | 82 | 83 |
|---|---|---|---|---|---|
| K→ | 77.4 | 79.2 | 81 | 82.8 | 84.6 |

We see that $k_1=81$ rather than 80 is the exact value. For k>81 the focused wave will require less radiated energy. The distance x corresponds to k=81 follows from FIG. 40:

$$x=L+(k-1)\Delta L=L(1+80\times 0.1)=9L \quad (35)$$

As a second example consider $W=W_0$, $L/\Delta L=100$. Equation 34 yields $k_1 \approx 9800$. The exact formula 16 yields:

| k→ | 9800 | 9801 | 9802 |
| K→ | 9799.0 | 9801 | 9802.9 |

The exact value of $k_1$ is 9801 rather than 9800. The focused wave requires less energy for k>9801 and the distance x corresponds to k=9801 becomes:

$$x=L+(k-1)\Delta L=L(1+9800\times 0.01)=99L \quad (36)$$

Comparison with Equation 36 shows that the distance has increased by a factor of 11 while the focus point increased by a factor of 9800/81=121.

One of the best features of focused waves applied to radar is that the energy of a pulse returned by a reflector does not vary with the distance r like $1/r^2$ as would be the case for an unfocused wave. Similarly, the energy of a pulse returned by a point-like scatterer decreases like $1/r^2$ rather than $1/r^4$. The principle of this effect can readily be shown by means of ray optics. Consider FIG. 56 at 5602 which shows a radiator R 5604, a lens 5606, an image point $I_R$ 5608 and a reflector 5610 at a distance r between the lens 5606 and the image point 5608. A perfect reflector 5610 perpendicular to the optical axis 5612 will return all the energy coming from reflector R 5610 to the lens 5606 to the new image point $I'_R$ 5614 and via the lens to R' 5616. If the reflector 5610 is located at the image point $I_R$ 5608 as illustrated at FIG. 56B the points $I_R$ 5608 and $I'_R$ 5614 as well as point R 5604 and point R' 5616 will coincide.

Figure 56A:
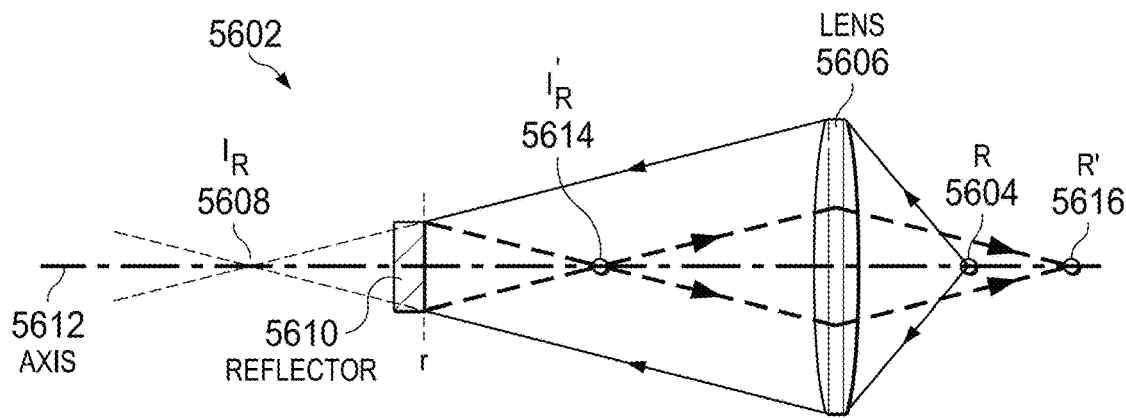
FIGS. 56A-56C illustrate the energy of a reflected focused wave from a radiator r and reflector R.
Figure 56B:
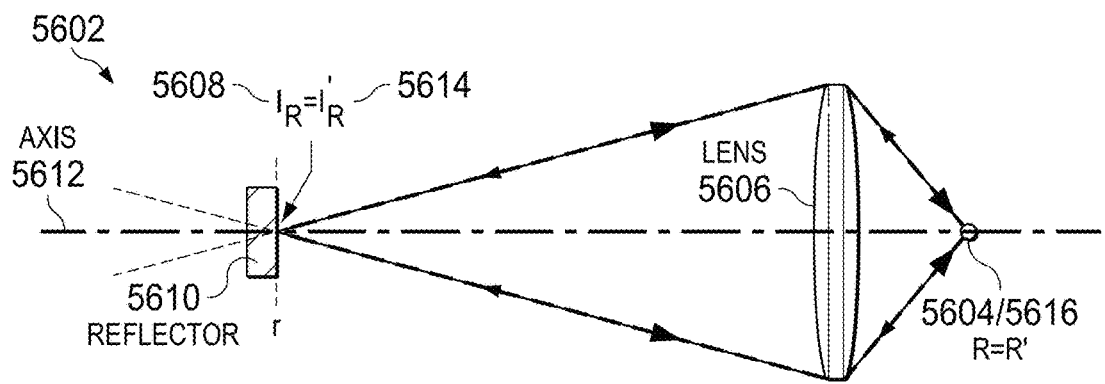
Figure 56C:
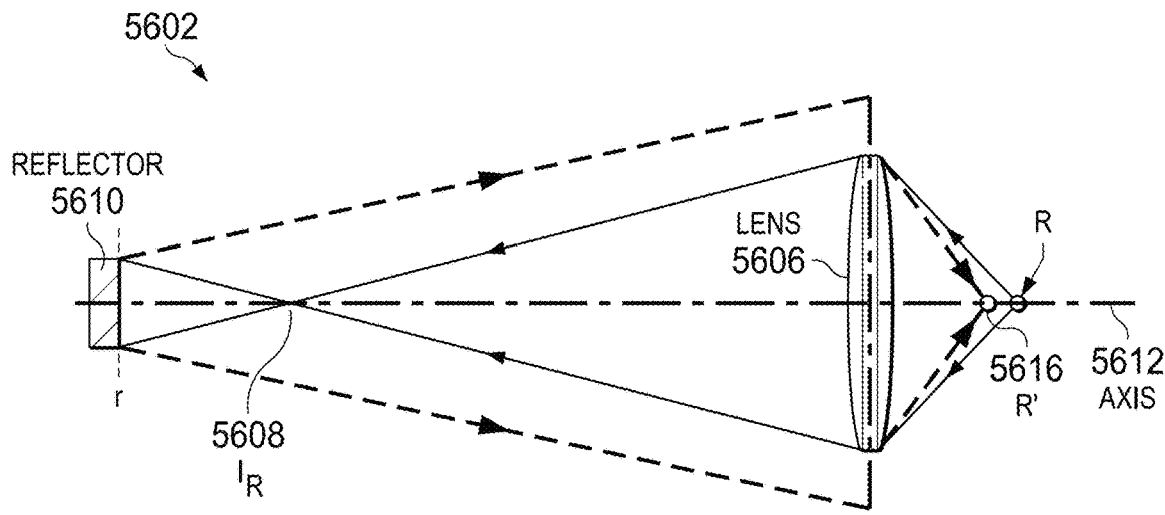

FIG. 56C illustrates the case of the reflector 5610 having a larger distance r from the lens 5606 than the image point $I_R$ 5608. Only part of the incident energy is returned and focused on the point R' 5616. The returned energy decreases with the distance r proportional to $1/r^2$. The use of a larger lens 5606 for the returned signal would avoid the decrease.

Figure 57:
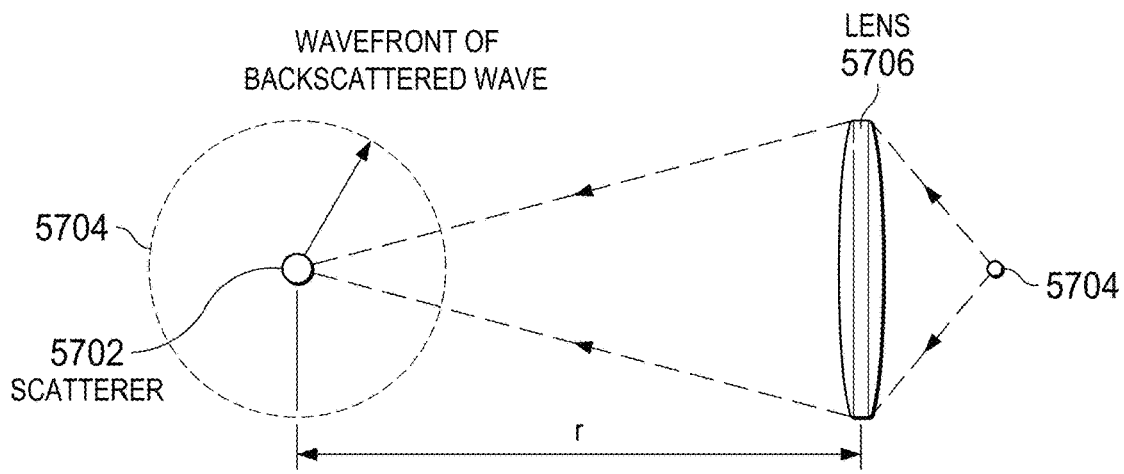
FIG. 57 illustrates a scattering of a focused wave by a point-like scatterer.

If the reflector 5610 in FIG. 56 is replaced with a point-like scatterer 5702 we have the configuration illustrated in FIG. 57. The returned energy decreases now like $1/r^2$ since the scatterer 5702 produces a spherical wave 5704 whose surface increases like $r^2$. Using FIG. 56 one may readily generalize this illustration to the case when the scatterer 5702 is to the left or right of the image point of the radiation source.

Figure 58:
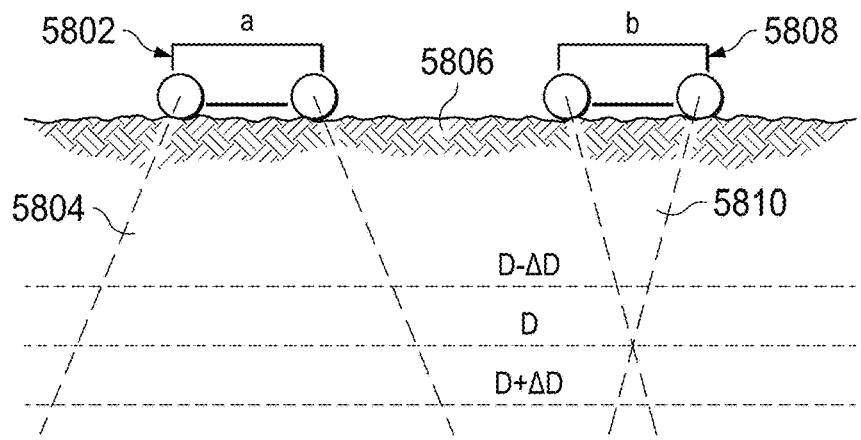
FIG. 58 illustrates an improvement of angular resolution between an unfocused ground probing radar and focused ground probing radar.

FIG. 58 illustrates that focusing can greatly improve the angular resolution of a radar. An emitting radar 5802 assumes unfocused waves 5804 for a ground probing radar that is mounted on a cart. The cart is pulled along the surface of the ground 5806. A large area is illuminated at a distance D−ΔD≤d≤D+ΔD. Radar 5808 shows the same radar using focused waves 5810. The improved angular resolution in a layer at the depth of D±ΔD is striking.

An electromagnetic wave travels along a stripline with a velocity between the velocity c of light and c/2. In 41.7 ps it travels 1.25 cm or less. An array of the dimensions 10 meters×10 meters built to tolerances of less than 1 cm would be required to reach a depth of 1000 meters according to Table 3. It would be difficult to build such an array and even more difficult to use it in the field. The way around this problem does not require a rigid array. We only have to know where each radiator and sensor is at any given time. According to Table 1, an array of 100 m×100 m would need a basic timing accuracy of only 4.167 ns. The location technology presently existing permits one to track the location of n radiators/sensors distributed over an area of 100 m×100 m to much better than 4 ns or 1.2 m. This permits one to time radiation and reception at the n radiators/sensors as if they were mounted on a rigid array. Hence, the array sized up to 100 m×100 m listed in Table 3 are perfectly realistic if one does not think in terms of a rigid array but an array with an electronically monitored location of radiators/sensors.

Diversions within OAM beams may also be reduced using phased arrays. By using multiple transmitting elements in a geometrical configuration and controlling the current and phase for each transmitting element, the electrical size of the antenna increases as does the performance of the antenna. The antenna system created by two or more individual intended elements is called an antenna array. Each transmitting element does not have to be identical but for simplification reasons the elements are often alike. To determine the properties of the electric field from an array the array factor (AF) is utilized.

The total field from an array can be calculated by a superposition of the fields from each element. However, with many elements this procedure is very unpractical and time consuming. By using different kinds of symmetries and identical elements within an array, a much simpler expression for the total field may be determined. This is achieved by calculating the so-called array factor (AF) which depends on the displacement (and shape of the array), phase, current amplitude and number of elements. After calculating the array factor, the total field is obtained by the pattern multiplication rule which is such that the total field is the product of the array factor in the field from one single element.

$$E_{total}=E_{single\ element}\times AF$$

This formula is valid for all arrays consisting of identical elements. The array factor does not depend on the type of elements used, so for calculating AF it is preferred to use point sources instead of the actual antennas. After calculating the AF, the equation above is used to obtain the total field. Arrays can be 1D (linear), 2D (planar) or 3D. In a linear array, the elements are placed along the line and in a planar they are situated in a plane.

Figure 59:
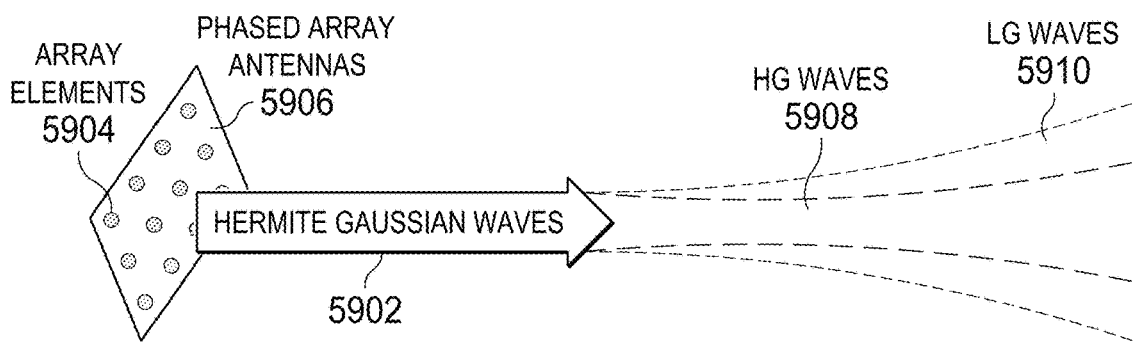
FIG. 59 illustrates the manner in which Hermite Gaussian beams and Laguerre Gaussian beams diverge when transmitted from phased array antennas.

Referring now to FIG. 59, there is illustrated in the manner in which Hermite Gaussian beams and Laguerre Gaussian beams will diverge when transmitted from a phased array of antennas. For the generation of Laguerre Gaussian beams a circular symmetry over the cross-section of the phased antenna array is used, and thus, a circular grid will be utilized. For the generation of Hermite Gaussian beams 5902, a rectangular array 5904 of array elements 5906 is utilized. As can be seen with respect to FIG. 59, the Hermite Gaussian waves 5908 provide a more focused beam front then the Laguerre Gaussian waves 5910.

Figure 60A:
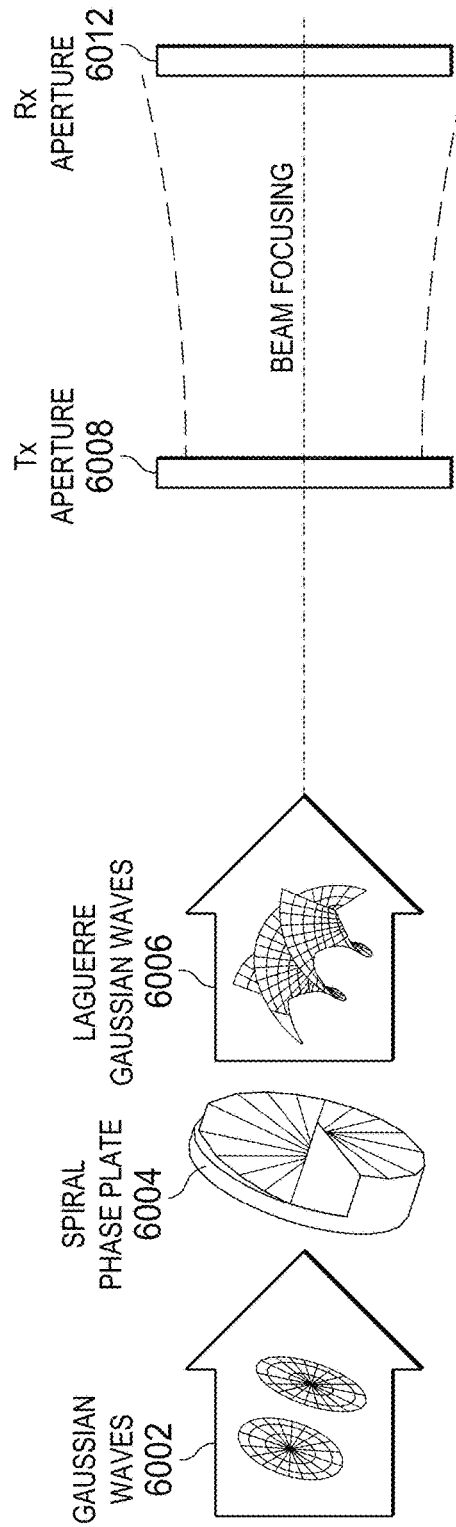
FIG. 60A illustrates beam divergence between a transmitting aperture and a receiving aperture.
Figure 60B:
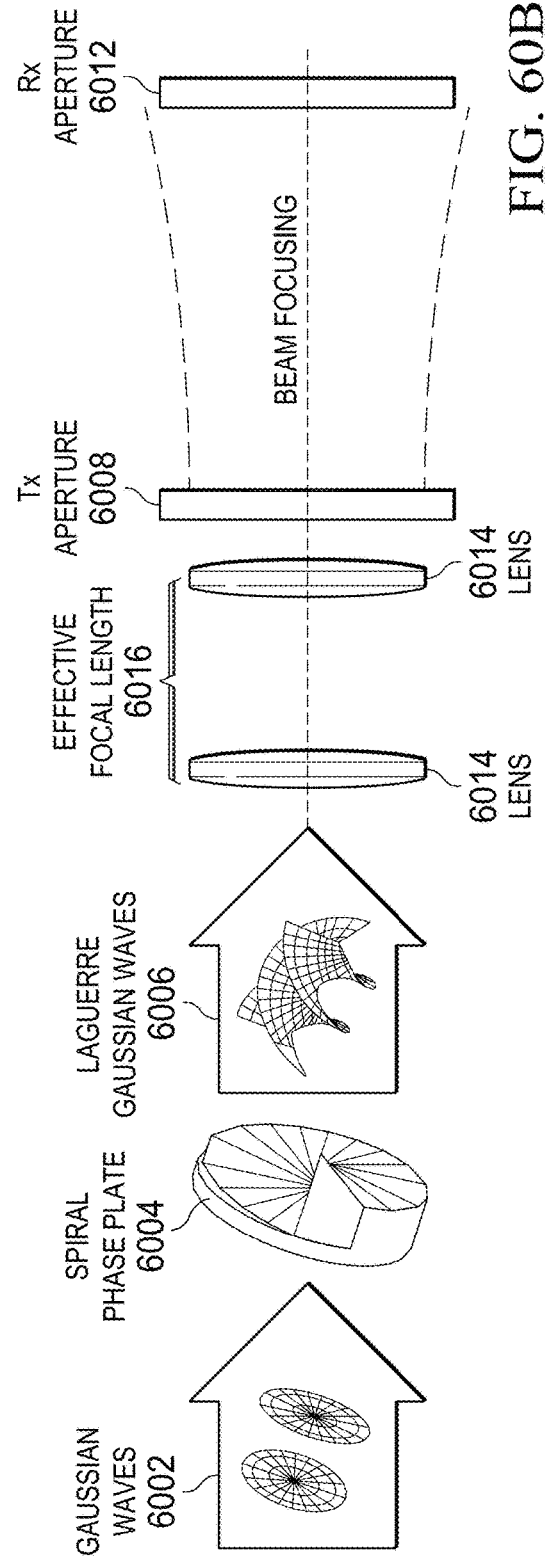
FIG. 60B illustrates the use of a pair of lenses for reducing beam divergence.

Reduced beam divergence may also be accomplished using a pair of lenses. As illustrated in FIG. 60A, a Gaussian wave 6002 passing through a spiral phase plate 6004 generates an output Laguerre Gaussian wave 6006. The Laguerre Gaussian wave 6006 when passing from a transmitter aperture 6008 to a receiver aperture 6010 diverges such that the entire Laguerre Gaussian beam does not intersect the receiver aperture 6010. This issue may be addressed as illustrated in FIG. 60B. As before the Gaussian waves 6002 pass through the spiral phase plate 6004 generating Laguerre Gaussian waves 6006. Prior to passing through the transmitter aperture 6008 the Laguerre Gaussian waves 6006 pass through a pair of lenses 6014. The pair of lenses 6014 have an effective focal length 6016 that focuses the beam 6018 passing through the transmitter aperture 6008. Due to the focusing lenses 6014, the focused beam 6018 fully intersects the receiver aperture 6012. By providing the lenses 6014 separated by an effective focal length 6016, a more focused beam 6018 may be provided at the receiver aperture 6012 preventing the loss of data within the transmission of the Laguerre Gaussian wave 6006.

Figure 61:
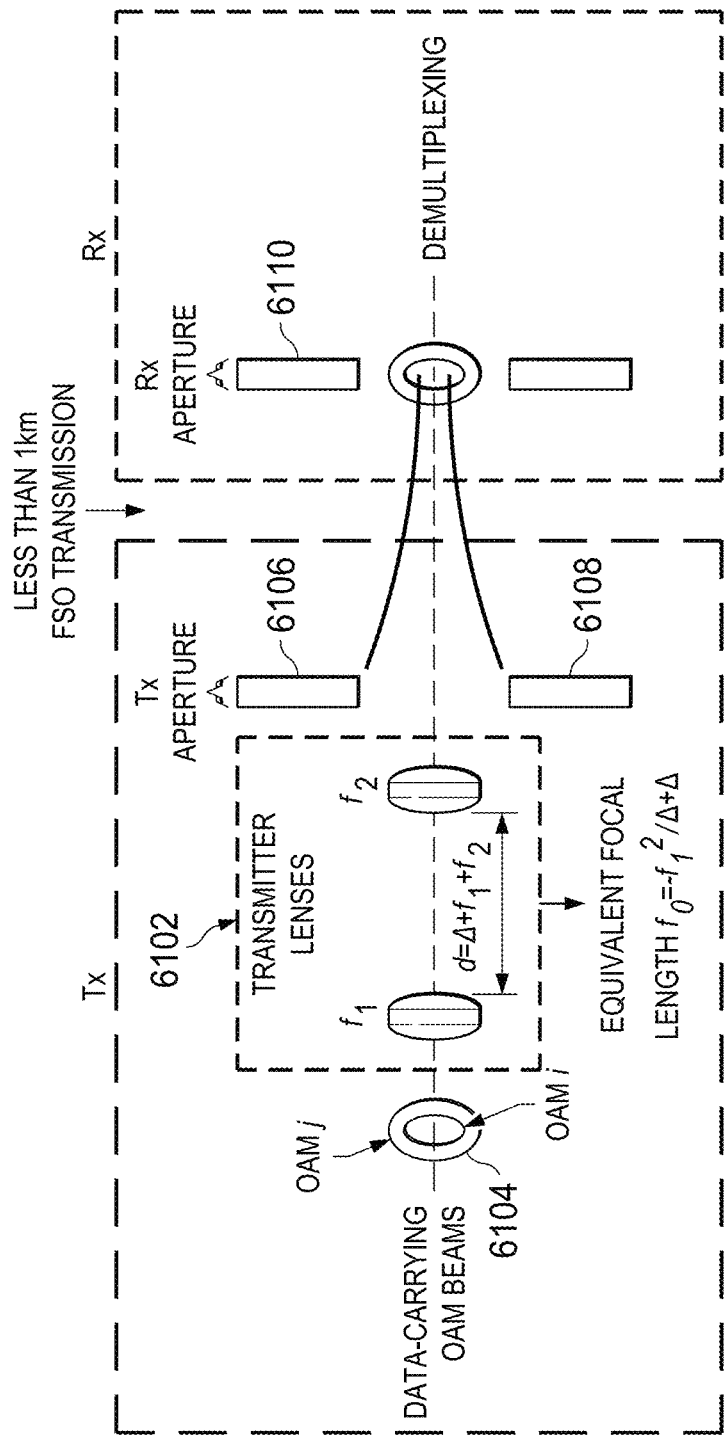
FIG. 61 illustrates a simulation model utilizing a pair of transmitter lenses.

Referring now to FIG. 61, there is illustrated a simulation model utilizing a pair of transmitter lenses 6102. Multiple data carrying OAM beams 6104 at a same wavelength (1550 NM) are multiplexed and passed through a pair of transmitter lenses 6102 before being transmitted in free space through the transmitter aperture 6106. The transmitted beam 6108 is received at the receiver aperture 6110. The equivalent focal length of these two transmitter lenses 6102 is $F_0=F_1^2/\Delta+\Delta$. Note that such a structure is widely used in traditional free space optic (FSO) systems as a telescope with the output beam of the lenses collimated (i.e., $\Delta=0$), while in the present OAM-based FSO links non-collimated beams (i.e., $\Delta \neq 0$) are used to enhance system performance.

Figure 62A:
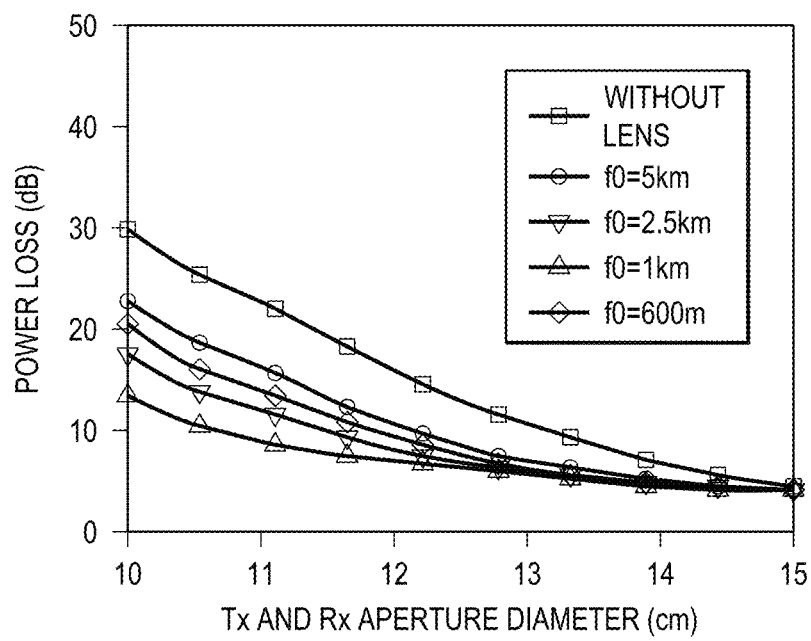
FIG. 62A illustrates the relationship between aperture diameter, transmission distance and power loss decreases.
Figure 62B:
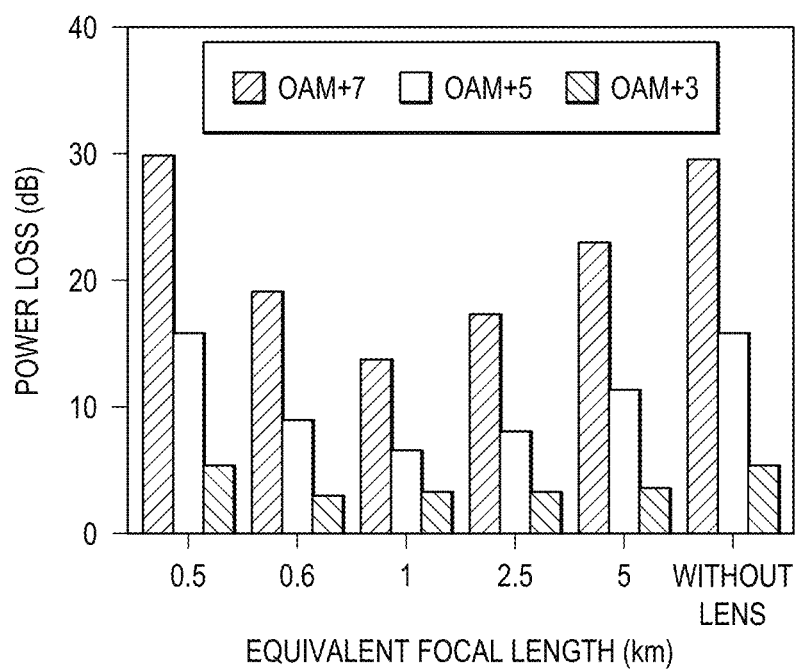
FIG. 62B illustrates the relationship between power loss and equivalent focal lengths for a 1 km link.
Figure 62C:
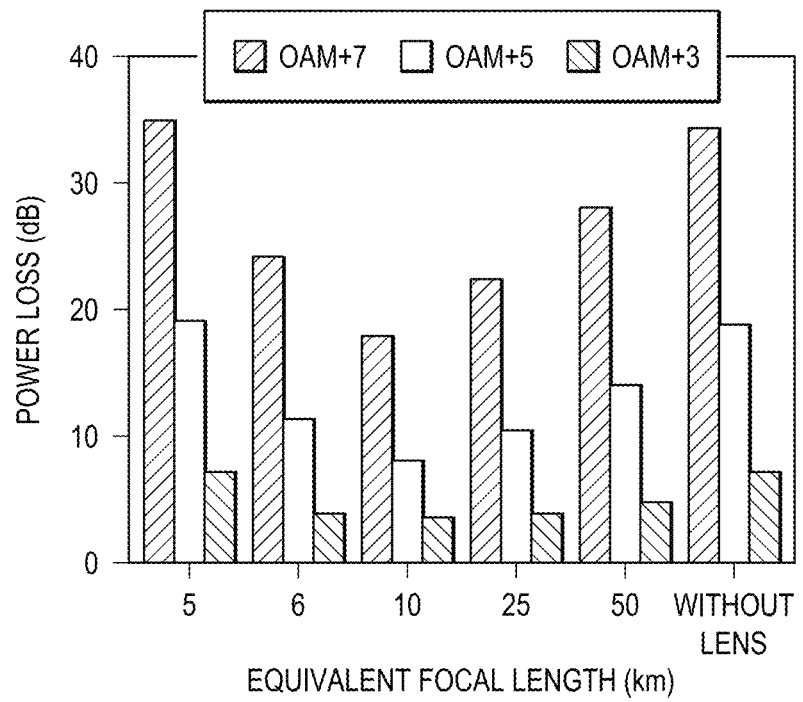
FIG. 62C illustrates the relationship between the relationship between power loss and equivalent focal links for a 10 km link.

Since transmitter lenses can focus OAM beams, more signal power may be provided at a receiver with limited size apertures. FIG. 62A shows that when the equivalent focal length is adjusted to be around the transmission distance, power loss decreases. Because of faster diversions during propagation, higher order OAM beams would benefits more from transmitter lenses as shown in FIG. 62B than lower order OAM beams. In FIG. 62C, there is shown the use of transmitter lenses to reduce power loss in 10 km links where beam divergence causes high power loss.

Figure 63A:
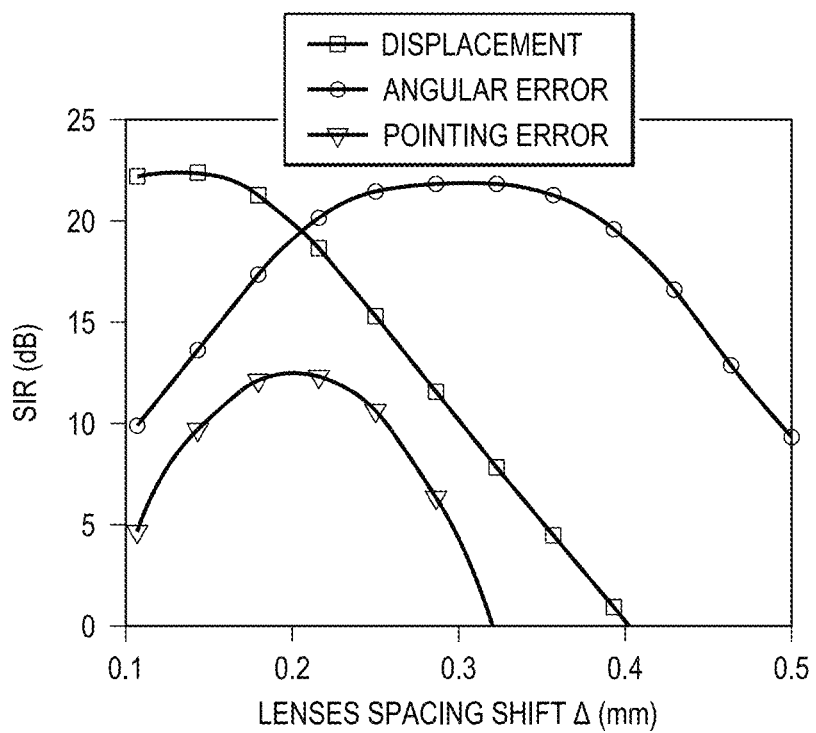
FIG. 63A illustrates simulated SIR of OAM +3.
Figure 63B:
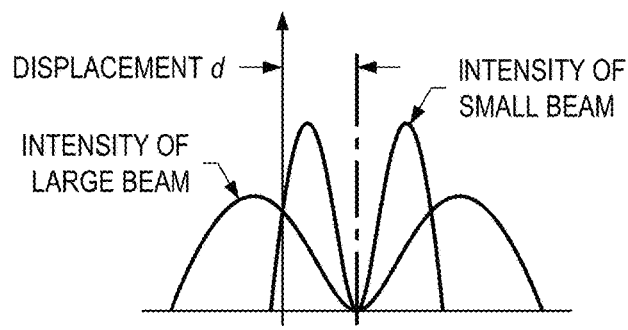
FIG. 63B illustrates simulated SIR when OAM signals are transmitted with lateral displacement.
Figure 63C:
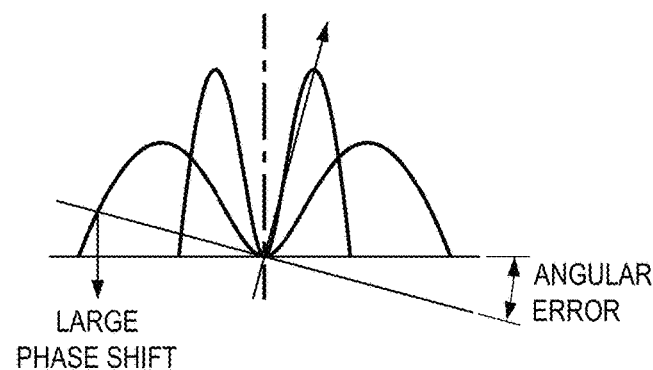
FIG. 63C illustrates simulated SIR when OAM signals are transmitted with receiver angular error and transmitter pointing error in a 1 km OAM-based FSO link.

As the received beam size could be adjusted by controlling the distance between the two transmitter lenses 6102, such as an OAM-based FSO link, would obtain different performance under lateral displacement, receiver angular error and transmitter pointing error. Links in which lateral displacement dominates would prefer to have larger receiver beam sizes because of the relatively smaller mismatch under the same displacement. Links with receiver angular error would prefer smaller receiver beam sizes and less phase shift would be introduced by the same angular error as illustrated in FIGS. 63B and 63C. As a combination of displacement and angular error, pointing error would have a trade-off in choosing receiver beam size. When simulating the OAM +3 as a function of the distance between two transmitter lenses in a 1 km link and when OAM +1 and OAM +3 are transmitted under 8 mm displacement, 8 μrad angular error or 8 μrad pointing error, which is shown in FIG. 63A. Such a link would have higher SIR (Signal to Interference Ration) under angular error when A is around 0.25 mm, which refers to an equivalent focal length of about 1 km where the receiver beam size is the smallest. Both too large or too small a receiver beam size would decrease SIR under pointing error. Note when A increases from 0.3 to 0.5 mm, the receiver beam size increases, SIR under displacement is still decreasing because the beam has a large curvature.

Figure 64:
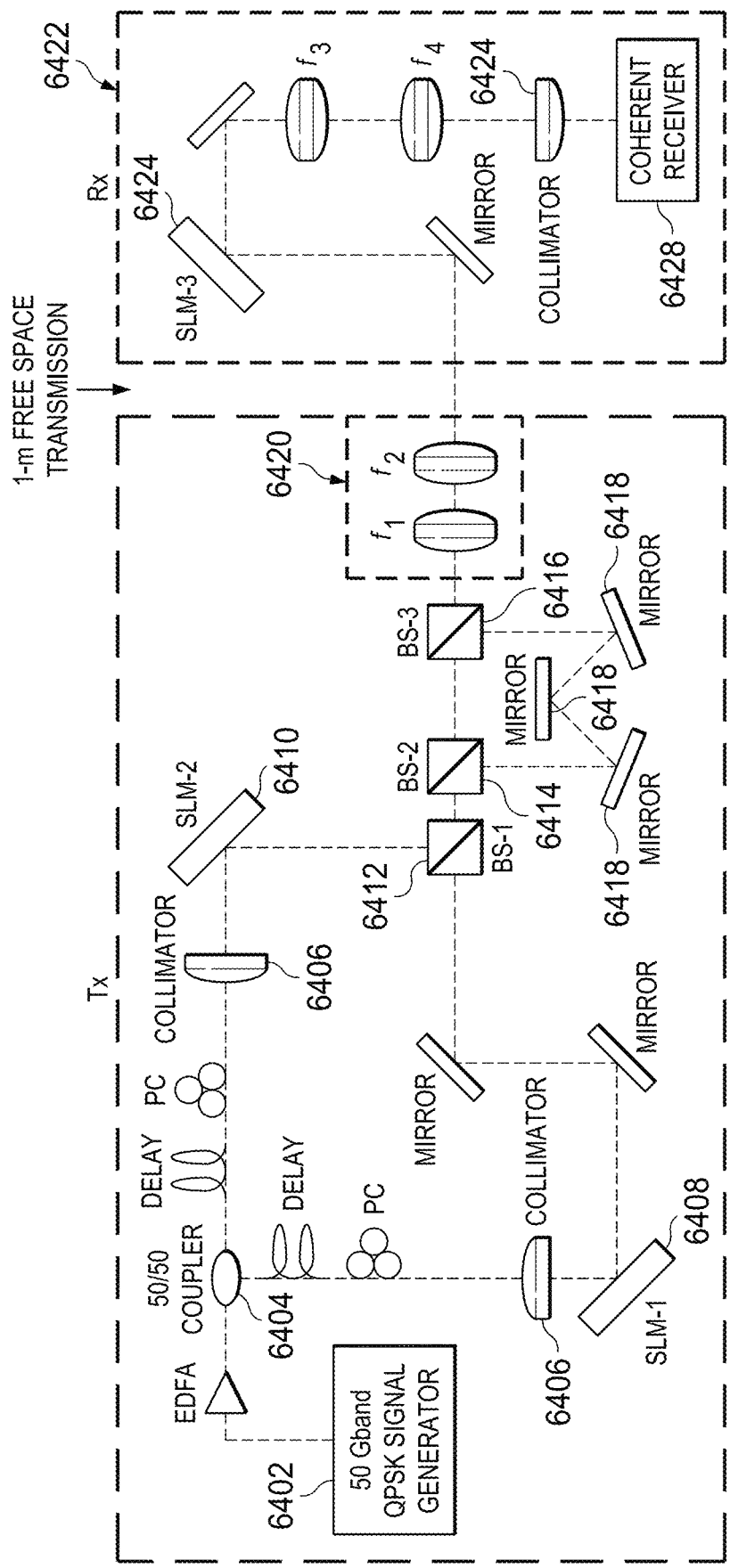
FIG. 64 illustrates a setup of an OAM-based FSO link using transmitter lenses.

Referring now to FIG. 64 there is illustrated the experimental setup of an OAM-based FSO link using transmitter lenses. The generated 50 Gbaud signal 6402 carried by a light wave with a wavelength of 1550 nm is duplicated by a 50/50 coupler 6404 with one beam relatively delayed in an approximately 10 m length of single mode fiber 6405 for decorrelation. The two fiber branches are coupled to collimators 6406 each of which emits a collimated Gaussian beam with a beam diameter of 2.2 mm. One beam is converted to OAM +1 by SLM −1 6408, while the other is converted to a combination of OAM +3 SLM −2 6410. After being combined on a beam splitter 6412, the multiplexing OAM beams are split into two identical groups at beam splitters 6414 and 6416. One of the copies of the beam is reflected by three mirrors 6418 to generate OAM −1 and OAM −3, which are multiplexed with the other copy of the beam at beam splitter 6414. The resulting four multiplexed OAM beams are passed through two lenses 6420 with focal lengths of 10 cm, the distance of which is adjustable to control the received beam size. After one meter FSO transmission, the beams are sent to SLM 3 loaded receiver 6422 with an inverse spiral phase hologram 6424 of the particular OAM channel to be detected. Such an OAM beam is converted to a Gaussian light beam which is coupled at a coupler 6426 into an SMF (single mode fiber) and sent for coherent detection within a coherent receiver 6428.

Figure 65:
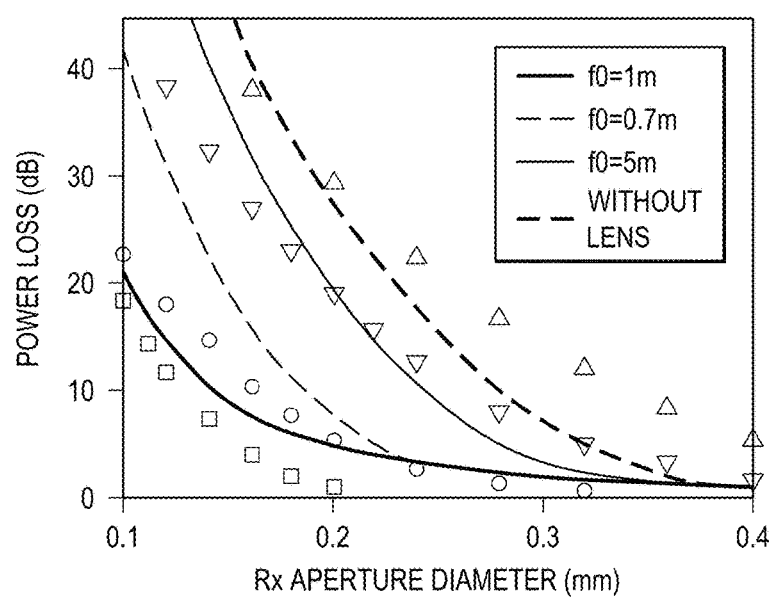
FIG. 65 shows a comparison between simulated and experimental power loss of OAM +3 as a function of receiver aperture size.

FIG. 65 shows a comparison between simulated and experimental power loss of OAM +3 as a function of receiver aperture size when only OAM +3 is transmitted and transmitter and receiver are perfectly aligned. Limited size receiver apertures are implemented by adding truncated pattern on to SLM −3. Power loss decreases for greater than 20 DB when receiver aperture size is smaller than 2.5 mm thanks to transmitter lenses with equivalent focal length of approximately 1 m.

Figure 66A:
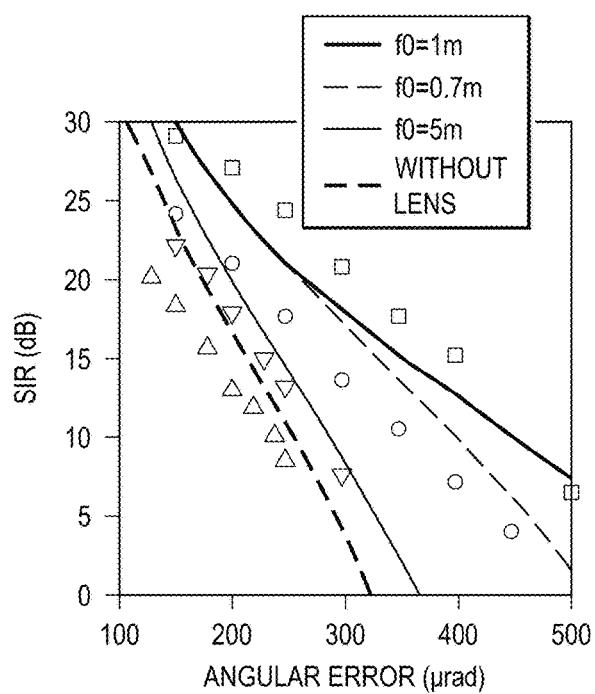
FIGS. 66A and 66B show SIR of OAM +3 when OAM +1 and +3 are transmitted with angular error and displacement.
Figure 66B:
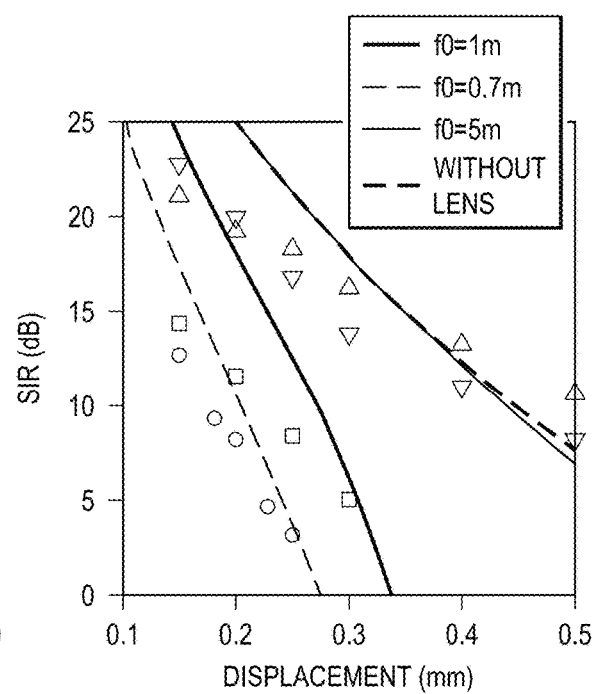

FIGS. 66A and 66B show an SIR of OAM +3 when OAM +1 and OAM +3 are transmitted with angular error and displacement, respectively. Receiver angular errors are introduced to the link by adding tilted phase patterns on to SLM −3, and lateral displacements are created by adjusting mirror −1 which can laterally shift the beam. SIR of OAM +3 with transmitter lenses is 10 to 20 db higher than that of without lenses under various angular errors while 5 to 10 db lower under different lateral displacement.

Figure 67A:
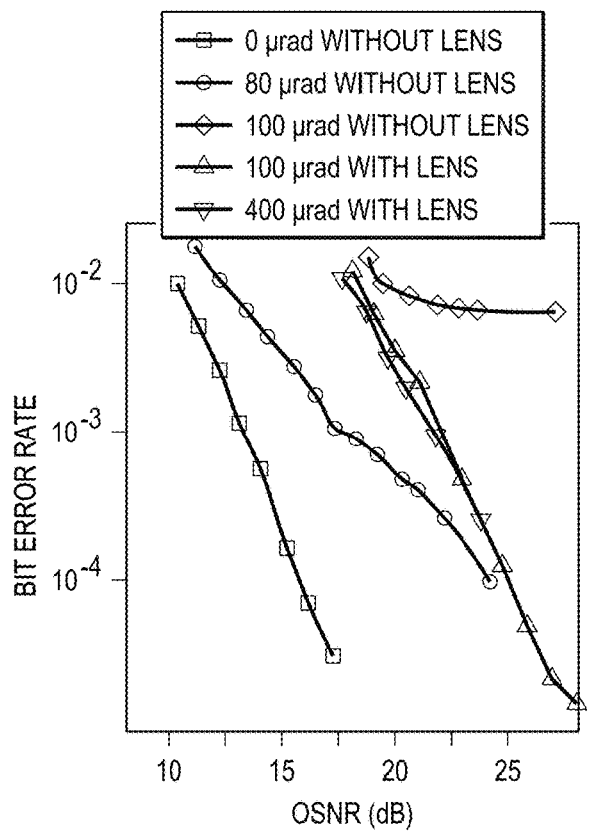
FIGS. 67A and 67B show bit error rate of OAM +3 when OAM ±1, ±3 are transmitted with angular error and displacement.
Figure 67B:
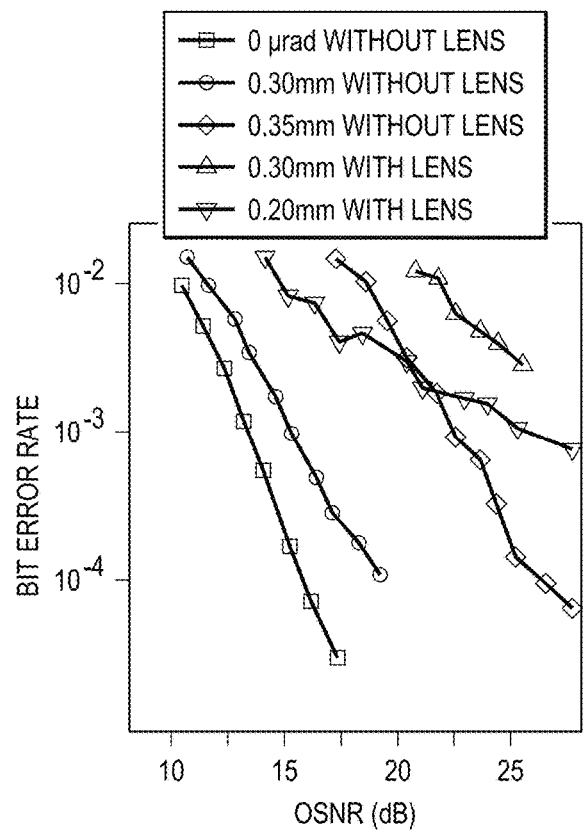

FIGS. 67A and 67B show BER of OAM +3 when OAM +1 and OAM +3 are transmitted with angular error and displacement respectively. When angular error is 100 rad, a link without transmitter lenses could not achieve the 7% overhead forward error correction (FEC) limit of 3.8e-3, while a link with a transmitter lens having an equivalent focal length of approximately 1 m could achieve this FEC limit. Moreover, a link with such transmitter lenses could still achieve the FEC limit under grad 400 angular error with a little power penalty compared with 100 μrad case. On the other hand, such a link would have higher power penalties under displacement the link without transmitter lenses.

Details of the above system are further described in Guodong Xie et al., *Performance Metrics and Design Considerations For a Free-Space Optical Orbital-Angular-Momentum-Multiplexed Communication Link*, Vol. 2, No. 4, OPTICA, 357-365 (2015); A. E. Willner et al., *Optical Communications Using Orbital Angular Momentum Beams*, ADVANCES IN OPTICS AND PHOTONICS, 66-106 (2015); and Long Li et al., *Performance Enhancement of an Orbital-Angular-Momentum-Based Free-Space Optical Communication Link through Beam Divergence Controlling*, Optical Fiber Communication Conference (2015) (on file with author), each of which are incorporated by reference herein in their entirety.

It will be appreciated by those skilled in the art having the benefit of this disclosure that this systems and methods for focusing beams with mode division multiplexing provides improved bandwidth and data transmission capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for focusing an orbital angular momentum (OAM) multiplexed beam, comprising:
   receiving an OAM multiplexed signal from a data processing source, the OAM multiplexed signal including a plurality of data streams each having a unique orbital angular momentum applied thereto and multiplexed together within the OAM multiplexed signal, each of the unique orbital angular momentum having a beam helicity value greater than l=2;
   splitting the OAM multiplexed signal into a plurality of OAM multiplexed signals;
   providing each of the plurality of OAM multiplexed signals to a transmitting antenna of a plurality of transmitting antennas of an antenna array;
   controlling a timing of transmissions of each of the plurality of OAM multiplexed signals from an associated transmitting antenna of the plurality of transmitting antennas to cause a transmitted plurality of OAM multiplexed signals to focus at a predetermined focus point located below ground at substantially a same time to overcome a divergence of the transmitted plurality of OAM multiplexed signals caused by the beam helicity value of greater than l=2 for each of the unique orbital angular momentum; and
   transmitting each of the plurality of OAM multiplexed signals from an associated transmitting antenna of the antenna array toward the predetermined focus point located below the ground as a transmission beam in accordance with the timing.

2. The method of claim 1, wherein the step of transmitting further comprises transmitting a pulse of a fixed width having at least a portion of the OAM multiplexed signal therein.

3. The method of claim 2, wherein the step of transmitting further comprises delaying transmission of a first pulse from a second pulse by a predetermined amount to cause the first pulse and the second pulse to arrive at the predetermined focus point below the ground at substantially the same time.

4. The method of claim 1, wherein the step of transmitting further comprises transmitting each of the plurality of OAM multiplexed signals from the associated transmitting antenna of the antenna array toward a plurality of focus points located below the ground as a plurality of transmission beams.

5. The method of claim 1 further including:
   receiving a plurality of data streams;
   modulating each of the plurality of data streams;
   applying an orbital angular momentum twist to each of the plurality of modulated data streams; and
   multiplexing each of the twisted, modulated data streams into the OAM multiplexed signal.

6. A system for focusing an orbital angular momentum (OAM) multiplexed beam, comprising:
   OAM signal processing circuitry for generating an OAM multiplexed signal, the OAM multiplexed signal including a plurality of data streams each having a unique orbital angular momentum applied thereto and multiplexed together within the OAM multiplexed signal, each of the unique orbital angular momentum comprising a beam helicity value greater than l=2;
   a plurality of antennas comprising an antenna array;
   an antenna array control circuit for controlling transmission of the multiplexed OAM signal from each of the plurality of antennas in the antenna array toward a focus point located below ground as a transmission beam to cause a transmitted plurality of OAM multiplexed signals to converge at the focus point below the ground at substantially a same time to overcome a divergence of the transmitted plurality of OAM multiplexed signals caused by the beam helicity value of greater than l=2 for each of the unique orbital angular momentum.

7. The system of claim 6, wherein the antenna array control circuit further transmits at least one pulse of a fixed width having at least a portion of the OAM multiplexed signal therein.

8. The system of claim 7, wherein the antenna array control circuit further delays transmission of a first pulse from a second pulse by a predetermined amount to cause the first pulse and the second pulse to arrive at the focus point below the ground at substantially the same time.

9. The system of claim 6, wherein the antenna array control circuit further controls the antenna array to transmit the OAM multiplexed signal from an associated transmitting antenna of the antenna array toward a plurality of focus points located below the ground as a plurality of transmission beams.

10. The system of claim 6, wherein the OAM processing circuitry further receives a plurality of data streams, modulates each of the plurality of data streams, applies an orbital angular momentum twist to each of the plurality of modulated data streams and multiplexes each of the twisted, modulated data streams into the OAM multiplexed signal.

11. A controller for an antenna array, comprising:
    an interface for interconnecting the controller with the antenna array comprising a plurality of transmitting antennas; and
    a processor for generating control signals for controlling transmissions of an orbital angular momentum multiplexed signal from the antenna array, the OAM multiplexed signal including a plurality of data streams each having a unique orbital angular momentum applied thereto and multiplexed together within the OAM multiplexed signal, each of the unique orbital angular momentum having a beam helicity value greater than l=2, the processor configured to generate control signals to cause the antenna array to transmit the OAM multiplexed signal from each of the plurality of transmitting antennas of the antenna array toward a focus point located below ground as a transmission beam and control a timing of the transmissions of the OAM multiplexed signal from each of the plurality of transmitting antennas of the antenna array to cause a transmitted plurality of OAM multiplexed signal from each of the plurality of transmitting antennas to converge at the focus point below the ground at substantially a same time to overcome a divergence of the transmitted plurality of OAM multiplexed signals caused by the beam helicity value of greater than l=2 for each of the unique orbital angular momentum.

12. The controller of claim 11, wherein the processor further generates the control signals to transmit at least one pulse of a fixed width having at least a portion of the OAM multiplexed signal therein.

13. The controller of claim 12, wherein the processor further generates the control signals to delay transmission of a first pulse from a second pulse by a predetermined amount to cause the first pulse and the second pulse to arrive at the focus point below the ground at substantially the same time.

14. The controller of claim 11, wherein the processor further generates the control signals to control the antenna array to transmit the OAM multiplexed signal from an associated transmitting antenna of the antenna array toward a plurality of focus points located below the ground as a plurality of transmission beams.

\* \* \* \* \*